US011310625B2

(12) United States Patent
Hatanaka et al.

(10) Patent No.: US 11,310,625 B2
(45) Date of Patent: Apr. 19, 2022

(54) ELECTRONIC APPARATUS

(71) Applicant: KYOCERA Corporation, Kyoto (JP)

(72) Inventors: Akihito Hatanaka, Yokohama (JP); Tomoki Iwaizumi, Osaka (JP); Youji Hamada, Kyoto (JP); Hisae Honma, Yokohama (JP); Kousuke Nagase, Yokohama (JP); Tomohiro Sudou, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 17/035,280

(22) Filed: Sep. 28, 2020

(65) Prior Publication Data

US 2021/0014637 A1  Jan. 14, 2021

Related U.S. Application Data

(63) Continuation of application No. PCT/JP2019/005475, filed on Feb. 15, 2019.

(30) Foreign Application Priority Data

Mar. 28, 2018  (JP) .............................. JP2018-062364

(51) Int. Cl.
*H04W 4/021* (2018.01)
(52) U.S. Cl.
CPC .................................. *H04W 4/021* (2013.01)
(58) Field of Classification Search
CPC ................................................... H04W 4/021
See application file for complete search history.

(56) References Cited

U.S. PATENT DOCUMENTS

| | | | | |
|---|---|---|---|---|
| 2010/0144328 A1* | 6/2010 | Keating | ................ | H04W 12/02 455/414.3 |
| 2012/0158943 A1* | 6/2012 | Esteve Balducci | ... | H04L 51/043 709/224 |
| 2013/0114821 A1* | 5/2013 | Hamalainen | ..... | G10K 11/17873 381/71.6 |
| 2013/0316746 A1 | 11/2013 | Miller et al. | | |
| 2015/0312731 A1* | 10/2015 | Bendi | ...................... | H04W 4/12 455/414.1 |
| 2015/0350825 A1 | 12/2015 | Kim et al. | | |
| 2016/0050315 A1* | 2/2016 | Malhotra | ............ | H04M 1/6075 455/414.1 |

FOREIGN PATENT DOCUMENTS

| | | | |
|---|---|---|---|
| JP | H07-250132 A | | 9/1995 |
| JP | 2001-119749 A | | 4/2001 |
| JP | 2003298680 A | * | 10/2003 |
| JP | 2008-60683 A | | 3/2008 |
| JP | 2008-252196 A | | 10/2008 |
| JP | 2012-510776 A | | 5/2012 |
| JP | 2014-506043 A | | 3/2014 |
| JP | 2016-042692 A | | 3/2016 |
| WO | 2019/187745 A1 | | 10/2019 |

* cited by examiner

*Primary Examiner* — Minjung Kim
(74) *Attorney, Agent, or Firm* — Procopio Cory Hargreaves and Savitch LLP

(57) ABSTRACT

An electronic apparatus comprises a communication unit and a controller. The communication unit can communicate with the other side device. The controller performs first processing based on position information indicating a location of the other side device in response to a transmission instruction from a user regarding a telephone communication with the other side device.

17 Claims, 37 Drawing Sheets

F I G. 1
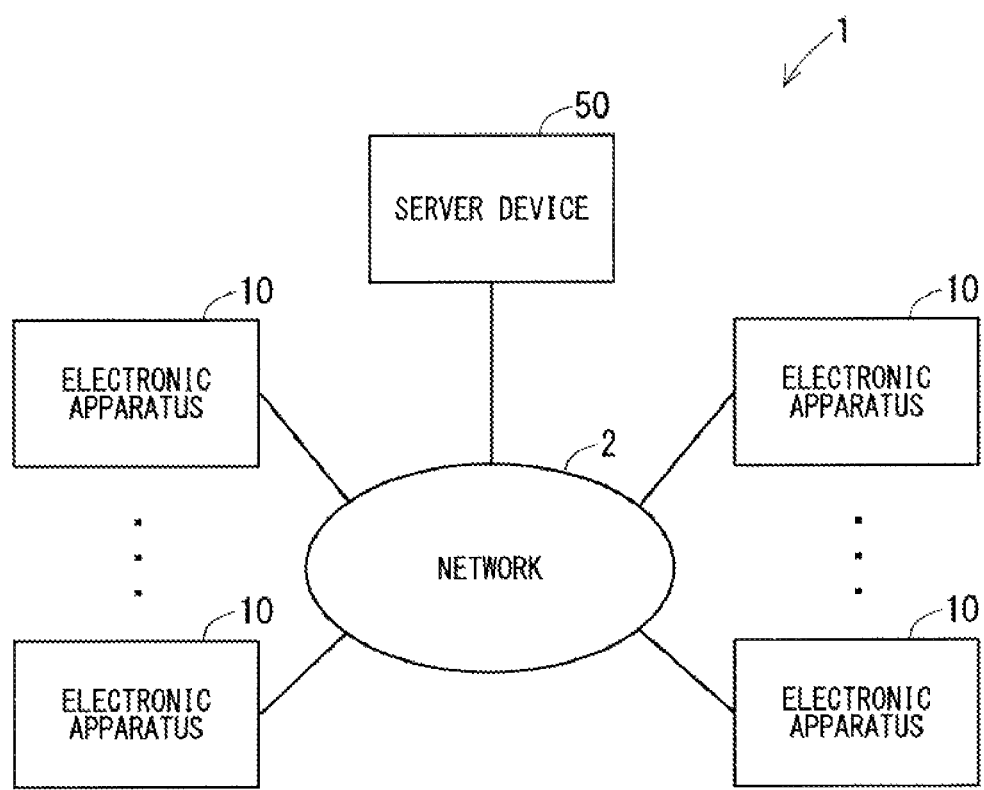

F I G. 1 7
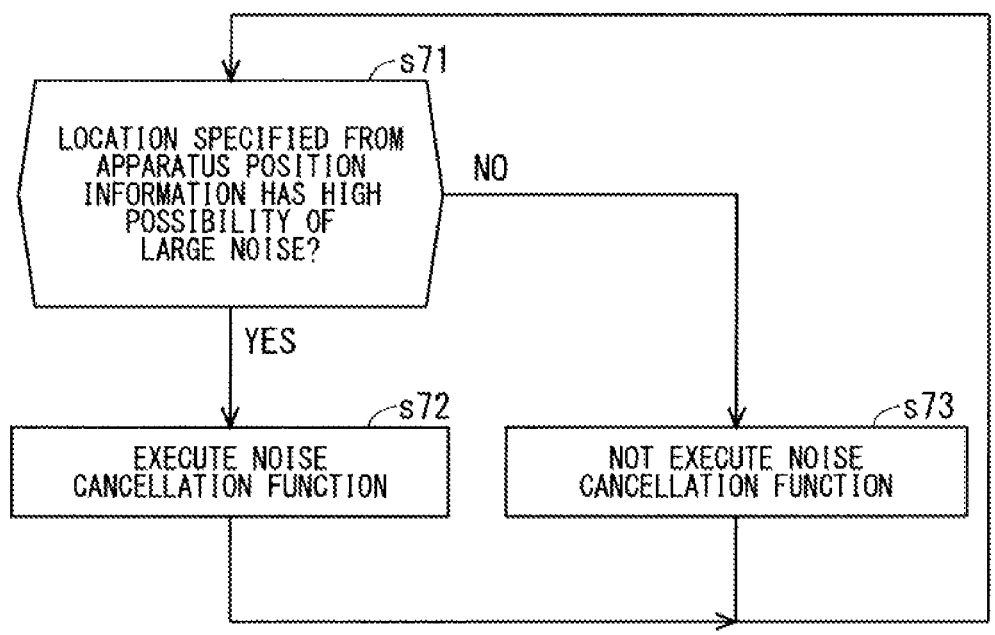

F I G. 2 2
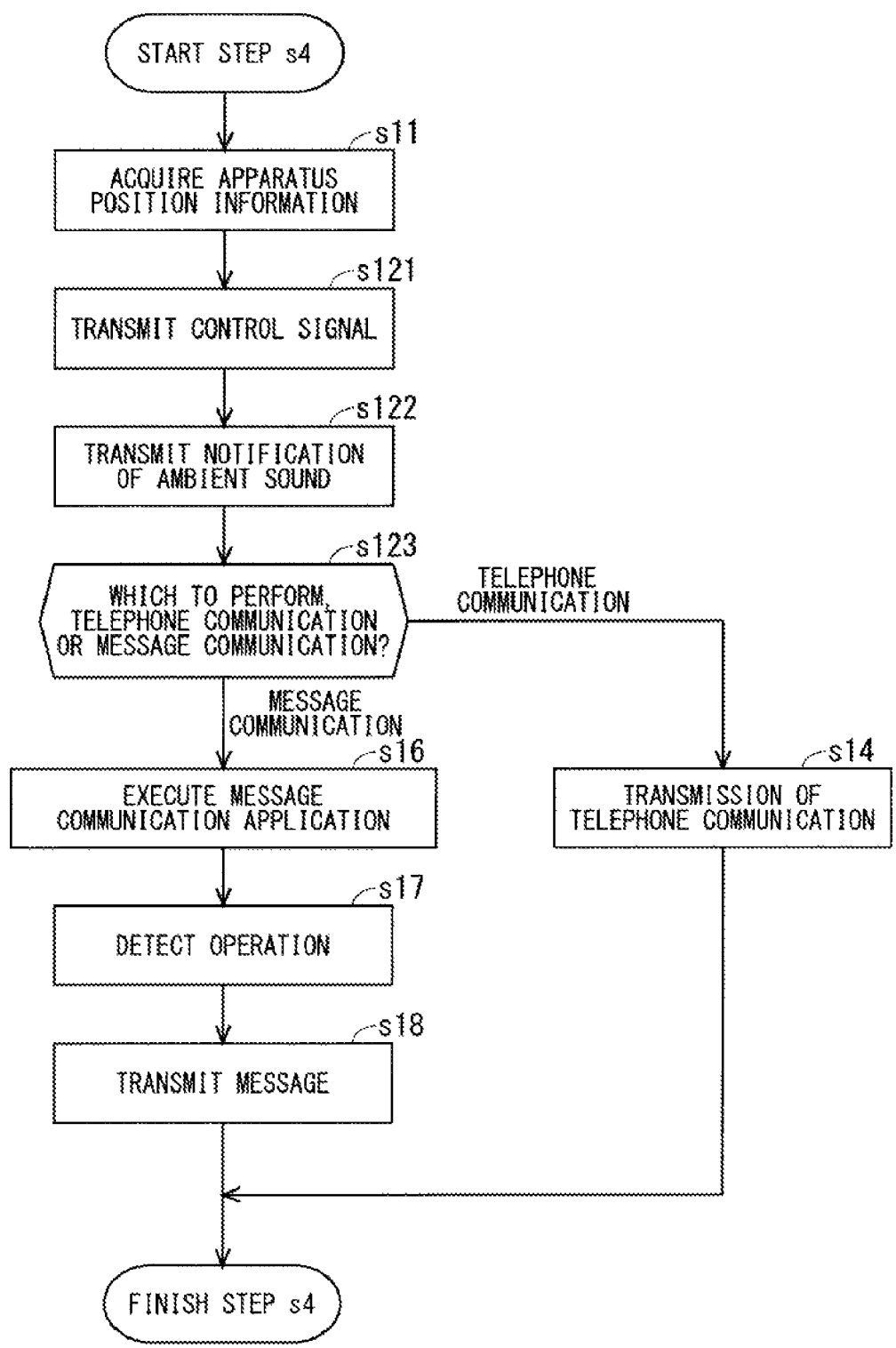

851 → DATE MARCH 25, 2018

| | TIME | PLAN CONTENT |
|---|---|---|
| 852(852a) → | 9:00~11:00 | MEETING IN HEAD OFFICE |
| 852(852b) → | 15:30~17:30 | DISCUSSION IN △△FACTORY |
| 852(852c) → | 19:00~20:00 | WATCH MOVIE WITH ○○ |

853  854

F I G. 3 2
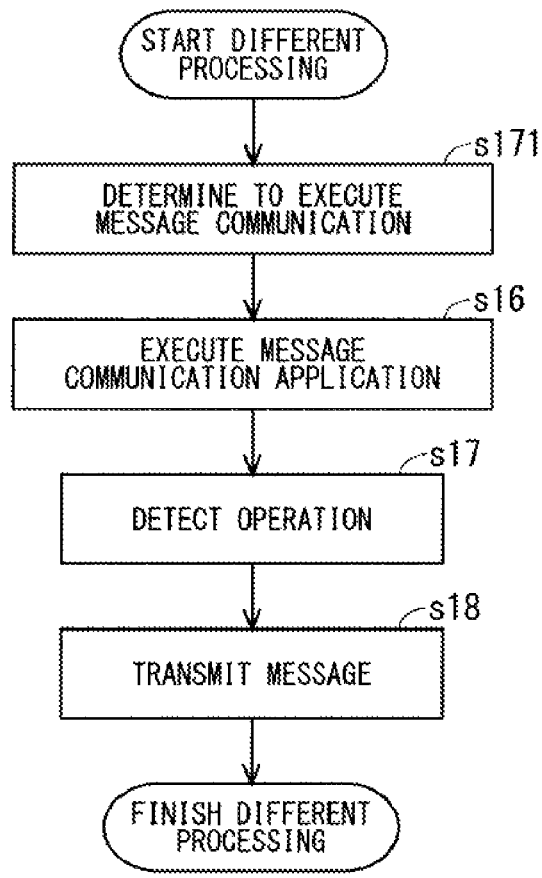

ELECTRONIC APPARATUS

CROSS-REFERENCE TO RELATED APPLICATIONS

The present application is a continuation based on PCT Application No. PCT/JP2019/005475 filed on Feb. 15, 2019, which claims the benefit of Japanese Application No. 2018-062364, filed on Mar. 28, 2018, each of which is incorporated herein by reference in its entirety. PCT Application No. PCT/JP2019/005475 is entitled "ELECTRONIC APPARATUS AND PROCESSING SYSTEM", and Japanese Application No. 2018-062364 is entitled "ELECTRONIC APPARATUS AND PROCESSING SYSTEM". This application is also related to PCT Application No. PCT/JP2019/005385 filed on Feb. 14, 2019 which is incorporated by reference herein in their entirety.

FIELD

The present disclosure relates to electronic apparatuses.

BACKGROUND

Various techniques relating to electronic apparatuses are proposed.

SUMMARY

An electronic apparatus and a processing system are disclosed. In one embodiment, an electronic apparatus comprises a communication unit and a controller.

The communication unit can communicate with another side device. The controller performs first processing based on position information of the another side device in response to a transmission instruction from a user regarding a telephone communication with the another side device.

In one embodiment, the electronic apparatus functions as the another side device with which the electronic apparatus described above can communicate.

In one embodiment, a processing system comprises the electronic apparatus described above and the another side device with which the electronic apparatus can communicate.

BRIEF DESCRIPTION OF THE DRAWINGS

FIG. 1 illustrates a diagram showing one example of a processing system.

FIG. 17 illustrates a flow chart showing one example of an operation of the electronic apparatus.

FIG. 22 illustrates a flow chart showing one example of an operation of the electronic apparatus.

FIG. 31 illustrates a drawing showing one example of schedule information.

FIG. 32 illustrates a flow chart showing one example of an operation of the electronic apparatus.

DETAILED DESCRIPTION

Figure 2:
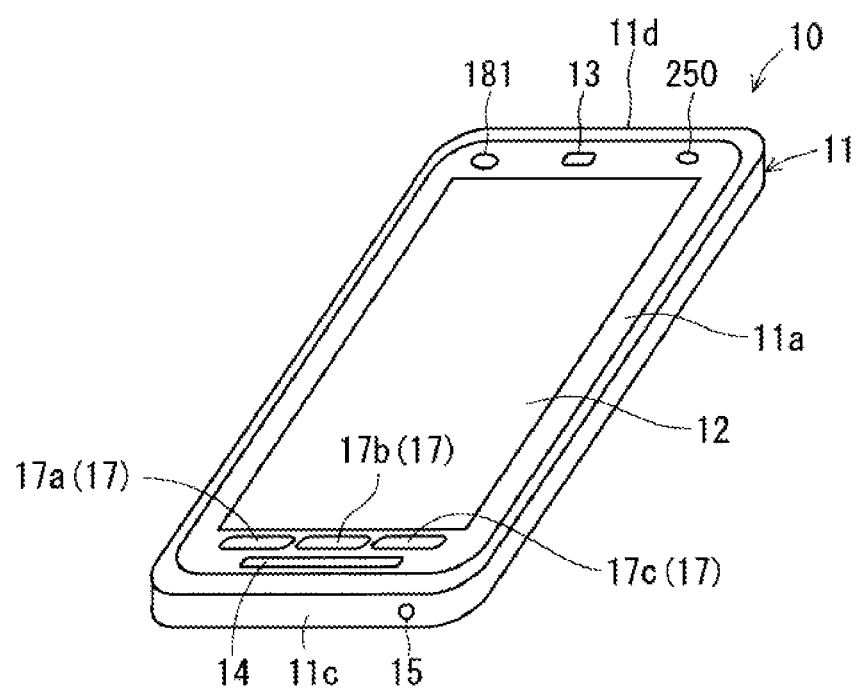
FIG. 2 illustrates a perspective view showing one example of an external appearance of an electronic apparatus.

<Outline of One Example of Processing System>

FIG. 1 is a diagram illustrating one example of a configuration of a processing system 1. As illustrated in FIG. 1, the processing system 1 comprises a plurality of electronic apparatuses 10 and a server device 50 connected to a network 2. The plurality of electronic apparatuses 10 and the server device 50 can communicate with each other via the network 2.

The network 2 comprises at least one of a wireless network and a wired network. In the present example, the network 2 comprises a network of a mobile phone system including a base station, a wireless local area network (LAN), and Internet, for example.

Each electronic apparatus 10 can transmit information relating to the electronic apparatus 10 itself to the server device 50. The information relating to the electronic apparatus 10 is referred to as "apparatus information" hereinafter. When an operation of the electronic apparatus 10 is described, a "subject device" indicates the electronic apparatus 10 itself, and a "subject device user" indicates a user of the electronic apparatus 10. When an operation of the electronic apparatus 10 is described, the electronic apparatus 10 which is the other side device with which the electronic apparatus 10 communicates is referred to as the "other side apparatus 10" in some cases. The user of the other side apparatus 10 is referred to as "the other side user" in some cases. The plurality of electronic apparatuses 10 connected to the network 2 include a mobile phone such as a smartphone, a tablet terminal, a personal computer, and a wearable apparatus, for example. The wearable apparatus included in the plurality of electronic apparatuses 10 may be an apparatus wearable on the wrist, such as a wristband apparatus and a wristwatch apparatus, an apparatus wearable on the head, such as a headband apparatus and an eyeglasses apparatus, and an apparatus wearable on the body, such as a clothing apparatus. A wristwatch type wearable apparatus is referred to as a smartwatch in some cases.

The server device 50 is a type of computer device. The server device 50 can store apparatus information transmitted from each electronic apparatus 10. In accordance with a request from an electronic apparatus 10, the server device 50 can transmit apparatus information of the other electronic apparatus 10 to the electronic apparatus 10. The electronic apparatus 10 can receive the apparatus information of the other electronic apparatus 10 from the server device 50 to perform a process based on the received apparatus information.

Details of the processing system 1 are described hereinafter. Mainly described hereinafter as an example is the processing system 1 in a case where the electronic apparatus 10 is a mobile phone.

<One Example of Configuration of Electronic Apparatus>
<One Example of External Appearance of Electronic Apparatus>

Figure 3:
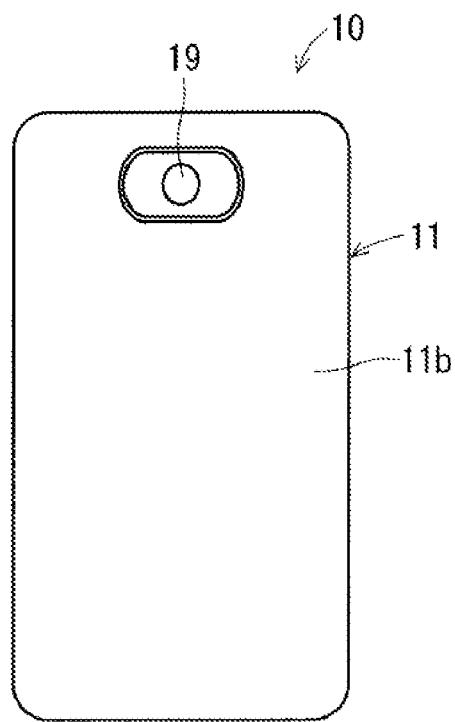
FIG. 3 illustrates a rear view showing one example of the external appearance of the electronic apparatus.
Figure 4:
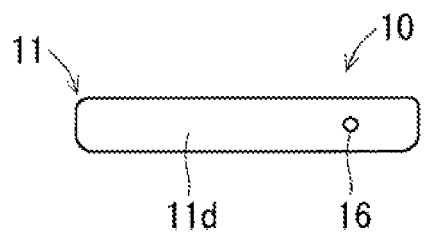
FIG. 4 illustrates a side view showing one example of the external appearance of the electronic apparatus.

FIGS. 2 to 4 are a perspective view, a rear view, and a side view illustrating one example of an external appearance of the electronic apparatus 10 which is a mobile phone, respectively. FIG. 4 illustrates the electronic apparatus 10 in FIG. 2 shown from a side surface 11d on an upper side thereof. As shown in FIGS. 2 to 4, the electronic apparatus 10 comprises an apparatus case 11 having a plate shape substantially rectangular in a plan view. The apparatus case 11 constitutes an exterior of the electronic apparatus 10.

A display surface 12, in which various types of information such as characters, symbols, and graphics are displayed, is located in a front surface 11a of the apparatus case 11. A touch panel 130, which will be described below, is located in a back surface side of the display surface 12. Accordingly, a user can input various types of information to the electronic apparatus 10 by operating the display surface 12 in a front surface of the electronic apparatus 10 with his/her finger, for example. The user can also input the various types of information to the electronic apparatus 10 by operating the display surface 12 with a pen for the touch panel such as a stylus pen, for example, instead of an operator such as his/her finger.

A receiver hole 13 and a light-emitting unit 250 are located in an upper end of the front surface 11a of the apparatus case 11. The light-emitting unit 250 comprises a light-emitting diode (LED), for example. A speaker hole 14 is located in a lower end of the front surface 11a of the apparatus case 11. A first microphone hole 15 is located in a side surface 11c in a lower side of the apparatus case 11. As illustrated in FIG. 4, a second microphone hole 16 is located in a side surface 11d in an upper side of the apparatus case 11.

A lens 181 included in a first camera 180, which will be described below, can be visually recognized from the upper end of the front surface 11a of the apparatus case 11. As illustrated in FIG. 3, a lens 191 included in a second camera 190, which will be described below, can be visually recognized from an upper end of a back surface 11b of the apparatus case 11.

The electronic apparatus 10 comprises an operation button group 170 including a plurality of operation buttons 17 (refer to FIG. 5 described below). Each of the plurality of operation buttons 17 is a hardware button. Specifically, each of the plurality of the operation buttons 17 is a press button. At least one operation button 17 included in the operation button group 170 may also be a software button displayed in the display surface 12.

The operation button group 170 includes operation buttons 17a, 17b, and 17c located in the lower end of the front surface 11a of the apparatus case 11. The operation button group 170 may include a power button and a volume button.

The operation button 17a is a back button, for example. The back button is an operation button for switching the display in the display surface 12 to the immediately preceding display. The user operates the operation button 17a to switch the display in the display surface 12 to the immediately preceding display. The operation button 17b is a home button, for example. The home button is an operation button for displaying the home screen in the display surface 12. The user operates the operation button 17b to display the home screen in the display surface 12. The operation button 17c is a history button, for example. The history button is an operation button to display a history of an application executed by the electronic apparatus 10 in the display surface 12. When the user operates the operation button 17c, the history of the application executed by the electronic apparatus 10 is displayed in the display surface 12.

<One Example of Electrical Configuration of Electronic Apparatus>

Figure 5:
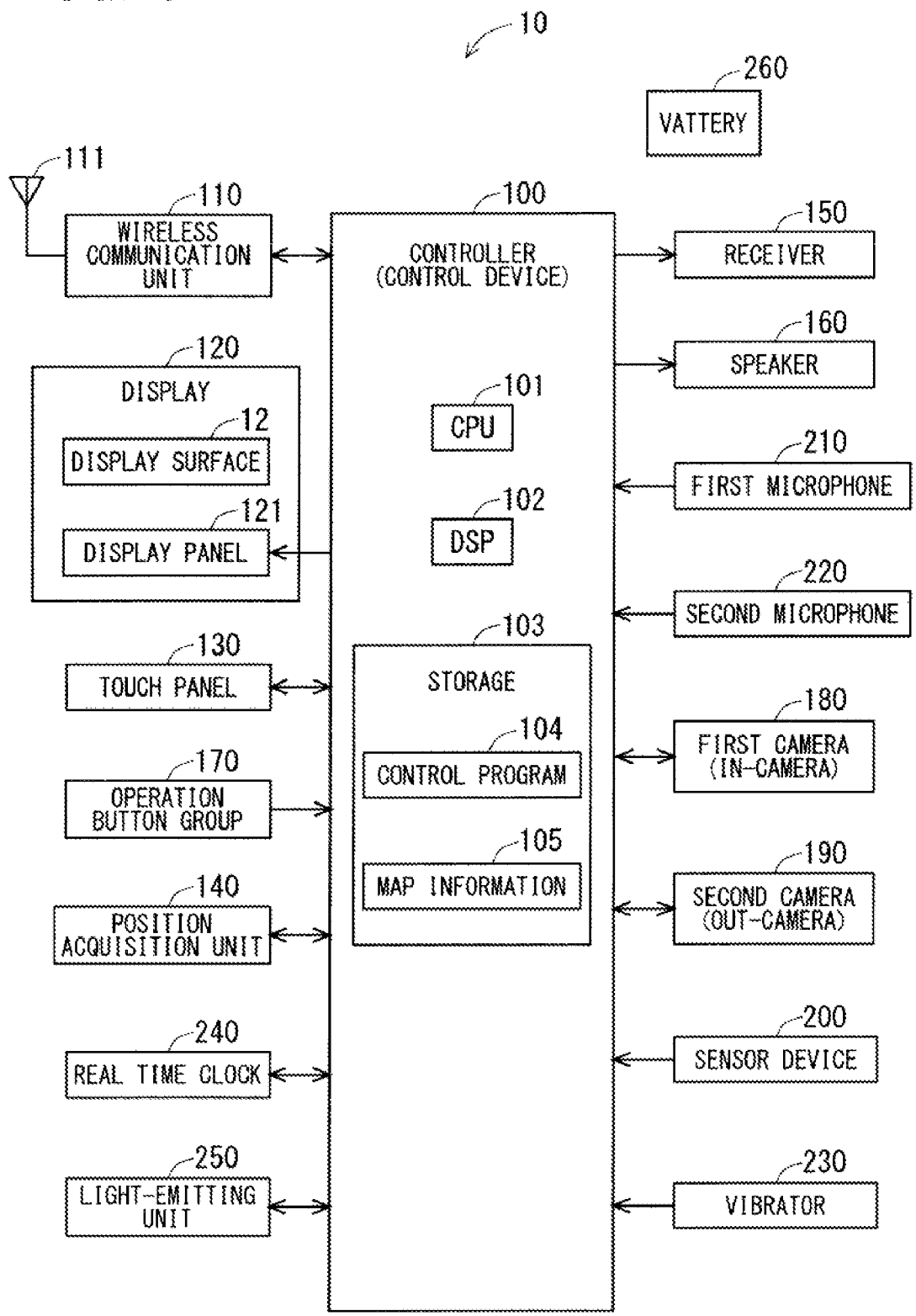
FIG. 5 illustrates a block drawing showing one example of a configuration of the electronic apparatus.

FIG. 5 is a block diagram showing one example of an electrical configuration of the electronic apparatus 10 illustrated in FIGS. 2 to 4. As illustrated in FIG. 5, the electronic apparatus 10 comprises a controller 100, a wireless communication unit 110, a display 120, the touch panel 130, the operation button group 170, a position acquisition unit 140, a real time clock 240, and the light-emitting unit 250, for example. The electronic apparatus 10 further comprises a receiver 150, a speaker 160, a first microphone 210, a second microphone 220 for noise cancellation, the first camera 180, the second camera 190, a sensor device 200, a vibrator 230, and a battery 260. The apparatus case 11 houses these components included in the electronic apparatus 10.

The controller 100 controls the other components of an electronic apparatus 10 to be able to collectively manage the operation of the electronic apparatus 10. The controller 100 is also considered as a control device or a control circuit. The controller 100 comprises at least one processor for providing control and processing capability to execute various functions as described in detail below.

In accordance with various embodiments, the at least one processor may be implemented as a single integrated circuit (IC) or as multiple communicatively coupled IC's and/or discrete circuits. The at least one processor can be executed in accordance with various known techniques.

In one embodiment, the processor comprises one or more circuits or units configurable to perform one or more data computing procedures or processes by executing instructions stored in an associated memory, for example. In the other embodiment, the processor may be firmware configurable to perform one or more data computing procedures or processes (a discrete logic component, for example).

In accordance with various embodiments, the processor may include one or more processors, controllers, microprocessors, microcontrollers, application specific integrated circuits (ASICs), digital signal processors, programmable logic devices, field programmable gate arrays, or any combination of these devices or structures, or other known devices and structures, to perform the functions described herein.

In the present example, the controller 100 comprises a central processing unit (CPU) 101, a digital signal processor (DSP) 102, and a storage 103. The storage 103 includes a non-transitory recording medium readable by the CPU 101 and the DSP 102 such as a read only memory (ROM) and a random access memory (RAM). The ROM of the storage 103 is, for example, a flash ROM (flash memory) that is a non-volatile memory. The storage 103 stores a plurality of control programs 104 etc. to control map information 105 and the electronic apparatus 10. The map information 105 includes road information and facility information, for example. The CPU 101 and the DSP 102 execute the various control programs 104 in the storage 103 to achieve various functions of the controller 100.

The plurality of control programs 104 in the storage 103 include various applications (that is to say, application programs). The storage 103 stores, for example, a call application (in other words, telephone application), a browser, a schedule management application, a camera application, a still image display application, a video reproduction application, a music reproduction application, and a message communication application, for example.

The call application is an application for the electronic apparatus 10 to perform a telephone communication using the wireless communication unit 110, the receiver 150, and the first microphone 210, for example. The call application is considered as an application for the user to make a voice call, using the electronic apparatus 10, with a user of the other electronic apparatus 10. The telephone communication includes a conventional type communication form using a telephone circuit and a communication form using Internet which is referred to as an internet protocol (IP) telephone communication. The call application for performing the conventional type communication using the telephone circuit is referred to as "the conventional type call application" in some cases. The call application for performing the IP telephone communication is referred to as "the IP telephone application" in some cases.

The storage 103 may store a plural types of call application. The plural types of call application in the storage 103 may include at least one type of conventional type call application or at least one type of IP telephone application.

The browser is an application for the electronic apparatus 10 to display a website. The schedule management application is an application for registering schedule information in the electronic apparatus 10. The camera application is an application for the electronic apparatus 10 to take an image of an object using the first camera 180 and the second cameral 190. The still image display application is an application for the electronic apparatus 10 to display a still image in the storage 103. The video reproduction application is an application for the electronic apparatus 10 to reproduce and display a video in the storage 103. The music reproduction application is an application for the electronic apparatus 10 to reproduce and output a music in the storage 103.

The message communication application is an application for the electronic apparatus 10 to perform a message communication using the wireless communication unit 110, for example. The message communication includes a communication form in which a message transmitted from a transmitting side is temporarily stored in a server device and a receiving side retrieves the message from the server device. This communication form is referred to as "the e-mail communication" in some cases. The message communication also includes a communication form in which the receiving side can immediately receive the message transmitted from the transmitting side without retrieving the message from the server device. This communication form is referred to as "the instant message communication" in some cases. The message communication application for achieving the e-mail communication is referred to as "the e-mail application" in some cases. The message communication application for achieving the instant message communication is referred to as "the IM application" in some cases. The IM application is referred to as "the instant messenger" in some cases.

The storage 103 may store a plural types of message communication application. The plural types of message communication application in the storage 103 may include at least one type of e-mail application or at least one type of IM application.

The storage 103 may store at least one application in the storage 103 in advance. The electronic apparatus 10 may download the at least one application in the storage 103 from the other device and store it in the storage 103.

The configuration of the controller 100 is not limited to the example described above. For example, the controller 100 may comprise a plurality of CPUs 101. It is also applicable that the controller 100 does not comprise the DSP 102 or comprises a plurality of DSPs 102. All or some of the functions of the controller 100 may be achieved by a hardware circuit that needs no software to achieve the functions above. The storage 103 may comprise a non-transitory computer readable recording medium other than the ROM and the RAM. The storage 103 may comprise, for example, a compact hard disk drive and a solid state drive (SSD).

The wireless communication unit 110 comprises an antenna 111. The wireless communication unit 110 can perform a wireless communication in several types of communication systems, for example, using the antenna 111. The controller 100 controls the wireless communication of the wireless communication unit 110. The wireless communication unit 110 is also referred to as the wireless communication circuit.

The wireless communication unit 110 can perform a wireless communication with a base station of a mobile phone system included in the network 2. The wireless communication unit 110 can communicate with a mobile phone different from the electronic apparatus 10 or a web server, for example, via the base station.

The wireless communication unit 110 can perform a wireless communication using a wireless LAN such as WiFi included in the network 2. The wireless communication unit 110 can perform a near field wireless communication with the other device directly without the network 2. For example, the wireless communication unit 110 can perform the wireless communication in conformity to Bluetooth (registered trademark). The wireless communication unit 110 may perform the wireless communication in conformity to at least one of ZigBee (registered trademark) and near field communication (NFC).

The wireless communication unit 110 can perform various types of processing such as amplification processing on a signal received by the antenna 111 and then outputs a resultant signal to the controller 100. The controller 100 can perform the various types of processing on the received signal which has been input, to acquire information contained in the received signal. The controller 100 outputs a transmission signal containing the information to the wireless communication unit 110. The wireless communication unit 110 can perform the various types of processing such as amplification processing on the transmission signal being has been input, and then wirelessly transmits a resultant signal from the antenna 111. As described hereinafter, the controller 100 makes the wireless communication unit 110 transmit apparatus information of the electronic apparatus 10 to the server device 50.

The display 120 comprises the display surface 12 located in the front surface of the electronic apparatus 10 and a display panel 121. The display 120 can display various types of information in the display surface 12. The display panel 121 is a liquid crystal display panel or an organic EL panel, for example. The display panel 121 can display various types of information such as characters, symbols, and graphics under control of the controller 100. The display panel 121 faces the display surface 12 in the apparatus case 11. The information displayed on the display panel 121 is displayed in the display surface 12. The display 120 is considered as a notification unit displaying the information, thereby transmitting a notification to the user.

The touch panel 130 can detect an operation performed on the display surface 12 with the operator such as the finger. The touch panel 130 is, for example, a projected capacitive touch panel. The touch panel 130 is located on a reverse side of the display surface 12, for example. When the user performs the operation on the display surface 12 with the operator such as his/her finger, the touch panel 130 can input, to the controller 100, an electrical signal corresponding to the operation. The controller 100 can specify contents of the operation performed on the display surface 12 based on the electrical signal (output signal) from the touch panel 130. The controller 100 can perform the processing corresponding to the specified operation contents.

When the user operates each operation button 17 of the operation button group 170, the operation button 17 can output to the controller 100 an operation signal indicating that the operation button 17 has been operated. The controller 100 can accordingly determine whether or not each operation button 17 has been operated for each operation button 17. The controller 100 to which the operation signal is input controls the other component, thereby causing the electronic apparatus 10 to execute the function allocated to the operated operation button 17.

The position acquisition unit 140 can acquire position information indicating a location of the electronic apparatus 10. The position acquisition unit 140 can receive a satellite signal transmitted from a positioning satellite, and acquire position information of the electronic apparatus 10 based on the received satellite signal. The position information acquired by the position acquisition unit 140 includes a latitude and a longitude indicating a location of the electronic apparatus 10, for example. The position acquisition unit 140 is considered as a position acquisition circuit.

The position acquisition unit 140 is a GPS (global positioning system) receiver, for example, and can receive a wireless signal from the positioning satellite of a GPS. The position acquisition unit 140 calculates a current location of the electronic apparatus 10 with a latitude and a longitude, for example, based on the received wireless signal, and outputs the position information including the calculated latitude and longitude to the controller 100. The position information of the electronic apparatus 10 is also considered as position information of the user holding the electronic apparatus 10. The position information acquired in the position acquisition unit 140 is referred to as "the GPS position information" in some cases hereinafter.

The user operates the display surface 12, for example, thereby being able to make the electronic apparatus 10 operate the position acquisition unit 140 and suspend the operation of the position acquisition unit 140. The controller 100 can specify an instruction from the user based on a detection result of the touch panel 130, and can operate the position acquisition unit 140 and suspend the operation of the position acquisition unit 140 in accordance with the instruction. In other words, the controller 100 can execute and suspend the function of acquiring the GPS position information in accordance with the instruction from the user.

The position acquisition unit 140 may acquire the position information of the electronic apparatus 10 based on the signal transmitted by the positioning satellite of global navigation satellite system (GNSS) other than GPS. For example, the position acquisition unit 140 may acquire the position information of the electronic apparatus 10 based on a signal transmitted from a positioning satellite of global navigation satellite system (GLONASS), Indian regional navigational satellite system (IRNSS), COMPASS, Galileo, or quasi-zenith satellites system (QZSS). The position information of the electronic apparatus 10 is referred to as "apparatus position information" in some cases hereinafter.

It is also applicable that the electronic apparatus 10 does not comprise the position acquisition unit 140. In this case, the electronic apparatus 10 may have a wireless or wired connection with the position acquisition unit 140 separated from the electronic apparatus 10.

Each of the first microphone 210 and the second microphone 220 can convert a sound being input from outside of the electronic apparatus 10 into an electrical sound signal and then output the electrical sound signal to the controller 100. The sound from the outside of the electronic apparatus 10 is taken inside the electronic apparatus 10 through the first microphone hole 15 and input to the first microphone 210. The sound from the outside of the electronic apparatus 10 is taken inside the electronic apparatus 10 through the second microphone hole 16 and input to the second microphone 220.

The speaker 160 is, for example, a dynamic speaker. The speaker 160 can convert an electrical sound signal from the controller 100 into a sound and then output the sound. The sound being output from the speaker 160 is output outside through the speaker hole 14. The user can hear the sound being output from the speaker hole 14 in a place apart from the electronic apparatus 10. The speaker 160 is considered as a notification unit outputting the sound, thereby transmitting a notification to the user.

The receiver 150 can output a received sound. The receiver 150 is, for example, a dynamic speaker. The receiver 150 can convert an electrical sound signal from the controller 100 into a sound and then output the sound. The sound being output from the receiver 150 is output outside through the receiver hole 13. A volume of the sound being output through the receiver hole 13 is set to be smaller than a volume of the sound being output through the speaker hole 14. The user brings the receiver hole 13 close to his/her ear, thereby being able to hear the sound being output through the receiver hole 13. The receiver 150 is considered as a notification unit outputting the sound, thereby transmitting a notification to the user. A vibration element such as a piezoelectric vibration element for causing a portion of the front surface of the apparatus case 11 to vibrate may be provided instead of the receiver 150. In this case, the sound is transferred to the user in a form of the vibration of the portion of the front surface.

The first camera 180 comprises the lens 181, an image sensor, and so on. The second camera 190 comprises the lens 191, an image sensor, and so on. Each of the first camera 180 and the second camera 190 can take an image of an object under control of the controller 100, generate a still image or a video of the object, and then output the still image or the video to the controller 100.

The lens 181 of the first camera 180 can be visually recognized from the front surface 11a of the apparatus case 11. Accordingly, the first camera 180 can take an image of an object located on a side of the front surface (a side of the display surface 12) of the electronic apparatus 10. The first camera 180 is referred to as an in-camera. In the meanwhile, the lens 191 of the second camera 190 can be visually recognized from the back surface 11b of the apparatus case 11. Accordingly, the second camera 190 can take an image of an object located on a back surface side of the electronic apparatus 10. The second camera 190 is referred to as an out-camera.

The sensor device 200 comprises at least one sensor. In the present example, the sensor device 200 comprises an accelerometer, an atmospheric pressure sensor, a geomagnetic sensor, and a gyro sensor, for example. The accelerometer is a triaxial accelerometer which can detect an acceleration of the electronic apparatus 10, for example. The accelerometer can detect an acceleration in an x axis direction, a y axis direction, and a z axis direction set in the electronic apparatus 10. The x axis direction, the y axis direction, and the z axis direction are set to a longitudinal direction, a short-side direction, and a thickness direction of the electronic apparatus 10, respectively, for example. The atmospheric pressure sensor can detect an atmospheric pressure around the electronic apparatus 10. The geomagnetic sensor is a triaxial geomagnetic sensor which can detect a magnetic field (also referred to as a magnetizing field) around the electronic apparatus 10, for example. The geomagnetic sensor can detect the magnetic field in the x axis direction, the y axis direction, and the z axis direction set in the electronic apparatus 10. The gyro sensor is a triaxial gyro sensor which can detect an angular velocity of the electronic apparatus 10, for example. The gyro sensor can detect an angular velocity around the x axis direction, the y axis direction, and the z axis direction set in the electronic apparatus 10.

The sensor device 200 needs not comprise at least one of the accelerometer, the atmospheric pressure sensor, the geomagnetic sensor, and the gyro sensor. In this case, the electronic apparatus 10 may have a wireless or wired connection with the at least one of the sensors separated from the electronic apparatus 10. The sensor device 200 may comprise a sensor other than the accelerometer, the atmospheric pressure sensor, the geomagnetic sensor, and the gyro sensor. For example, the sensor device 200 may comprise at least one of a proximity sensor, an illuminance sensor, and a temperature sensor. The electronic apparatus 10 may have a wireless or wired connection with a sensor other than the accelerometer, the atmospheric pressure sensor, the geomagnetic sensor, and the gyro sensor separated from the electronic apparatus 10.

The real time clock 240 measures a current time and transmits a notification thereof to the controller 100. The light-emitting unit 250 can emit light toward outside of the electronic apparatus 10. The controller 100 can control the light emission of the light-emitting unit 250. The display 250 is considered as a notification unit emitting the light, thereby transmitting a notification to the user.

The vibrator 230 can vibrate the electronic apparatus 10. Specifically, the vibrator 230 can vibrate the apparatus case 11 under control the controller 100. The vibrator 230 vibrates the apparatus case 11, thereby being able to transmit a notification to the user holding the electronic apparatus 10. The vibrator 230 comprises an eccentric motor, for example. The vibrator 230 is considered as a notification unit vibrating the apparatus case 11, thereby transmitting a notification to the user.

The battery 260 is, for example, a rechargeable battery. The battery 260 can supply the power source to various components such as the controller 100 and the wireless communication unit 110 included in the electronic apparatus 10.

<Configuration Example of Server Device>

Figure 6:
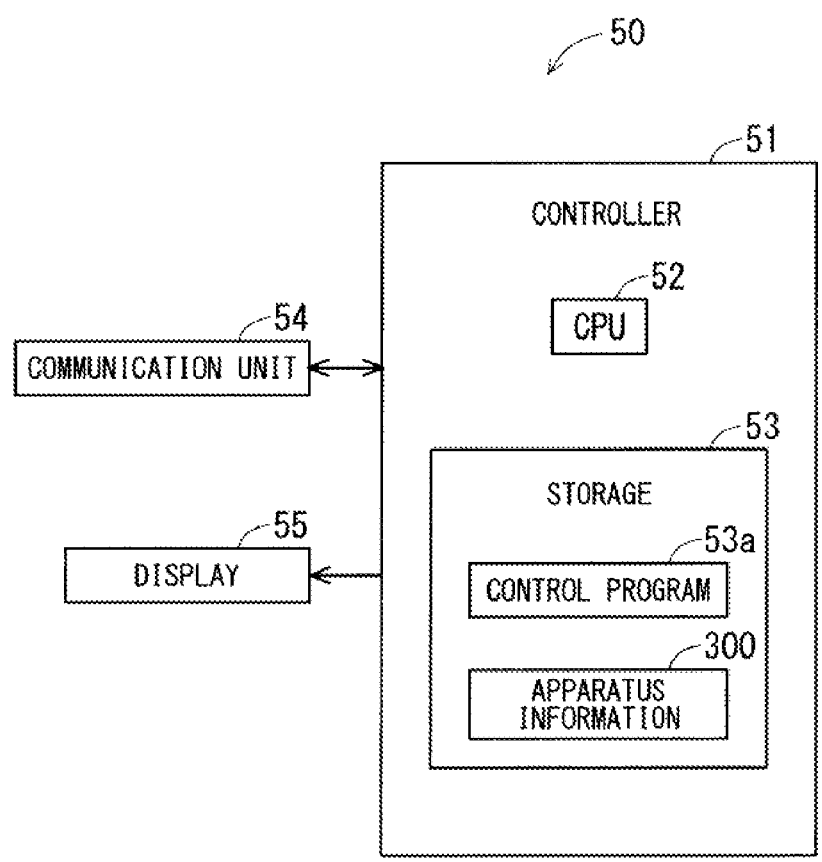
FIG. 6 illustrates a block diagram showing one example of a configuration of a server device.

FIG. 6 is a drawing illustrating one example a configuration of the server device 50. As illustrated in FIG. 6, the server device 50 comprises a controller 51, a communication unit 54 connected to the network 2, and a display 55, for example.

The display 55 is a liquid crystal display panel or an organic EL panel, for example. The display 55 can display various types of information such as characters, symbols, and graphics under control of the controller 51.

The controller 51 controls the other components of the server device 50, thereby being able to collectively manage the operation of the server device 50. The controller 51 is also considered as a control device or a control circuit. The controller 51 comprises at least one processor for providing control and processing capability to execute various functions as described in more detail below. The above description of the processor included in the controller 100 of the electronic apparatus 10 also falls under the processor included in the controller 51.

In the present example, the controller 51 comprises a CPU 52 and a storage 53. The storage 53 comprises a non-transitory recording medium readable by the CPU 52 such as a ROM and a RAM. The ROM of the storage 53 is, for example, a flash ROM that is a non-volatile memory. The storage 53 stores a plurality of control programs 53a to control the server device 50. The storage 53 stores apparatus information 300 transmitted from the electronic apparatus 10. In the storage 103, the apparatus information 300 is managed for each electronic apparatus 10. The CPU 52 executes the various control programs 53a in the storage 53 to achieve various functions of the controller 51.

The communication unit 54 has a wired or wireless connection with the network 2. The communication unit 54 can communicate with a device such as the electronic apparatus 10 connected to the network 2 via the network 2. The communication unit 54 can input the information received from the network 2 to the controller 51. The communication unit 54 can output the information received from the controller 51 to the network 2.

A configuration of the server device 50 is not limited to the example in FIG. 6. For example, the controller 51 may comprise a plurality of CPUs 52. The controller 51 may comprise at least one DSP. All or some of the functions of the controller 51 may be achieved by a hardware circuit that needs no software to achieve the functions above.

The storage 53 may include a non-transitory computer readable recording medium other than the ROM and the RAM. The storage 53 may comprise, for example, a compact hard disk drive and an SSD. The storage 53 may store at least one control program 53a in the storage 53 in advance. The server device 50 may download the at least one control program 53a in the storage 53 from the other device and store it in the storage 53.

The server device 50 may comprise a configuration other than the controller 51, the communication unit 54, and the display 55. The server device 50 may comprise an input device, such as a touch panel, for example, for the user to input the information to the server device 50.

<Example of Display of Electronic Apparatus>

Figure 7:
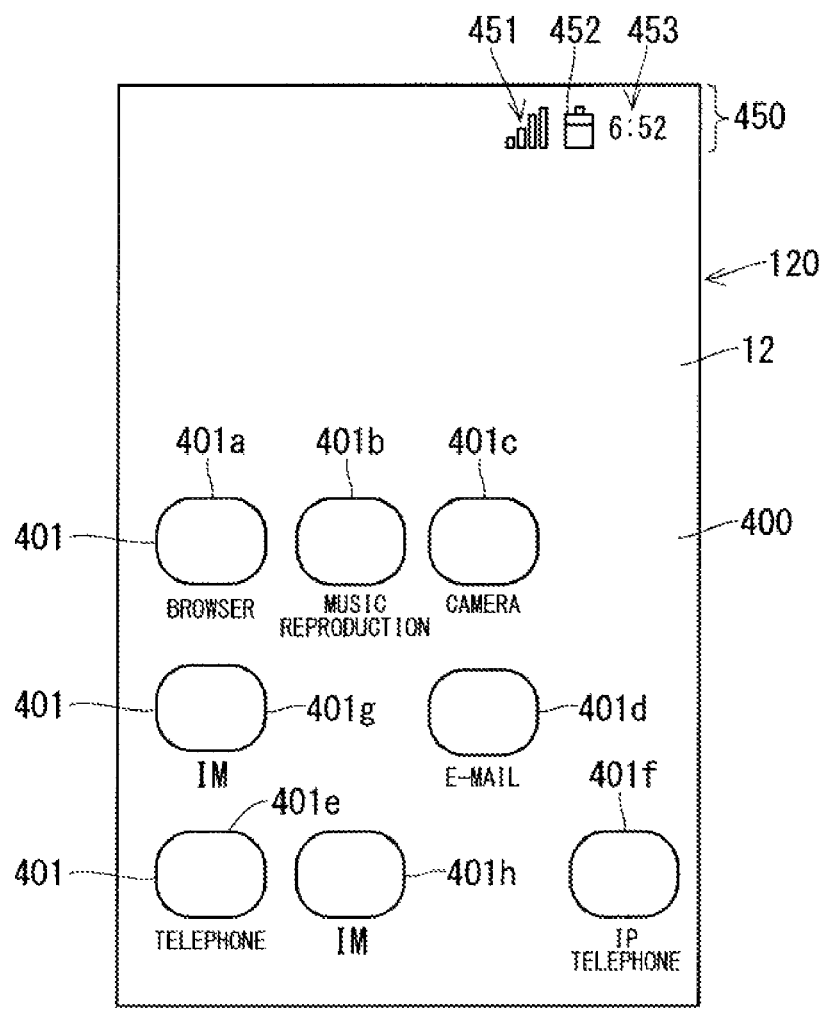
FIG. 7 illustrates a drawing showing one example of a display of the electronic apparatus.

FIG. 7 is a drawing illustrating one example of the display of the electronic apparatus 10. FIG. 7 schematically illustrates one example of a home screen 400. As illustrated in FIG. 7, the home screen 400 displayed in the display surface 12 shows icons 401, corresponding to the applications in the storage 103, for instructing the electronic apparatus 1 to execute the corresponding applications.

In the example in FIG. 7, the home screen 400 includes an icon 401a corresponding to the browser, an icon 401b corresponding to the music reproduction application, an icon 401c corresponding to the camera application, and an icon 401d corresponding to the e-mail application. The home screen 400 includes an icon 401e corresponding to the conventional type call application and an icon 401f corresponding to the IP telephone application. The home screen 400 includes two icons 401g and 401h corresponding to two types of IM application provided by different companies, respectively, for example.

The user can select any of the icons 401 by performing a predetermined operation (e.g., a tap operation) on the icon 401 included in the home screen 400. The controller 100 reads, from the storage 103, an application corresponding to the selected icon 401 and executes the application. That is to say, when the touch panel 130 detects the predetermined operation performed on the icon 401, the controller 100 reads, from the storage 103, the application corresponding to the icon 401 and executes the application. The user can thus select the icon 401 by operating the icon 401 and make the electronic apparatus 10 execute the application corresponding to the selected icon 401. For example, when the user performs a tap operation on the icon 401d corresponding to the e-mail application, the e-mail application is executed in the electronic apparatus 10. When the user performs a tap operation on the icon 401e corresponding to the conventional type call application, the conventional type call application is executed in the electronic apparatus 10.

Not only the home screen 400 but also each screen displayed in the display surface 12 includes a notification region 450 for transmitting a notification of a state of the electronic apparatus 10. The notification region 450 is also referred to as a status bar. As illustrated in FIG. 7, the notification region 450 includes an icon 451 indicating a communication state of the wireless communication unit 110, an icon 452 indicating a remaining battery level of the battery 260, and an icon 453 indicating a current time acquired in the real time clock 240. When a specific event occurs in the electronic apparatus 10, information regarding the event which has occurred is indicated in the notification region 450. The information includes, for example, an icon for transmitting a notification of a receipt of a new message and an icon for transmitting a notification of an absence incoming call.

The illustration of the notification region 450 is omitted in some cases hereinafter in describing the example of the display of the electronic apparatus 10 when there is no particular relation with the notification region 450.

<Operation Example of Electronic Apparatus>
<One Example of Notification of Arrival in Electronic Apparatus>

When a transmission of a telephone communication performed by the other side apparatus 10 arrives, the electronic apparatus 10 transmits a notification of arrival (incoming call) of the telephone communication to the subject device user. When the electronic apparatus 10 receives a message transmitted with a message communication from the other side apparatus 10 (in other words, when the message arrives), the electronic apparatus 10 transmits a notification of arrival of the message communication to the subject device user. The transmission of the telephone communication is referred to as "the telephone transmission" in some cases. The notification of arrival of the telephone communication is referred to as "the telephone arrival (incoming call) notification" and the notification of arrival of the message communication is referred to as "the message arrival notification" in some cases. The arrival of the telephone communication is referred to as "the telephone arrival" in some cases.

The electronic apparatus 10 can transmit the telephone arrival notification using the display 120, the speaker 160, the vibrator 230, and the light-emitting unit 250, for example.

For example, the controller 100 makes the display 120 display a screen of the arrival notification for transmitting the notification of the telephone arrival while the telephone communication arrives (referred to as "during the telephone arrival" in some cases hereinafter), thus the electronic apparatus 10 can transmit the telephone arrival notification to the subject device user. This telephone arrival notification is referred to as "the telephone arrival notification by display" in some cases. The screen of the arrival notification is also considered as the information of the arrival notification to transmit the notification of the telephone arrival.

The controller 100 makes the speaker 160 output an arrival sound of the telephone communication during the telephone arrival, thus the electronic apparatus 10 can transmit the telephone arrival notification to the subject device user. This telephone arrival notification is referred to as "the telephone arrival notification by sound" in some cases. The arrival sound for the telephone arrival notification is referred to as "the telephone arrival (incoming call) sound" in some cases. It is considered that the electronic apparatus 10 can transmit the telephone arrival notification using the sound output.

The controller 100 makes the vibrator 230 vibrate the apparatus case 11 during the telephone arrival, thus the electronic apparatus 10 can transmit the telephone arrival notification to the subject device user. This telephone arrival notification is referred to as "the telephone arrival notification by vibration" in some cases. The vibration of the apparatus case 11 for the telephone arrival notification is referred to as "the telephone arrival vibration" in some cases. It is considered that the electronic apparatus 10 can transmit the telephone arrival notification using the vibration.

The controller 100 makes the light-emitting unit 250 emit the light during the telephone arrival, thus the electronic apparatus 10 can transmit the telephone arrival notification to the subject device user. This telephone arrival notification is referred to as "the telephone arrival notification by light emission" in some cases. The light emission of the light-emitting unit 250 for the telephone arrival notification is referred to as "the telephone arrival light emission" in some cases. It is considered that the electronic apparatus 10 can transmit the telephone arrival notification using the light emission.

In the similar manner, the electronic apparatus 10 can transmit the message arrival notification using the display 120, the speaker 160, the vibrator 230, and the light-emitting unit 250, for example. For example, the controller 100 makes the display 120 display the information for notification of a receipt of a message in the notification region 450 upon receipt of the message in the electronic apparatus 10, thus the electronic apparatus 10 can transmit the message arrival notification to the subject device user. This message arrival notification is referred to as "the message arrival notification by display" in some cases.

The controller 100 makes the speaker 160 output the arrival sound of the message communication upon receipt of the message in the electronic apparatus 10, thus the electronic apparatus 10 can transmit the message arrival notification to the subject device user. This message arrival notification is referred to as "the message arrival notification by sound" in some cases. The arrival sound for the message arrival notification is referred to as "the message arrival sound" in some cases.

The controller 100 makes the vibrator 230 vibrate the apparatus case 11 upon receipt of the message in the electronic apparatus 10, thus the electronic apparatus 10 can transmit the message arrival notification to the subject device user. This message arrival notification is referred to as "the message arrival notification by vibration" in some cases. The vibration of the apparatus case 11 for the message arrival notification is referred to as "the message arrival vibration" in some cases.

The controller 100 makes the light-emitting unit 250 emit the light upon receipt of the message in the electronic apparatus 10, thus the electronic apparatus 10 can transmit the message arrival notification to the subject device user. This message arrival notification is referred to as "the message arrival notification by light emission" in some cases. The light emission of the light-emitting unit 250 for the message arrival notification is referred to as "the message arrival light emission" in some cases.

The user operates the display surface 12, for example, thereby being able to make a setting regarding the telephone arrival notification on the electronic apparatus 10. For example, the user can make a setting regarding the telephone arrival notification whether or not to execute the telephone arrival notification by sound, whether or not to execute the telephone arrival notification by vibration, and whether or not to execute the telephone arrival notification by light emission on the electronic apparatus 10. The user can set a sound volume of the telephone arrival sound on the electronic apparatus 10. The user can set a magnitude of the telephone arrival vibration on the electronic apparatus 10. The magnitude of the vibration is expressed by an acceleration of vibration, for example. The user can set a luminance of the telephone arrival light emission on the electronic apparatus 10. The electronic apparatus 10 basically transmits the telephone arrival notification in accordance with the setting regarding the telephone arrival notification in the subject device. However, the other electronic apparatus 10 controls the telephone arrival notification of the electronic apparatus 10 as described hereinafter.

In the similar manner, the user operates the display surface 12, for example, thereby being able to make a setting regarding the message arrival notification on the electronic apparatus 10. For example, the user can make a setting regarding the message arrival notification whether or not to execute the message arrival notification by sound, whether or not to execute the message arrival notification by vibration, and whether or not to execute the message arrival notification by light emission on the electronic apparatus 10. The user can set a sound volume of the message arrival sound on the electronic apparatus 10. The user can set a magnitude of the message arrival vibration on the electronic apparatus 10. The user can set a luminance of the message arrival light emission on the electronic apparatus 10. The electronic apparatus 10 basically transmits the message arrival notification in accordance with the setting regarding the message arrival notification in the subject device. However, the other electronic apparatus 10 controls the message arrival notification of the electronic apparatus 10 as described hereinafter.

<One Example of Noise Cancellation Function>

The electronic apparatus 10 has a noise cancellation function of removing a noise contained in a sound caught by the first microphone 210 based on a sound caught by the second microphone 220. During the execution of the noise cancellation function, for example, the controller 100 overlaps a signal with an opposite phase of an output signal of the second microphone 220 with an output signal of the first microphone 210, thereby removing the noise contained in the output signal of the first microphone 210. The noise cancellation function is executed during the telephone communication, for example. When the electronic apparatus 1 performs the telephone communication, a mouth of the user is located in a location close to the first microphone hole 15 and away from the second microphone hole 16. Accordingly, the first microphone 210 sufficiently catches a voice of the user, and the second microphone 220 hardly catches the voice of the user. Thus, the signal with the opposite phase of the output signal of the second microphone 220 is overlapped with the output signal of the first microphone 210, thus the noise contained in the output signal of the first microphone 210 can be removed. The other method may be applied as the method of removing the noise contained in the output signal of the first microphone 210 based on the output signal of the second microphone 220.

The user operates the display surface 12, for example, thereby being able to make a setting whether or not to execute the noise cancellation function during the telephone communication on the electronic apparatus 10. This setting is referred to as "the noise cancellation setting" in some cases hereinafter. The electronic apparatus 10 basically executes the noise cancellation function in accordance with the noise cancellation setting in the subject device during the telephone communication. However, the other electronic apparatus 10 controls whether or not the electronic apparatus 10 executes the noise cancellation function during the telephone communication in some cases as described hereinafter.

<Transmission of Apparatus Information>

In the present example, the controller 100 of the electronic apparatus 10 can generate apparatus information of the subject device, and makes the wireless communication unit 110 transmit the generated apparatus information to the server device 50.

In the electronic apparatus 10, the controller 100 makes the wireless communication unit 110 transmit latest apparatus information to the server device 50 at regular intervals, for example. The controller 100 may make the wireless communication unit 110 transmit the apparatus information to the server device 50 every time a change occurs in information included in the apparatus information. The controller 100 may make the wireless communication unit 110 transmit the latest apparatus information to the server device 50 every time a transmission of the apparatus information is requested by the server device 50. The electronic apparatus 10 transmits the apparatus information of the subject device together with identification information of the subject device. A phone number allocated to the electronic apparatus 10, for example, may be adopted as the identification information.

In the server device 50, when the communication unit 54 acquires the apparatus information and the identification information of the electronic apparatus 10, the controller 51 stores the acquired apparatus information and identification information in association with each other in the storage 53. At this time, when the storage 53 stores earlier apparatus information corresponding to the received identification information, the controller 51 stores the received apparatus information in place of the earlier apparatus information in the storage 53. Accordingly, the latest apparatus information for each electronic apparatus 10 is stored in the storage 53.

In the present example, the apparatus information includes position information of the electronic apparatus 10, that is to say, apparatus position information. For example, the apparatus information includes GPS position information acquired in the position acquisition unit 140. The apparatus information may include information other than the apparatus position information, or the apparatus information may be made up only of the apparatus position information.

The apparatus information may include the position information whose type is different from the GPS position information. For example, the apparatus information may include not the position information for specifying the location of the electronic apparatus 10 with a latitude and a longitude, such as the GPS position information, but the position information for specifying the location of the electronic apparatus 10 with a name of a location where the electronic apparatus 10 is located. In this case, when the electronic apparatus 10 is located in a movie theater, for example, the apparatus information includes the position information indicating that the electronic apparatus 10 is located in the movie theater. When the electronic apparatus 10 is located in a factory, the apparatus information includes the position information indicating that the electronic apparatus 10 is located in the factory. The controller 100 can specify the name of the location where the electronic apparatus 10 is located based on the GPS position information and map information 105 in the storage 103.

When the electronic apparatus 10 cannot acquire the GPS position information by reason that the subject device is located underground or the operation of the position acquisition unit 140 is suspended, the electronic apparatus 10 may acquire the apparatus position information using the other method.

For example, the electronic apparatus 10 may use position information of the base station in the network 2 with which the subject device communicates as apparatus position information. This apparatus position information is referred to as "apparatus position information based on communication base station" in some cases hereinafter. The electronic apparatus 10 can acquire the position information of a base station from the base station while the electronic apparatus 10 communicates with the base station.

The electronic apparatus 10 may use position information in beacon information transmitted from a beacon transmission device installed in a facility, for example, as the apparatus position information. This apparatus position information is referred to as "apparatus position information based on beacon information" in some cases hereinafter. The beacon information received by the wireless communication unit 110 includes position information of the beacon transmission device which transmits the beacon information.

The electronic apparatus 10 may use position information in augmented reality (AR) tag information acquired from an AR tag disposed in a facility, for example, as the apparatus position information. This apparatus position information is referred to as "apparatus position information based on AR tag" in some cases hereinafter. The electronic apparatus 10 photographs the AR tag with the first camera 180 or the second camera 190, thereby being able to acquire the AR tag information from the AR tag. The AR tag information acquired from the AR tag includes position information of the AR tag.

When the electronic apparatus 10 includes an IC card function by which a train fare can be paid at an automatic ticket gate, it can be specified by the IC card function which location the subject device is located, inside or outside the ticket gate in a station. In such a case, the electronic apparatus 10 may use the information indicating which location the subject device is located, inside or outside the ticket gate in the station, as the apparatus position information.

When the electronic apparatus 10 cannot newly acquire the GPS position information, the electronic apparatus 10 may generate position information indicating a predicted location of the subject device based on the GPS position information which has been acquired most recently and the information regarding the movement of the subject device, and include this position information in the apparatus information as the apparatus position information. A movement direction and movement distance of the electronic apparatus 10, for example, is adopted as the information regarding the movement of the electronic apparatus 10. For example, the controller 100 specifies the movement direction and movement distance in which the subject device has moved from a location indicated by the GPS position information which has been acquired by the subject device most recently based on a detection result of an accelerometer and gyro sensor included in the sensor device 200. Then, the controller 100 generates the position information indicating a current predicted location of the subject device based on the location indicated by the GPS position information which has been acquired by the subject device most recently and the specified movement direction and movement distance. The electronic apparatus 10 transmits this position information as the apparatus position information.

<Operation Example of Electronic Apparatus after Activating Call Application>

In the present example, the electronic apparatus 10 can perform processing based on the apparatus information of the other side apparatus 10 in response to a transmission instruction from the subject device user regarding the telephone communication with the other side apparatus 10 after activating the call application. The user can use such an electronic apparatus 10, thus convenience of the electronic apparatus 10 is increased.

Figure 8:
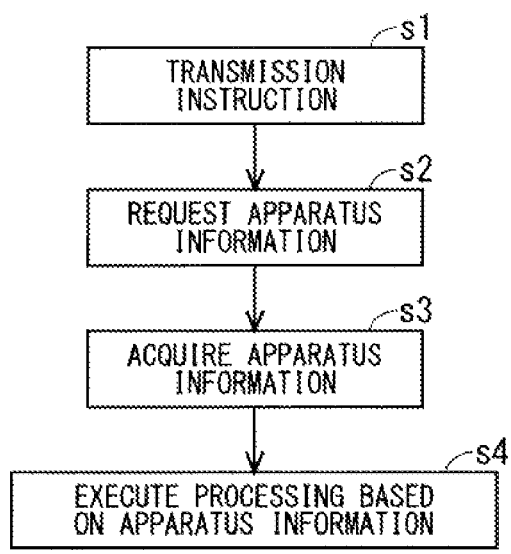
FIG. 8 illustrates a flow chart showing one example of an operation of the electronic apparatus.

FIG. 8 is a flow chart illustrating one example of the operation of the electronic apparatus 10 after activating the call application. When the touch panel 130 detects the tap operation on the icon 401e or the icon 401f described above, the controller 100 of the electronic apparatus 10 retrieves the call application corresponding to the icon 401 on which the tap operation has been performed from the storage 103 and executes it. The call application is thereby activated.

After activating the call application, in Step s1, when the controller 100 specifies that the transmission instruction from the subject device user regarding the telephone communication with the other side apparatus 10 is input to the subject device based on the output signal from the touch panel 130, the controller 100 executes Step s2.

The simple term of "the transmission instruction" means the transmission instruction regarding the telephone communication hereinafter. The other side apparatus 10 in a case where the transmission instruction regarding the telephone communication with the other side apparatus 10 is input to the electronic apparatus 10 is referred to as "the target other side apparatus 10" in some cases. The user of the target other side apparatus 10 is referred to as "the target other side user" in some cases. The electronic apparatus 10 to which the transmission instruction is input is referred to as "the transmission instruction receiving apparatus 10" or "the instruction receiving apparatus 10" in some cases.

Figure 9:
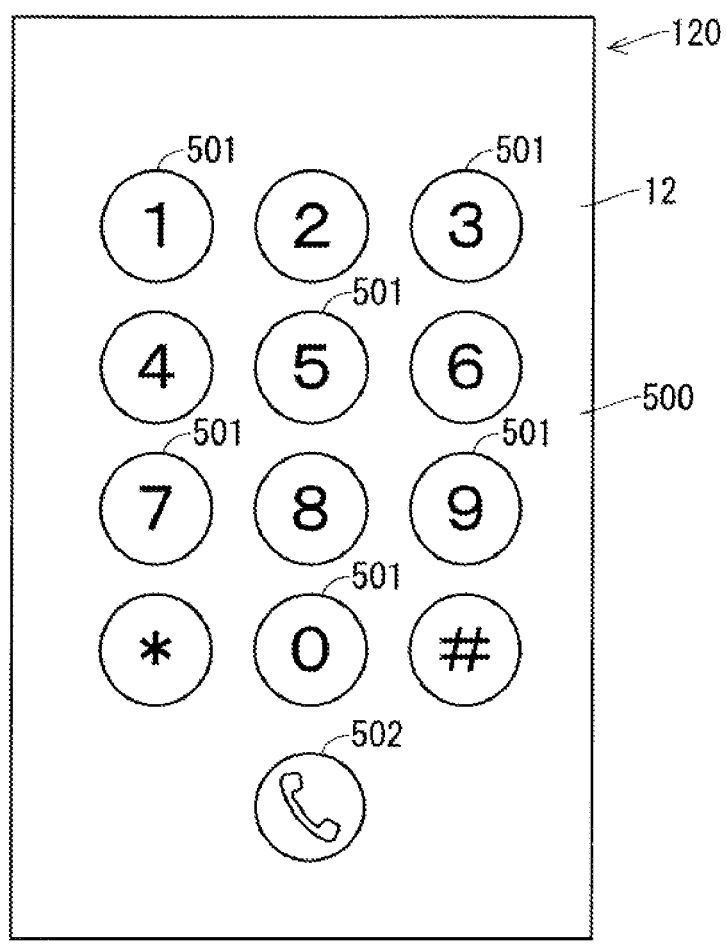
FIG. 9 illustrates a drawing showing one example of a display of the electronic apparatus.

FIG. 9 is a drawing illustrating one example of the display during the execution of the call application. FIG. 9 illustrates one example of the display during the execution of the conventional type call application. FIG. 9 illustrates one example of an input screen 500 for inputting a phone number allocated to the other side apparatus 10 in the telephone communication. The input screen 500 is referred to as a dial pad or a key pad in some cases.

As illustrated in FIG. 9, the input screen 500 includes twelve input buttons 501 for inputting a symbol such as a number. A symbol is allocated to each input button 501. When a tap operation, for example, is performed on the input button 501, the symbol allocated to the input button 501 on which the tap operation has been performed is input to the electronic apparatus 10. The user operates the plurality of input buttons 501, thereby being able to input a phone number of the other side apparatus 10 to the electronic apparatus 10.

The input screen 500 includes a transmission instruction button 502 for inputting the transmission instruction to the electronic apparatus 10. When a tap operation, for example, is performed on the transmission instruction button 502, the transmission instruction is input to the electronic apparatus 10. The user operates the transmission instruction button 502 after inputting the phone number of the other side apparatus 10 to the electronic apparatus 10, thereby being able to input the transmission instruction of the telephone communication with the other side apparatus 10 to the electronic apparatus 10.

The method of inputting the transmission instruction to the electronic apparatus 10 performed by the user is not limited to the examples described above. The user can input the transmission instruction to the electronic apparatus 10 using a telephone directory in the storage 103, for example. In this case, the user performs a predetermined operation on the display surface 12 to make the electronic apparatus 10 display the phone number of the other side apparatus 10, which is included in the telephone directory in the storage 103, in the display surface 12, for example. Then, the user performs a tap operation, for example, on the phone number of the other side apparatus 10 displayed in the display surface 12, thereby being able to input the transmission instruction of the telephone communication with the other side apparatus 10 to the electronic apparatus 10. The user may input the transmission instruction to the electronic apparatus 10 using an arrival history or a transmission history displayed in the display surface 12. The user may input the transmission instruction to the electronic apparatus 10 by inputting a predetermined sound to the first microphone 210.

In the example described above, the phone number is used as the identification information of the other side apparatus 10 used in the case where the electronic apparatus 10 performs the telephone communication with the other side apparatus 10, however, identification information other than the phone number is used in the IP telephone application in some cases.

In Step s2, the controller 100 generates a first request signal for requesting the apparatus information of the target other side apparatus 10 from the server device 50. The first request signal includes the identification information of the target other side apparatus 10. The controller 100 makes the wireless communication unit 110 transmit the first request signal to the server device 50.

In the server device 50 receiving the first request signal, the controller 51 retrieves the apparatus information corresponding to the identification information included in the first request signal from the storage 53. Then, the server device 50 transmits the retrieved apparatus information to the transmission instruction receiving apparatus 10. Accordingly, the transmission instruction receiving apparatus 10 can acquire the apparatus information of the target other side apparatus 10.

After Step s2, in Step s3, when the wireless communication unit 110 acquires the apparatus information of the target other side apparatus 10 from the server device 50, the controller 100 executes processing based on the acquired apparatus information in Step s4.

In the present example, the instruction receiving apparatus 10 does not unconditionally perform the transmission of the telephone communication in response to the transmission instruction, but performs processing corresponding to the target other side apparatus 10. In Step s4, the controller 100 performs processing based on the apparatus position information of the target other side apparatus 10 included in the apparatus information acquired by the subject device. In Step s4, the controller 100 may control the operation of the subject device based on the apparatus position information, or control the operation of the target other side apparatus 10 based on the apparatus position information.

The controller 100 may register the acquired apparatus information in the telephone directory in the storage 103. In this case, the controller 100 may register the apparatus information of the other side apparatus 10 in the telephone directory in association with the phone number of the other side apparatus 10. Accordingly, when the electronic apparatus 10 displays the telephone directory, the user can recognize the apparatus information.

Figure 10:
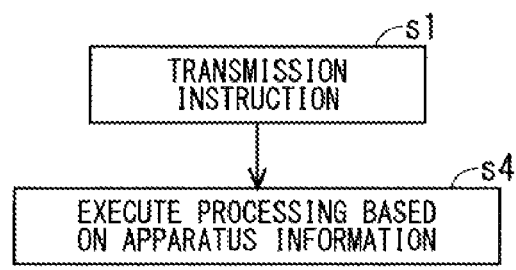
FIG. 10 illustrates a flow chart showing one example of an operation of the electronic apparatus.

In the example described above, the electronic apparatus 10 transmits the first request signal to the server device 50 based on the transmission instruction as a trigger, however, the electronic apparatus 10 may transmit the first request signal to the server device 50 based on the other condition as a trigger. For example, the electronic apparatus 10 may transmit the first request signal to the server device 50 at regular intervals. In this case, as illustrated in FIG. 10, Steps s2 and s3 are unnecessary, and executed in Step s4 is processing based on the apparatus information which has been acquired by the electronic apparatus 10 most recently.

The electronic apparatus 10 may acquire the apparatus information from the other side apparatus 10 relating to the transmission instruction without the server device 50. In this case, for example, in Step s2, the controller 100 makes the wireless communication unit 110 transmit, to the target other side apparatus 10, a second request signal for requesting the apparatus information from the target other side apparatus 10. In the instruction receiving apparatus 10, when the wireless communication unit 110 receives the second request signal, the controller 100 makes the wireless communication unit 110 transmit the apparatus information of the subject device to the other side apparatus 10. In Step s3, when the wireless communication unit 110 acquires the apparatus information of the target other side apparatus 10, the controller 100 executes processing based on the acquired apparatus information in Step s4.

The electronic apparatus 10 may transmit the second request signal to the other side apparatus 10 based on a condition different from the transmission instruction as a trigger. For example, the electronic apparatus 10 may transmit the second request signal to the other side apparatus 10 at regular intervals. In this case, as illustrated in FIG. 10 described above, Steps s2 and s3 are unnecessary, and executed in Step s4 is processing based on the apparatus information which has been acquired by the electronic apparatus 10 most recently.

It is also applicable that the electronic apparatus 10 does not transmit the apparatus information in accordance with the request of the other electronic apparatus 10, but transmits the apparatus information to the other electronic apparatus 10 by itself. For example, the electronic apparatus 10 may transmit the apparatus information of the subject device to the other electronic apparatus 10 at regular intervals. In this case, as illustrated in FIG. 10, Steps s2 and s3 are unnecessary, and in Step s4, the instruction receiving apparatus 10 performs processing based on the apparatus information which has been acquired from the other side apparatus 10 most recently.

When the electronic apparatus 10 acquires the apparatus information from the server device 50 or the other electronic apparatus 10, a wireless communication system having a large communication speed and small latency such as a wireless communication system conformable to a fifth generation mobile communication system (5G) may also be used. For example, in Steps s2 and s3 described above, the wireless communication system conformable to 5G may also be used.

In this manner, the electronic apparatus 10 according to the present example can perform the processing based on the apparatus position information of the other side apparatus 10 in response to the transmission instruction from the subject device user regarding the telephone communication with the other side apparatus 10 after activating the call application. The user can use such an electronic apparatus 10, thus the convenience of the electronic apparatus 10 is increased. Various specific examples of Step s4 are described hereinafter.

First Example

Figure 11:
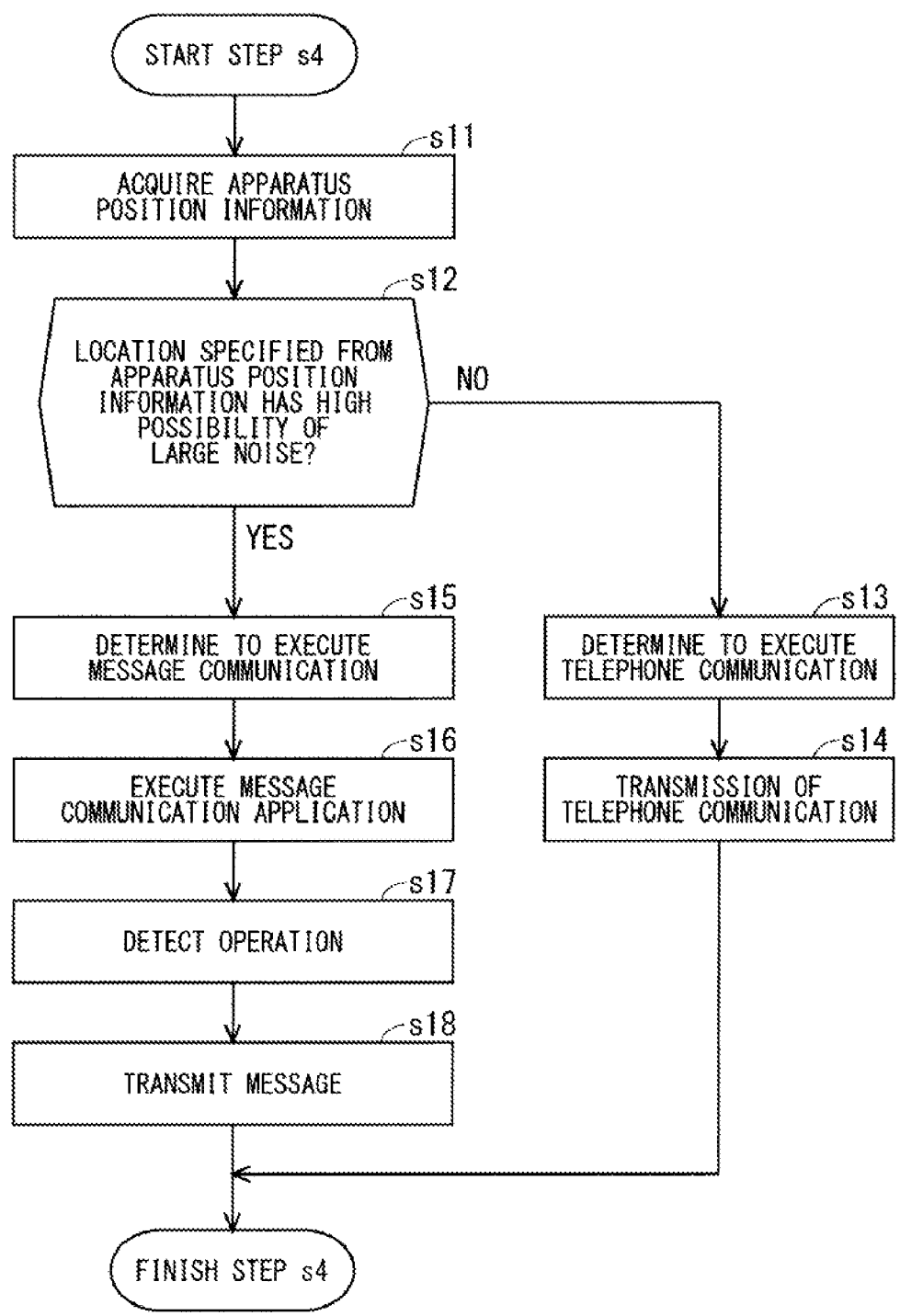
FIG. 11 illustrates a flow chart showing one example of an operation of the electronic apparatus.

In the present example, in Step s4, the controller 100 of the instruction receiving apparatus 10 performs processing corresponding to a type of a location specified from the apparatus position information of the target other side apparatus 10. FIG. 11 is a flow chart illustrating Step s4 according to the present example. In the example illustrated in FIG. 11, the controller 100 determines which to perform, the telephone communication or the message communication, based on the type of the location specified from the apparatus position information. Convenience of the electronic apparatus 10 is thereby increased.

As illustrated in FIG. 11, in Step s11, the controller 100 of the instruction receiving apparatus 10 acquires the apparatus position information from the apparatus information of the target other side apparatus 10. Next, in Step s12, the controller 100 determines whether the location specified from the acquired apparatus position information has a high possibility of large noise. The location having the high possibility of large noise is referred to as "noisy location" in some cases hereinafter.

In the present example, the storage 103 stores noisy position information indicating the noisy location. The noisy position information includes position information of the noisy location. The noisy location indicated by the noisy position information includes a factory and a location along a major road, for example. The noisy location indicated by the noisy position information may include a noisy location specified by the user. In this case, the user operates the display surface 12, for example, thereby inputting the position information of the noisy location to the electronic apparatus 10. The user may input, to the electronic apparatus 10, position information of a factory site at which a company of the user performs a work operation. The electronic apparatus 10 includes the position information being input by the user in the noisy position information in the storage 103. Accordingly, the noisy location indicated by the noisy position information includes the noisy location specified by the user.

In Step s12, the controller 100 determines whether or not the location specified from the apparatus position information is the noisy location based on the apparatus position information and the noisy position information in the storage 103. When the location (in other words, the location) indicated by the apparatus position information is included in the noisy location indicated by the noisy position information, the controller 100 determines that the location specified from the apparatus position information, in other words, the location where the target other side apparatus 10 is located is the noisy location. In the meanwhile, when the location indicated by the apparatus position information is not included in the noisy location indicated by the noisy position information, the controller 100 determines that the location specified from the apparatus position information, in other words, the location where the target other side apparatus 10 is located is not the noisy location.

If the determination is NO in Step s12, the controller 100 determines to execute the telephone communication in Step s13. Then, in Step s14, the instruction receiving apparatus 10 performs the telephone transmission corresponding to the transmission instruction in Step s1 on the target other side apparatus 10. When the target other side apparatus 10 makes a response to the transmission of the telephone communication from the instruction receiving apparatus 10, the telephone communication is performed between the instruction receiving apparatus 10 and the target other side apparatus 10. In the instruction receiving apparatus 10, during the telephone communication, the sound being input to the first microphone 210 is transmitted from the wireless communication unit 110 to the target other side apparatus 10. In the target other side apparatus 10, during the telephone communication, the sound received by the wireless communication unit 110 is output from the receiver 150 or the speaker 160. In the target other side apparatus 10, during the telephone communication, the sound being input to the first microphone 210 is transmitted from the wireless communication unit 110 to the instruction receiving apparatus 10. In the instruction receiving apparatus 10, during the telephone communication, the sound received by the wireless communication unit 110 is output from the receiver 150 or the speaker 160.

In the meanwhile, if the determination is YES in Step s12, the controller 100 determines to execute the message communication in Step s15. Then, in Step s16, the controller 100 executes the message communication application in the storage 103. At this time, the controller 100 may execute the e-mail application or the IM application.

Next, in Step s17, the touch panel 130 detects a transmission destination selection operation of selecting a transmission destination of the massage, an input operation of the message, and a transmission instruction operation of the message (in other words, a sending instruction operation of the message) performed on the display surface 12. The user of the instruction receiving apparatus 10 selects the target other side apparatus 10 as a transmission destination of the message. After Step s17, the controller 100 makes the wireless communication unit 110 transmit the message to the selected other side apparatus 10, that is to say, the target other side apparatus 10 in Step s18.

In the target other side apparatus 10 which has received the message from the transmission instruction receiving apparatus 10, the message communication application is activated, and the controller 100 makes the display 120 display the received message. Accordingly, the target other side user can confirm the message from the instruction receiving apparatus 10.

When the controller 100 executes the message communication application in Step s16, the controller 100 may automatically set the transmission destination of the message to the target other side apparatus 10. Accordingly, in Step s17, the user needs not perform the transmission destination selection operation on the display surface 12.

In this manner, in the example in FIG. 11, the electronic apparatus 10 which has received the transmission instruction on the telephone communication with the other side apparatus 10 determines to execute the message communication instead of executing the telephone communication when the location specified from the apparatus position information of the other side apparatus 10 is the noisy location. When the target other side apparatus 10 is located in the noisy location, there is a possibility that the user of the target other side apparatus 10 does not recognize the arrival of the telephone communication of the instruction receiving apparatus 10. As a result, there is a possibility that the user of the instruction receiving apparatus 10 cannot transfer the information to the user of the target other side apparatus 10. As is the case in the present example, when the location specified from the apparatus position information of the target other side apparatus 10 is the noisy location, the instruction receiving apparatus 10 determines to perform the message communication, thus the user of the target other side apparatus 10 can confirm the message from the instruction receiving apparatus 10. Increased accordingly is a possibility that the user of the instruction receiving apparatus 10 can transfer the information to the user of the target other side apparatus 10. As a result, the convenience of the electronic apparatus 10 is increased.

The electronic apparatus 10 may determine whether or not the subject device is located in the noisy location. In this case, when the location indicated by the GPS position information of the subject device is included in the noisy location indicated by the noisy position information in the storage 103 of the subject device, for example, the controller 100 determines that the subject device is located in the noisy location. When the controller 100 determines that the subject device is located in the noisy location, the controller 100 generates the information indicating that the subject device is located in the noisy location as the apparatus position information of the subject device. In the meanwhile, when the controller 100 determines that the subject device is not located in the noisy location, the controller 100 generates the information indicating that the subject device is located in a location other than the noisy location as the apparatus position information of the subject device. Then, the controller 100 transmits the apparatus information including the generated apparatus position information. In such a case, in Step s12 described above, when the apparatus position information acquired from the apparatus information of the target other side apparatus 10 indicates that the target other side apparatus 10 is located in the noisy location, the instruction receiving apparatus 10 determines to be YES, and executes Steps s15 to s18. In the meanwhile, when the position information acquired from the apparatus information of the target other side apparatus 10 indicates that the target other side apparatus 10 is located in a location other than the noisy location, the instruction receiving apparatus 10 determines to be NO, and executes Steps s13 and s14.

When the server device 50 stores the noisy position information, the instruction receiving apparatus 10 may acquire the noisy position information from the server device 50 in Step s12.

Figure 12:
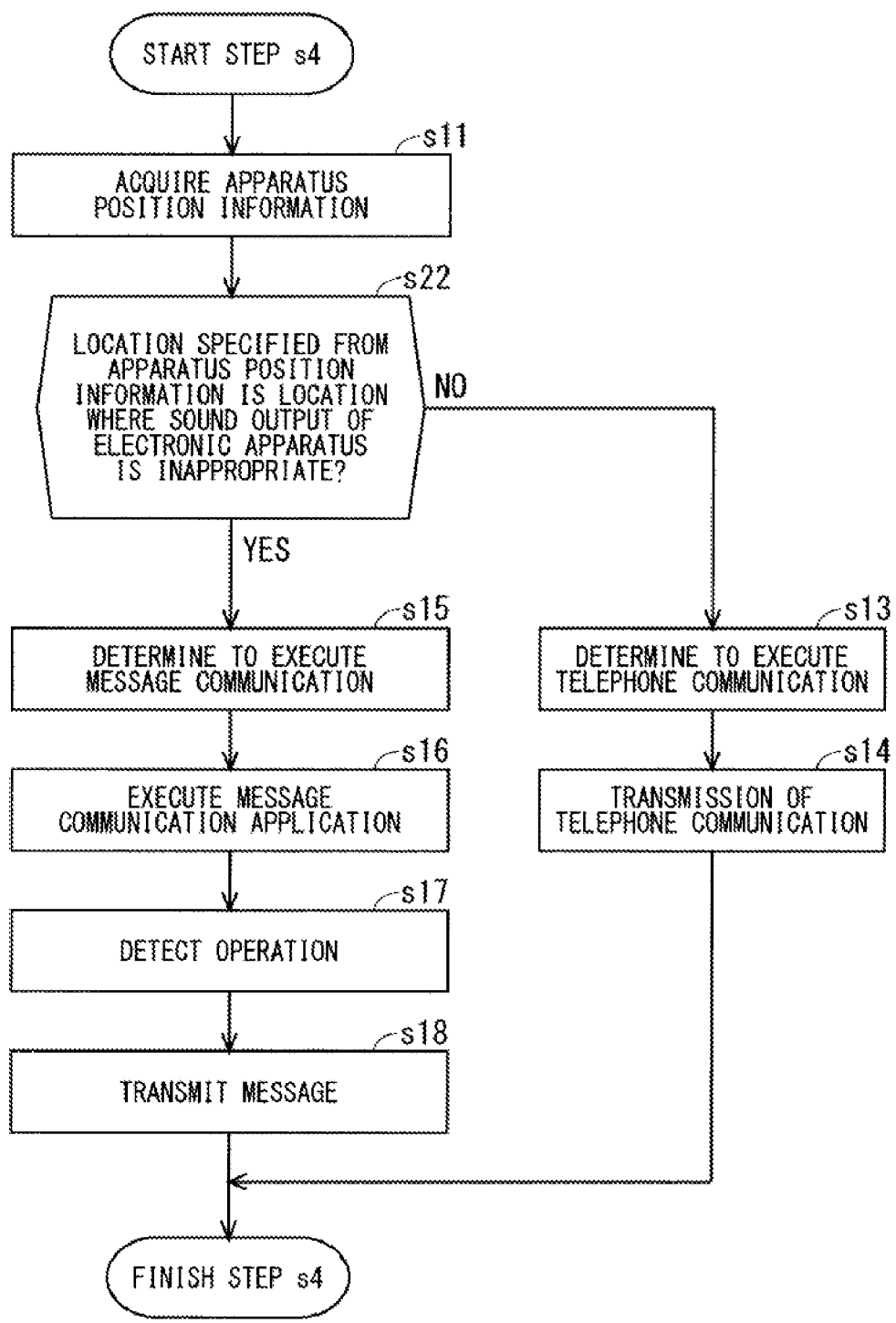
FIG. 12 illustrates a flow chart showing one example of an operation of the electronic apparatus.

FIG. 12 is a flow chart illustrating the other example of Step s4 in a case where the instruction receiving apparatus 10 determines which to perform, the telephone communication or the message communication, based on the type of the location specified from the apparatus position information. As illustrated in FIG. 12, Step s22 is executed after Step s11 described above is executed. In Step s22, the controller 100 determines whether or not the location specified from the acquired apparatus position information is a location inappropriate for the sound output of the electronic apparatus 10 The location inappropriate for the sound output of the electronic apparatus 10 is referred to as "the inappropriate location" in some cases hereinafter.

In the present example, the storage 103 stores inappropriate location information indicating the inappropriate location. The inappropriate location information includes position information of the inappropriate location. The inappropriate location indicated by the inappropriate location information includes, for example, a movie theater, a stage theater, a gallery, a museum, a hospital, and a concert hall. The inappropriate location indicated by the inappropriate location information may include an inappropriate location specified by the user. In this case, the user operates the display surface 12, for example, thereby inputting the position information of the inappropriate location to the electronic apparatus 10. The user may input position information of a meeting room in a company of the user to the electronic apparatus 10. The electronic apparatus 10 includes the position information being input by the user in the inappropriate location information in the storage 103. Accordingly, the inappropriate location indicated by the inappropriate location information include an inappropriate location specified by the user.

In Step s22, the controller 100 determines whether or not the location specified from the apparatus position information is the inappropriate location based on the apparatus position information and the inappropriate location information in the storage 103. When the location indicated by the apparatus position information is included in the inappropriate location indicated by the inappropriate location information, the controller 100 determines that the location specified from the apparatus position information, in other words, the location where the target other side apparatus 10 is located is the inappropriate location. In the meanwhile, when the location indicated by the apparatus position information is not included in the inappropriate location indicated by the inappropriate location information, the controller 100 determines that the location specified from the apparatus position information, in other words, the location where the target other side apparatus 10 is located is not the inappropriate location.

If the determination is NO in Step s22, Steps s13 and s14 described above are executed, and the transmission of the telephone communication is performed. In the meanwhile, if the determination is YES in Step s22, Steps s15 to s18 described above are executed, and the message is transmitted from the instruction receiving apparatus 10.

In this manner, in the example in FIG. 12, the electronic apparatus 10 which has received the transmission instruction on the telephone communication with the other side apparatus 10 determines to execute the message communication instead of executing the telephone communication when the location specified from the apparatus position information of the other side apparatus 10 is the inappropriate location.

Herein, when the electronic apparatus 10 has not made a response to the telephone arrival for a long time, the telephone arrival sound has been output from the electronic apparatus 10 for a long time in some cases. Accordingly, there is a possibility that the target other side apparatus 10 has output the telephone arrival sound in the inappropriate location for a long time. In the meanwhile, there is a low possibility that the message arrival sound is continuously output for a long time, differing from the telephone arrival sound.

As is the case in the example in FIG. 12, when the location specified from the apparatus position information of the target other side apparatus 10 is the inappropriate location, the instruction receiving apparatus 10 determines to execute the message communication, thus the possibility of continuously outputting the sound from the target other side apparatus 10 in the inappropriate location for a long time can be reduced. In the meanwhile, the user of the target other side apparatus 10 can confirm the message from the instruction receiving apparatus 10, thus the user of the instruction receiving apparatus 10 can transfer the information to the user of the target other side apparatus 10. Thus, the convenience of the electronic apparatus 10 is increased.

In the example in FIG. 12, in Step s16, the controller 100 may make the wireless communication unit 110 transmit a control signal to instruct the target other side apparatus 10 not to execute the message arrival notification by sound together with the message. In the target other side apparatus 10 which has received the message and the control signal, the controller 100 controls the target other side apparatus 10 so that the target other side apparatus 10 does not execute the message arrival notification by sound regardless of contents of the setting regarding the message arrival notification in the subject device. Accordingly, the possibility of outputting the message arrival sound from the target other side apparatus 10 in the inappropriate location can be reduced. Thus, the convenience of the electronic apparatus 10 is further increased.

In the example in FIG. 12, in Step s16, the controller 100 may make the wireless communication unit 110 transmit a control signal to instruct the target other side apparatus 10 not to execute the message arrival notification by vibration together with the message. In the target other side apparatus 10 which has received the message and the control signal, the controller 100 controls the target other side apparatus 10 so that the target other side apparatus 10 does not execute the message arrival notification by vibration regardless of contents of the setting regarding the message arrival notification in the subject device. When the apparatus case 11 vibrates, there is a possibility that the sound is output from the electronic apparatus 10. The target other side apparatus 10 does not execute the message arrival notification by vibration, thus the possibility of outputting the sound from the target other side apparatus 10 in the inappropriate location can be reduced. Thus, the convenience of the electronic apparatus 10 is further increased.

In the example in FIG. 12, in Step s16, the controller 100 may make the wireless communication unit 110 transmit a control signal to instruct the target other side apparatus 10 not to execute the message arrival notification by light emission together with the message. In the target other side apparatus 10 which has received the message and the control signal, the controller 100 controls the target other side apparatus 10 so that the target other side apparatus 10 does not execute the message arrival notification by light emission regardless of contents of the setting regarding the message arrival notification in the subject device. There is a possibility that the location inappropriate for the sound output of the electronic apparatus 10 is also a location inappropriate for the light emission of the electronic apparatus 10. The target other side apparatus 10 does not execute the message arrival notification by light emission, thus the possibility of emitting the light from the target other side apparatus 10 in the location inappropriate for the light emission of the electronic apparatus 10 can be reduced. Thus, the convenience of the electronic apparatus 10 is further increased.

In the example in FIG. 12, in Step s16, the controller 100 may make the wireless communication unit 110 transmit a control signal to instruct the target other side apparatus 10 not to execute at least two types of message arrival notification in the message arrival notification by sound, the message arrival notification by vibration, and the message arrival notification by light emission together with the message.

The electronic apparatus 10 may determine whether or not the subject device is located in the inappropriate location. In this case, when the location indicated by the GPS position information of the subject device is included in the inappropriate location indicated by the inappropriate location information in the storage 103 of the subject device, for example, the controller 100 determines that the subject device is located in the inappropriate location. When the controller 100 determines that the subject device is located in the inappropriate location, the controller 100 generates the information indicating that the subject device is located in the inappropriate location as the apparatus position information of the subject device. In the meanwhile, when the controller 100 determines that the subject device is not located in the inappropriate location, the controller 100 generates the information indicating that the subject device is located in a location other than the inappropriate location as the apparatus position information of the subject device. Then, the controller 100 transmits the apparatus information including the generated apparatus position information. In such a case, in Step s22 described above, when the apparatus position information acquired from the apparatus information of the target other side apparatus 10 indicates that the target other side apparatus 10 is located in the inappropriate location, the instruction receiving apparatus 10 determines to be YES, and executes Steps s15 to s18. In the meanwhile, when the apparatus position information acquired from the apparatus information of the target other side apparatus 10 indicates that the target other side apparatus 10 is located in a location other than the inappropriate location, the instruction receiving apparatus 10 determines to be NO, and executes Steps s13 and s14.

When the apparatus position information acquired in Step s11 indicates that the target other side apparatus 10 is located inside a ticket gate of a station, the instruction receiving apparatus 10 may determine to be YES in Step s22, and execute Steps s15 to s17. When the apparatus position information acquired in Step s11 indicates that the target other side apparatus 10 is located outside a ticket gate of a station, the instruction receiving apparatus 10 may determine to be NO in Step s22, and execute Steps s13 to s14.

When the server device 50 stores the inappropriate location information, the instruction receiving apparatus 10 may acquire the inappropriate location information from the server device 50 in Step s22.

Second Example

Figure 13:
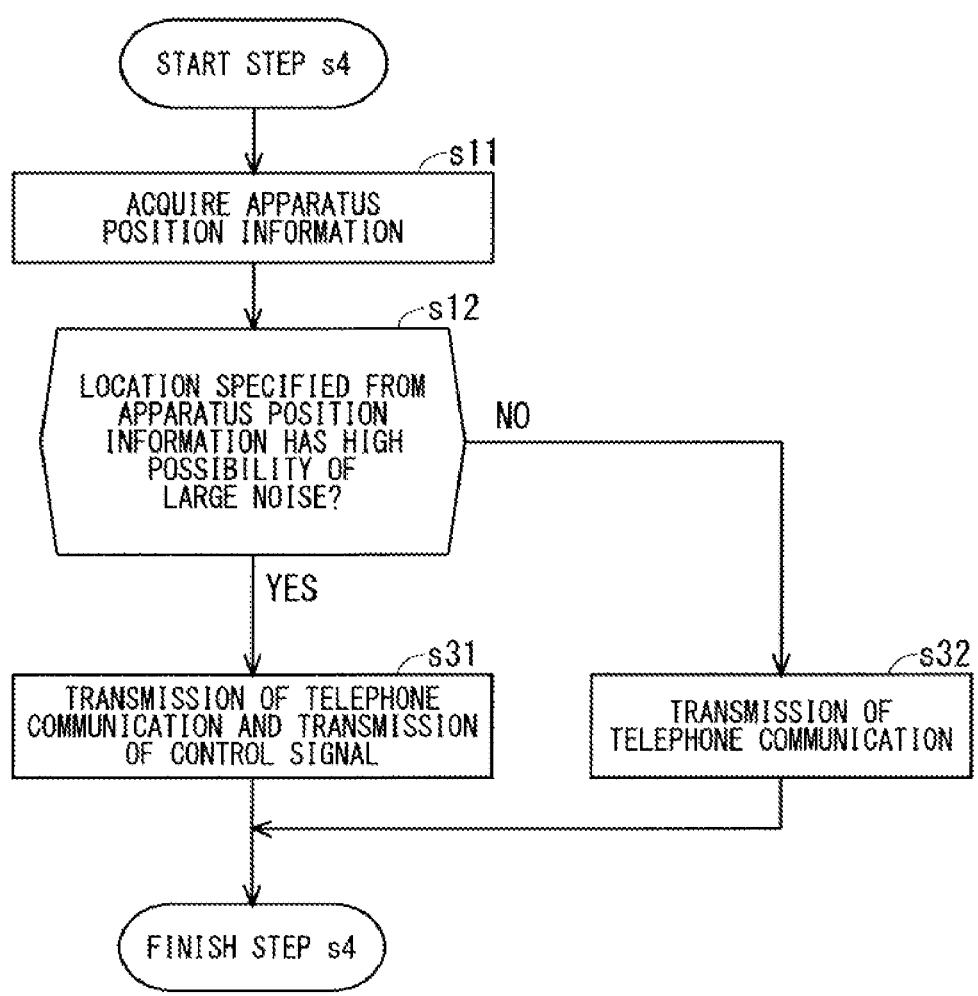
FIG. 13 illustrates a flow chart showing one example of an operation of the electronic apparatus.

FIG. 13 is a flow chart illustrating Step s4 according to the present example. In Step s4 according to the first example described above, the instruction receiving apparatus 10 controls the operation of the subject device. In contrast, in Step s4 according to the present example, the instruction receiving apparatus 10 controls the operation of the target other side apparatus 10. In the example in FIG. 13, the controller 100 controls the operation regarding the telephone communication of the target other side apparatus 10 based on a type of location specified from the apparatus position information. More specifically, the controller 100 controls the telephone arrival notification in the target other side apparatus 10 based on a type of location specified from the apparatus position information. The convenience of the electronic apparatus 10 is thereby increased.

As illustrated in FIG. 13, Steps s11 and s12 described above are executed. If the determination is YES in Step s12, the controller 100 generates the control signal for performing control of the telephone arrival notification in the target other side apparatus 10 in Step s31. Then, the instruction receiving apparatus 10 performs transmission of the telephone communication and transmits the generated control signal to the target other side apparatus 10.

In the target other side apparatus 10 at which the telephone communication has arrived from the instruction receiving apparatus 10, the controller 100 controls the target other side apparatus 10 so that the target other side apparatus 10 performs the telephone arrival notification corresponding to the control signal received from the instruction receiving apparatus 10 regardless of contents of the setting regarding the telephone arrival notification in the subject device.

In the meanwhile, if the determination is NO in Step s12, the instruction receiving apparatus 10 performs the transmission of the telephone communication to the target other side apparatus 10 in Step s32. At this time, the control signal transmitted in Step s31 is not transmitted to the target other side apparatus 10. The target other side apparatus 10 at which the transmission in Step s32 has arrived performs the telephone arrival notification in accordance with the setting regarding the telephone arrival notification in the subject device.

In Step s31, the controller 100 may generate the control signal for controlling the sound output as the telephone arrival notification in the target other side apparatus 10. For example, the controller 100 may generate the control signal of instructing to perform the telephone arrival notification by sound with maximizing a sound volume of the telephone arrival sound. In this case, the target other side apparatus 10 receiving the control signal transmitted in Step s31 performs the telephone arrival notification by sound with maximizing a sound volume of the telephone arrival sound regardless of contents of the setting regarding the telephone arrival notification in the subject device. Accordingly, the user of the target other side apparatus 10 located in the noisy location easily recognizes the telephone arrival notification from the target other side apparatus 10. Thus, the convenience of the electronic apparatus 10 is increased. The performance of the telephone arrival notification by sound with maximizing the sound volume of the telephone arrival notification is referred to as "the telephone arrival notification by maximum sound" in some cases hereinafter.

In Step s31, the controller 100 may generate the control signal for controlling the vibration as the telephone arrival notification in the target other side apparatus 10. For example, the controller 100 may generate the control signal of instructing to perform the telephone arrival notification by vibration with maximizing a magnitude of the telephone arrival vibration. In this case, the target other side apparatus 10 receiving the control signal transmitted in Step s31 performs the telephone arrival notification by vibration with maximizing the magnitude of the telephone arrival vibration regardless of contents of the setting regarding the telephone arrival notification in the subject device. Accordingly, the user of the target other side apparatus 10 located in the noisy location easily recognizes the telephone arrival notification from the target other side apparatus 10. Thus, the convenience of the electronic apparatus 10 is increased. The performance of the telephone arrival notification by vibration with maximizing the magnitude of the telephone arrival vibration is referred to as "the telephone arrival notification by maximum vibration" in some cases.

In Step s31, the controller 100 may generate the control signal for controlling the light emission as the telephone arrival notification in the target other side apparatus 10. For example, the controller 100 may generate the control signal of instructing to perform the telephone arrival notification by light emission with maximizing a luminance of the telephone arrival light emission. In this case, the target other side apparatus 10 receiving the control signal transmitted in Step s31 performs the telephone arrival notification by light emission with maximizing the luminance of the telephone arrival light emission regardless of contents of the setting regarding the telephone arrival notification in the subject device. Accordingly, the user of the target other side apparatus 10 located in the noisy location easily recognizes the telephone arrival notification from the target other side apparatus 10. Thus, the convenience of the electronic apparatus 10 is increased. The performance of the telephone arrival notification by light emission with maximizing the luminance of the telephone arrival light emission is referred to as "the telephone arrival notification by light emission of maximum luminance" in some cases hereinafter.

In Step s31, the controller 100 may generate the control signal to instruct to execute at least two types of telephone arrival notification in the telephone arrival notification by maximum sound, the telephone arrival notification by maximum vibration, and the telephone arrival notification by light emission of maximum luminance.

In Step s31, the controller 100 may generate the control signal of instructing to increase a sound volume of the telephone arrival sound close to maximum. The controller 100 may generate the control signal of instructing to increase a magnitude of the telephone arrival vibration close to maximum. The controller 100 may generate the control signal of instructing to increase a luminance of the telephone arrival light emission close to maximum.

Figure 14:
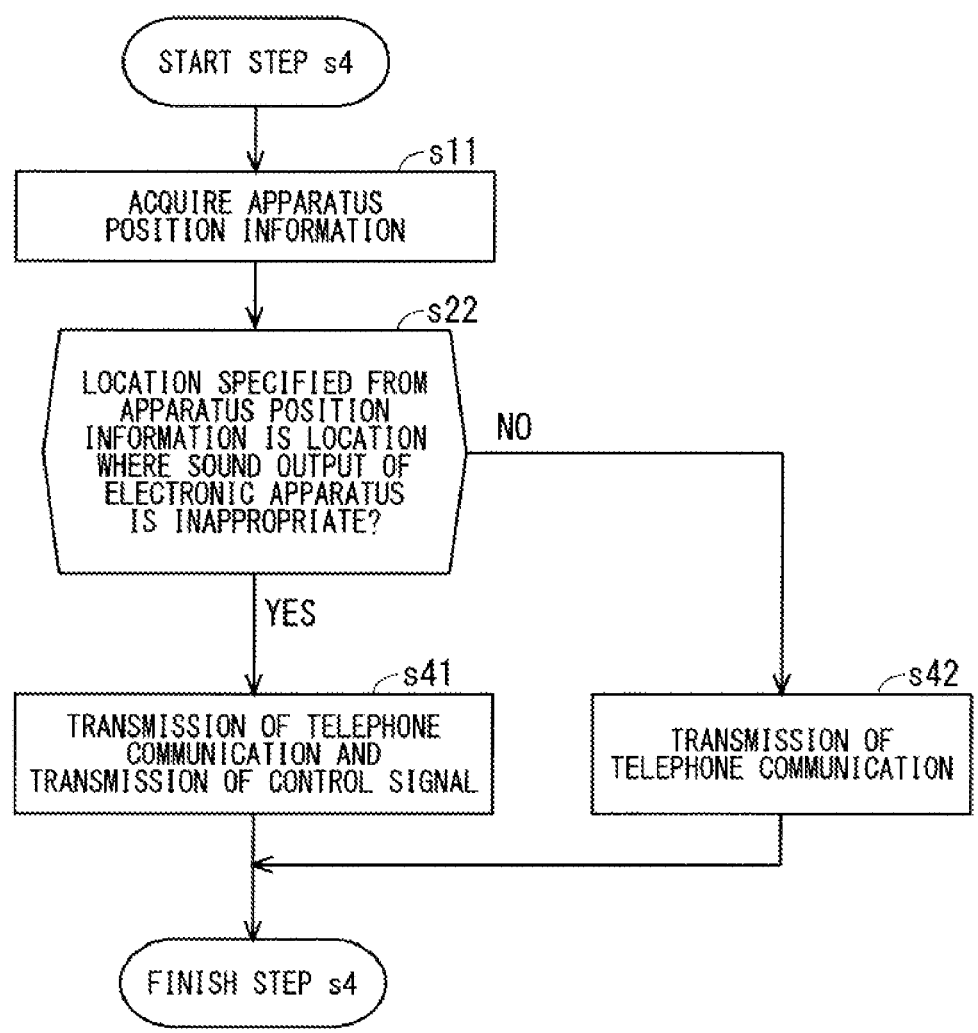
FIG. 14 illustrates a flow chart showing one example of an operation of the electronic apparatus.

FIG. 14 is a flow chart illustrating the other example of Step s4 in a case where the controller 100 controls the telephone arrival notification of the target other side apparatus 10 based on a type of the location specified from the apparatus position information. As illustrated in FIG. 14, Steps s11 and s22 described above are executed. If the determination is YES in Step s22, the controller 100 generates the control signal for controlling the sound output as the telephone arrival notification in the target other side apparatus 10, for example, in Step s41. For example, the controller 100 generates the control signal of instructing not to execute the telephone arrival notification by sound. Then, the instruction receiving apparatus 10 performs the transmission of the telephone communication and transmits the generated control signal to the target other side apparatus 10. In the target other side apparatus 10 at which the telephone communication has arrived from the instruction receiving apparatus 10, the controller 100 controls the target other side apparatus 10 so that the target other side apparatus 10 does not perform the telephone arrival notification by sound in accordance with the received control signal regardless of contents of the setting regarding the telephone arrival notification in the subject device. That is to say, the controller 100 does not output the telephone arrival sound from the speaker 160 regardless of the contents of the setting regarding the telephone arrival notification in the subject device. Accordingly, reduced is a possibility of outputting the telephone arrival sound from the target other side apparatus 10 located in a location inappropriate for the sound output of the electronic apparatus 10.

In the meanwhile, if the determination is NO in Step s22, the instruction receiving apparatus 10 performs the transmission of the telephone communication on the target other side apparatus 10 in Step s42. At this time, the control signal transmitted in Step s41 is not transmitted to the target other side apparatus 10. The target other side apparatus 10 at which the transmission in Step s42 has arrived performs the telephone arrival notification in accordance with the setting regarding the telephone arrival notification in the subject device.

In Step s41, the controller 100 may generate the control signal of instructing not to execute any of the telephone arrival notification by sound and the telephone arrival notification by vibration. The target other side apparatus 10 receiving the control signal transmitted in Step s41 does not perform any of the telephone arrival notification by sound and the telephone arrival notification by vibration regardless of contents of the setting regarding the telephone arrival notification in the subject device. When the apparatus case 11 vibrates, there is a possibility that the sound is output from the electronic apparatus 10, thus further reduced is a possibility of outputting the sound from the target other side apparatus 10 located in a location inappropriate for the sound output of the electronic apparatus 10.

In Step s41, the controller 100 may generate the control signal of instructing not to execute any of the telephone arrival notification by sound and the telephone arrival notification by light emission. The target other side apparatus 10 receiving the control signal transmitted in Step s41 does not perform any of the telephone arrival notification by sound and the telephone arrival notification by light emission regardless of contents of the setting regarding the telephone arrival notification in the subject device. As described above, there is a possibility that the location inappropriate for the sound output of the electronic apparatus 10 such as a movie theater is also a location inappropriate for the light emission of the electronic apparatus 10. The target other side apparatus 10 does not execute the telephone arrival notification by light emission, thus the possibility of emitting the light from the target other side apparatus 10 in the location inappropriate for the light emission of the electronic apparatus 10 can be reduced.

In Step s41, the controller 100 may generate the control signal of instructing not to execute the telephone arrival notification by sound, the telephone arrival notification by vibration, and the telephone arrival notification by light emission.

Third Example

Figure 15:
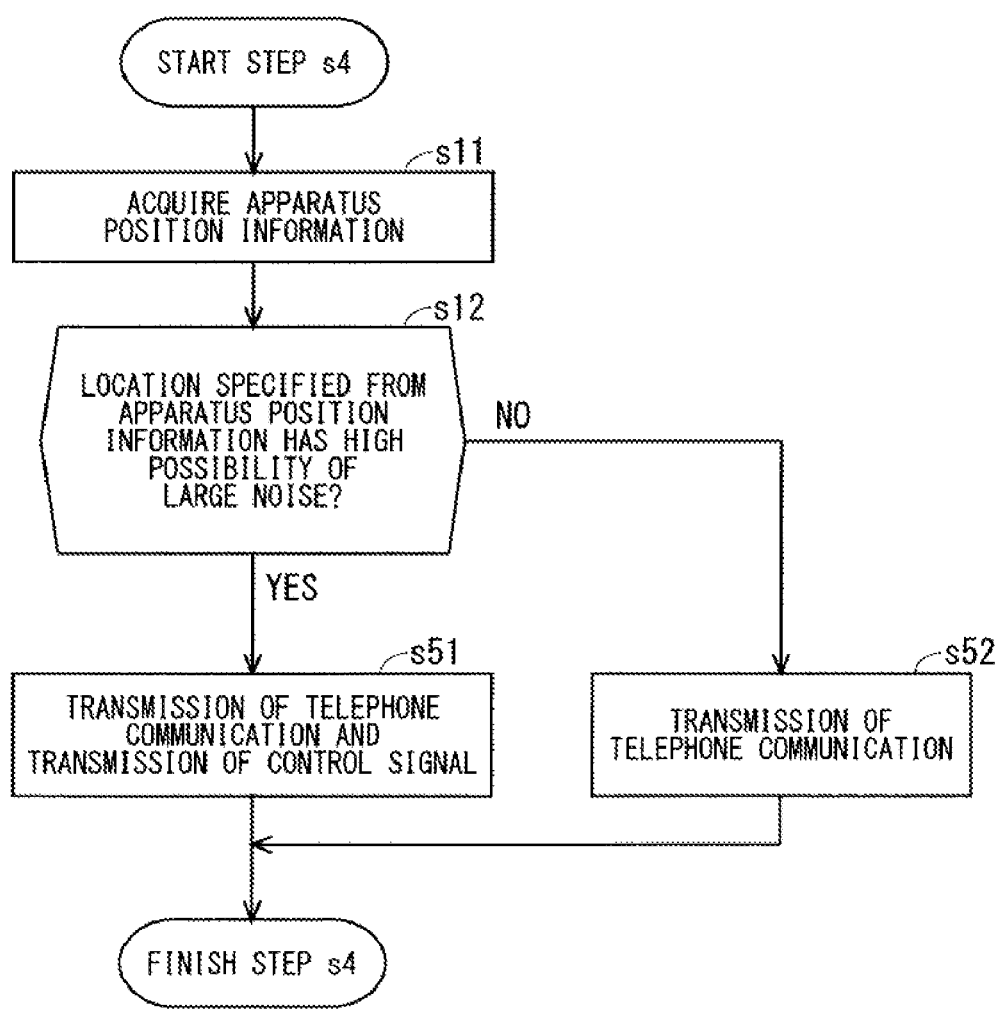
FIG. 15 illustrates a flow chart showing one example of an operation of the electronic apparatus.

FIG. 15 is a flow chart illustrating Step s4 according to the present example. In Step s4 according to the present example, in the manner similar to the second example described above, the instruction receiving apparatus 10 controls the operation regarding the telephone communication of the target other side apparatus 10 based on a type of location specified from the apparatus position information.

As illustrated in FIG. 15, Steps s11 and s12 described above are executed. If the determination is YES in Step s12, the controller 100 generates, in Step s51, the control signal for instructing the target other side apparatus 10 to execute the noise cancellation function while the telephone communication is performed. Then, the instruction receiving apparatus 10 performs the transmission of the telephone communication and transmits the generated control signal to the target other side apparatus 10.

In the target other side apparatus 10 at which the telephone communication has arrived from the instruction receiving apparatus 10, the controller 100 determines to execute the noise cancellation function while the telephone communication is performed between the instruction receiving apparatus 10 and the target other side apparatus 10 in accordance with the control signal received from the instruction receiving apparatus 10 regardless of contents of the noise cancellation setting in the subject device. Then, the target other side apparatus 10 makes a response to the arrival of the telephone communication with the instruction receiving apparatus 10, and starts executing the noise cancellation function when the telephone communication is started. The target other side apparatus 10 executes the noise cancellation function during the telephone communication with the instruction receiving apparatus 10.

In the meanwhile, if the determination is NO in Step s12, the instruction receiving apparatus 10 performs the transmission of the telephone communication on the target other side apparatus 10 in Step s52. At this time, the control signal transmitted in Step s51 is not transmitted to the target other side apparatus 10. The target other side apparatus 10 at which the transmission in Step s52 has arrived performs processing corresponding to contents of the noise cancellation setting in the subject device when the telephone communication with the instruction receiving apparatus 10 is started.

In this manner, in the present example, the controller 100 of the instruction receiving apparatus 10 controls the target other side apparatus 10 so that the target other side apparatus 10 executes the noise cancellation function while the telephone communication is performed in accordance with the type of the location specified from the apparatus position information. Accordingly, the target other side apparatus 10 can execute the noise cancellation function when the target other side apparatus 10 performs the telephone communication in a location where the noise cancellation function is enabled such as the noisy location. Thus, the convenience of the electronic apparatus 10 is increased.

The control signal transmitted in Step s31 described above may also be transmitted to the target other side apparatus 10 in Step s51. In this case, the target other side apparatus 10 performs the telephone arrival notification corresponding to the control signal received from the instruction receiving apparatus 10 regardless of contents of the setting regarding the telephone arrival notification in the subject device. The target other side apparatus 10 executes the noise cancellation function when the telephone communication with the instruction receiving apparatus 10 is started.

Figure 16:
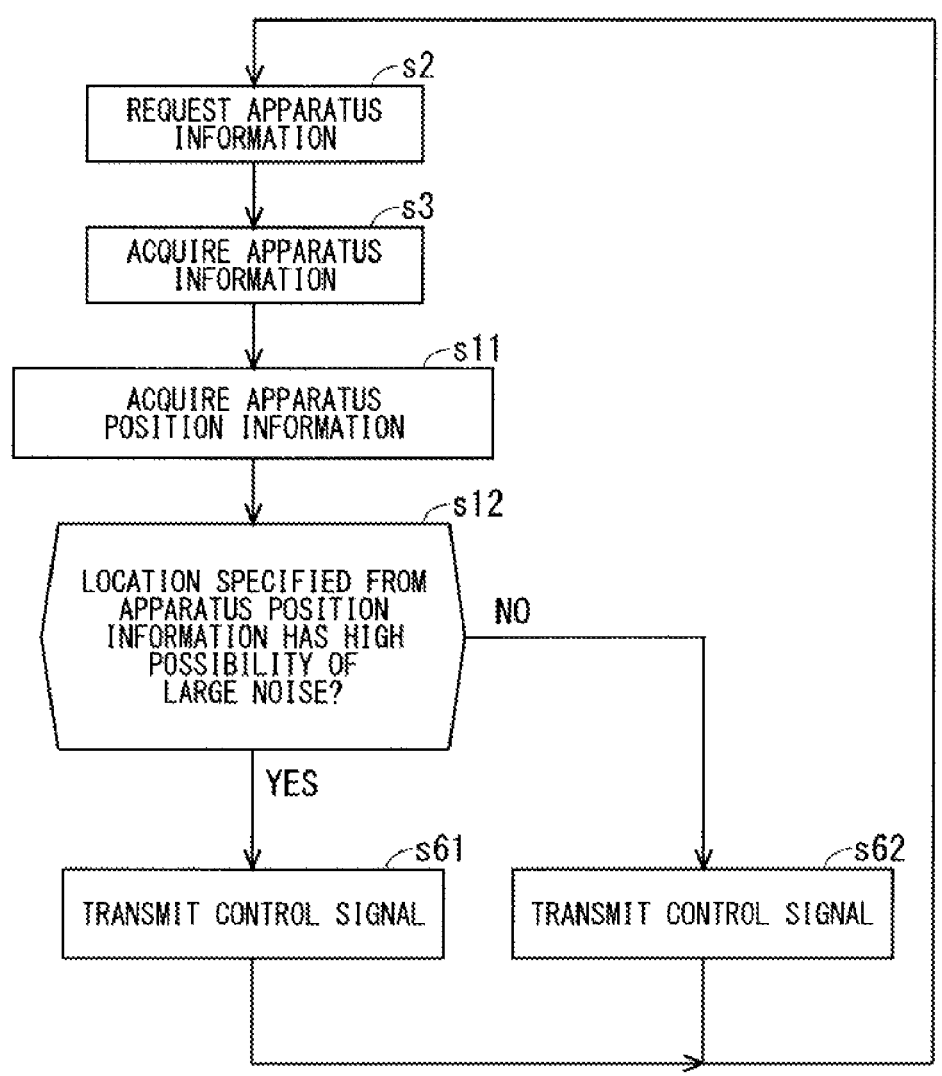
FIG. 16 illustrates a flow chart showing one example of an operation of the electronic apparatus.

The instruction receiving apparatus 10 may control whether or not the target other side apparatus 10 executes the noise cancellation function during the telephone communication with the target other side apparatus 10. FIG. 16 is a flow chart illustrating the operation of the instruction receiving apparatus 10 in this case. The instruction receiving apparatus 10 executes the processing illustrated in FIG. 16 during the telephone communication with the target other side apparatus 10.

As illustrated in FIG. 16, Step s1, Step s2, Step s11, and Step s12 described above are executed. If the determination is YES in Step s12, the controller 100 generates the control signal for instructing to execute the noise cancellation function. Then, the controller 100 makes the wireless communication unit 110 transmit the generated control signal to the target other side apparatus 10. The target other side apparatus 10 which has received this control signal continues to execute the noise cancellation function when the target other side apparatus 10 currently executes the noise cancellation function. In the meanwhile, the target other side apparatus 10 executes the noise cancellation function when the target other side apparatus 10 does not currently execute the noise cancellation function. After Step s61, the instruction receiving apparatus 10 executes Step s2 again, and subsequently operates in the similar manner.

In the meanwhile, if the determination is NO in Step s12, the controller 100 generates the control signal for instructing not to execute the noise cancellation function in Step s62. Then, the controller 100 makes the wireless communication unit 110 transmit the generated control signal to the target other side apparatus 10. The target other side apparatus 10 which has received this control signal suspends the execution of the noise cancellation function when the target other side apparatus 10 currently executes the noise cancellation function. In the meanwhile, the target other side apparatus 10 maintains the suspension of the noise cancellation function when the target other side apparatus 10 does not currently execute the noise cancellation function. After Step s62, the instruction receiving apparatus 10 executes Step s2 again, and subsequently operates in the similar manner.

In this manner, the instruction receiving apparatus 10 controls whether or not the target other side apparatus 10 executes the noise cancellation function during the telephone communication with the target other side apparatus 10, thus the target other side apparatus 10 can appropriately execute the noise cancellation function.

The instruction receiving apparatus 10 may determine whether or not the subject device executes the noise cancellation function during the telephone communication with the target other side apparatus 10. FIG. 17 is a flow chart illustrating the operation of the instruction receiving apparatus 10 in this case. The instruction receiving apparatus 10 executes the processing illustrated in FIG. 17 during the telephone communication with the target other side apparatus 10.

As illustrated in FIG. 17, in Step s71, the instruction receiving apparatus 10 determines whether or not the location specified from the apparatus position information of the subject device is the noisy location. In Step s71, the controller 100 determines that the location specified from the apparatus position information of the subject device is the noisy location when the location indicated by the apparatus position information of the subject device is included in the noisy location indicated by the noisy position information in the storage 103 in the subject device. In the meanwhile, the controller 100 determines that the location specified from the apparatus position information of the subject device is not the noisy location when the location indicated by the apparatus position information of the subject device is not included in the noisy location indicated by the noisy position information.

If the determination is YES in Step s71, the controller 100 determines to execute the noise cancellation function of the subject device in Step s72. At this time, the controller 100 starts executing the noise cancellation function when the controller 100 does not execute the noise cancellation function. After Step s72, the instruction receiving apparatus 10 executes Step s71 again, and subsequently operates in the similar manner.

In the meanwhile, if the determination is NO in Step s71, the controller 100 determines not to execute the noise cancellation function of the subject device in Step s73. At this time, the controller 100 suspends the execution of the noise cancellation function when the controller 100 executes the noise cancellation function. After Step s73, the instruction receiving apparatus 10 executes Step s71 again, and subsequently operates in the similar manner.

In this manner, the instruction receiving apparatus 10 determines whether or not the subject device executes the noise cancellation function during the telephone communication with the target other side apparatus 10, thereby being able to appropriately execute the noise cancellation function.

When the instruction receiving apparatus 10 does not execute the processing illustrated in FIG. 16, the target other side apparatus 10 may determine whether or not the subject device executes the noise cancellation function in the manner similar to the processing in FIG. 17 during the telephone communication with the instruction receiving apparatus 10.

When the instruction receiving apparatus 10 does not execute the processing illustrated in FIG. 17, the target other side apparatus 10 may control whether or not the instruction receiving apparatus 10 executes the noise cancellation function in the manner similar to the processing in FIG. 16 during the telephone communication with the instruction receiving apparatus 10.

Fourth Example

In the present example, in Step s4, the instruction receiving apparatus 10 performs processing based on schedule information of a location specified from the apparatus position information of the target other side apparatus 10.

In the present example, schedule information of a plurality of locations is registered in the storage 53 in the server device 50. For example, schedule information of the inappropriate location described in the first and second examples described above is registered in the storage 53. Schedule information of a movie theater, a stage theater, a gallery, a museum, and a hospital, for example, is registered for each date in the storage 53. The schedule information of the movie theater, the stage theater, the gallery, the museum, and the hospital includes an opening hour, for example. The schedule information of the inappropriate location is registered in the storage 53 in association with the position information of the inappropriate location.

Schedule information transmitted from the electronic apparatus 10 may be registered in the storage 53. In this case, for example, the user of the electronic apparatus 10 operates the display surface 12, thereby inputting the schedule information to the electronic apparatus 10. For example, the user inputs schedule information of a meeting room, at each date, where the user can use and position information of the meeting room to the electronic apparatus 10. The schedule information of the meeting room includes a period of time at which the meeting room is scheduled to be used. The electronic apparatus 10 transmits the input schedule information and position information to the server device 50. In the server device 50, the controller 51 stores, in the storage 53, the schedule information and position information received in the communication unit 54 in association with each other.

Figure 18:
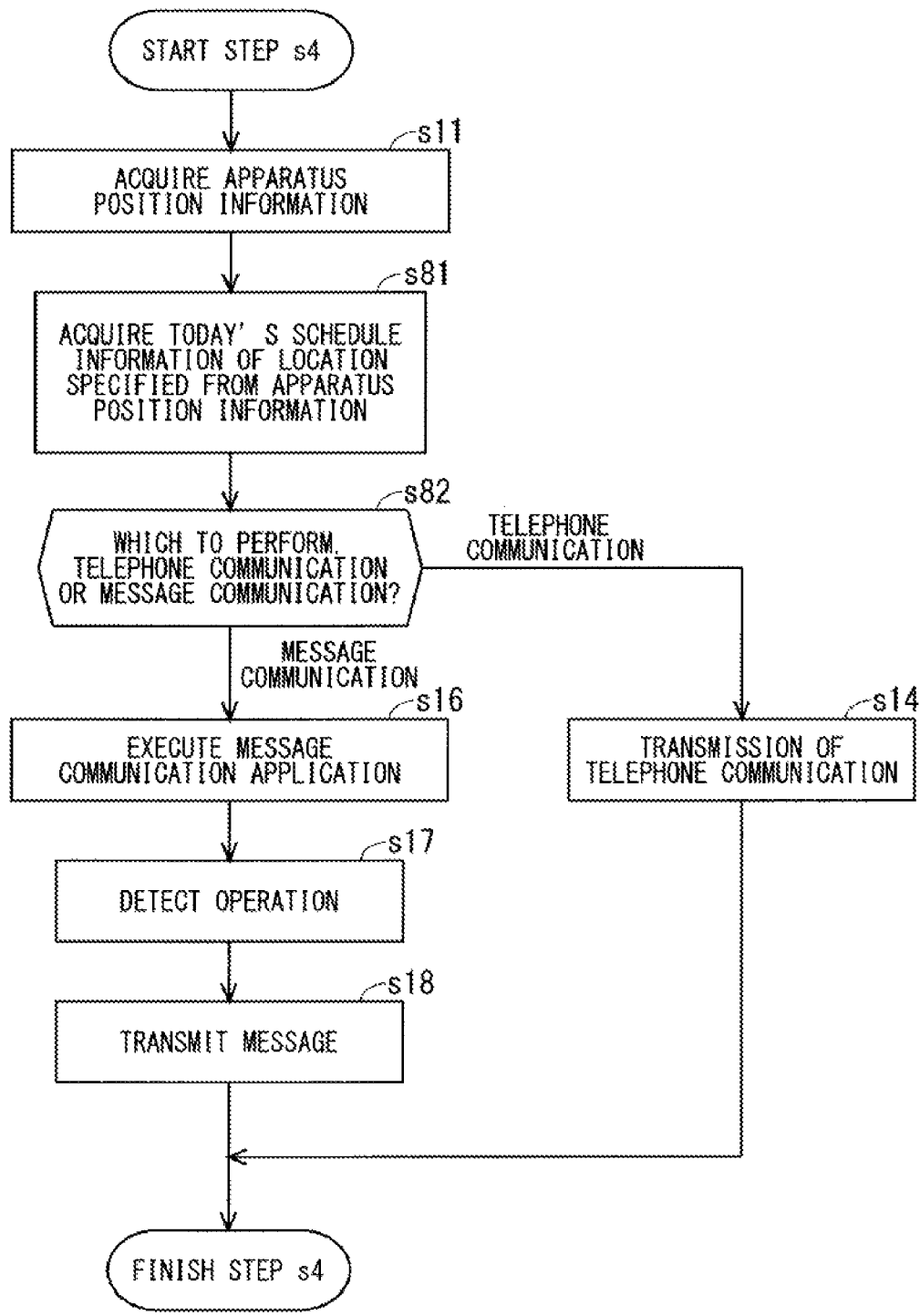
FIG. 18 illustrates a flow chart showing one example of an operation of the electronic apparatus.

FIG. 18 is a flow chart illustrating Step s4 according to the present example. As illustrated in FIG. 18, Step s81 is executed after Step s11 described above is executed. In Step s81, the instruction receiving apparatus 10 acquires today's schedule information of a location specified from the acquired apparatus position information from the server device 50. In Step s81, the controller 10 of the instruction receiving apparatus 10 generates a request signal for requesting the today's schedule information from the server device 50. The request signal includes the apparatus position information of the target other side apparatus 10. The controller 100 makes the wireless communication unit 110 transmit the generated request signal to the server device 50. In the server device 50 receiving the request signal, the controller 51 retrieves the today's schedule information of the location including the location indicated by the apparatus position information included in the request signal from the storage 53. Then, the controller 51 makes the communication unit 53 transmit the retrieved schedule information to the instruction receiving apparatus 10. Accordingly, the instruction receiving apparatus 10 can acquire the today's schedule information of the location specified from the apparatus position information of the target other side apparatus 10.

After Step s81, in Step s82, the controller 100 determines which to perform, the telephone communication or the message communication, based on the schedule information acquired in Step s81.

Considered, for example, is a case where the schedule information acquired in Step s81 is today's schedule information of a movie theater as the inappropriate location. The controller 100 determines to execute the message communication when the opening hour included in the schedule information includes a current time. In other words, the controller 100 determines to execute the message communication when the target other side user is located in the movie theater during opening hour. In the meanwhile, the controller 100 determines to execute the telephone communication when the opening hour included in the schedule information does not include the current time.

Considered as the other example is a case where the schedule information acquired in Step s81 is today's schedule information of a meeting room. The controller 100 determines to execute the message communication when a period of time at which the meeting room is scheduled to be used includes a current time. In other words, the controller 100 determines to execute the message communication when the target other side user is located in the meeting room during a meeting. In the meanwhile, the controller 100 determines to execute the telephone communication when the period of time at which the meeting room is scheduled to be used included in the schedule information does not include the current time.

If the execution of the message communication is determined in Step s82, the instruction receiving apparatus 10 executes Steps s16 to s18 and transmits the message. In the meanwhile, if the execution of the telephone communication is determined in Step s82, the instruction receiving apparatus 10 executes Step s14 and performs the transmission of the telephone communication.

In this manner, in the example in FIG. 18, the controller 100 of the instruction receiving apparatus 10 determines which to perform, the telephone communication or the message communication, based on the schedule information of the location specified from the apparatus position information of the target other side apparatus 10. Accordingly, the instruction receiving apparatus 10 can perform the communication in accordance with the schedule information of the location where the target other side apparatus 10 is located. In other words, the instruction receiving apparatus 10 can perform the communication in accordance with the schedule information of the location where the target other side user is located. Thus, the convenience of the electronic apparatus 10 is increased.

Figure 19:
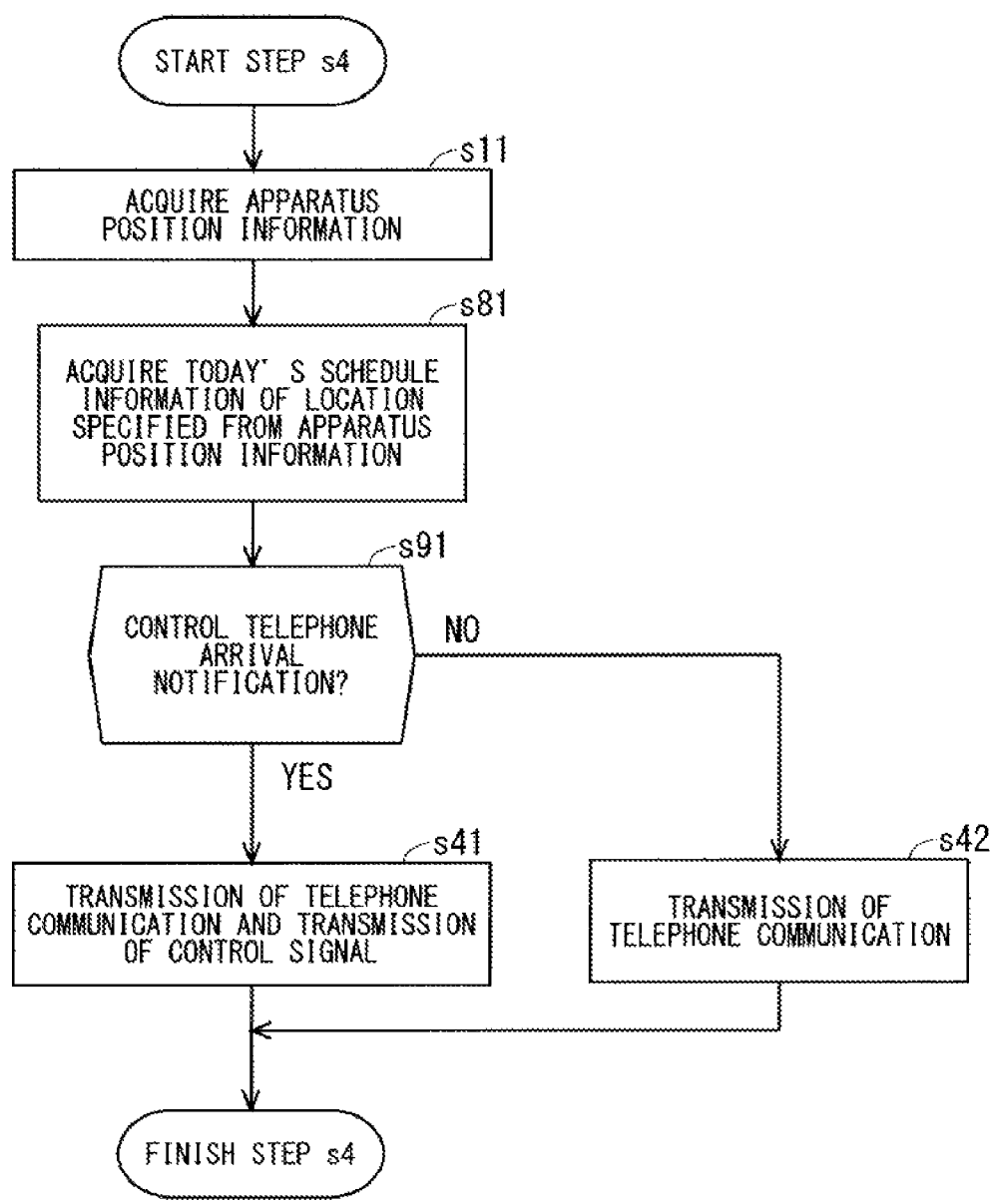
FIG. 19 illustrates a flow chart showing one example of an operation of the electronic apparatus.

FIG. 19 is a flow chart illustrating the other example of Step s4 in a case where the instruction receiving apparatus 10 performs processing based on the schedule information of the location specified from the apparatus position information of the target other side apparatus 10. As illustrated in FIG. 19, Step s91 is executed when Steps s11 and s81 described above are executed. In Step s91, the controller 100 determines whether or not the telephone arrival notification in the target other side apparatus 10 is controlled based on the schedule information acquired in Step s81.

Considered, for example, is a case where the schedule information acquired in Step s81 is today's schedule information of a gallery as the inappropriate location. The controller 100 determines to control the telephone arrival notification in the target other side apparatus 10 when the opening hour included in the schedule information includes a current time. In other words, the controller 100 determines to control the telephone arrival notification in the target other side apparatus 10 when the target other side user is located in the gallery during opening hour. In the meanwhile, the controller 100 determines not to control the telephone arrival notification in the target other side apparatus 10 when the opening hour included in the schedule information does not include the current time.

Considered as the other example is a case where the schedule information acquired in Step s81 is today's schedule information of a meeting room. The controller 100 determines to control the telephone arrival notification in the target other side apparatus 10 when a period of time at which the meeting room is scheduled to be used included in the schedule information includes a current time. In the meanwhile, the controller 100 determines not to control the telephone arrival notification when the period of time at which the meeting room is scheduled to be used included in the schedule information does not include the current time.

If it is determined to control the telephone arrival notification of the target other side apparatus 10 in Step s91, the instruction receiving apparatus 10 executes Step s41 described above. In the meanwhile, if it is determined not to control the telephone arrival notification of the target other side apparatus 10 in Step s91, the instruction receiving apparatus 10 executes Step s42 described above and performs the transmission of the telephone communication.

In this manner, in the example in FIG. 19, the controller 100 of the instruction receiving apparatus 10 determines whether or not the telephone arrival notification is controlled in the target other side apparatus 10 based on the schedule information of the location specified from the apparatus position information of the target other side apparatus 10. Accordingly, the instruction receiving apparatus 10 can control the telephone arrival notification transmitted to the target other side user in accordance with the schedule information of the location where the target other side user is located. Thus, the convenience of the electronic apparatus 10 is increased.

In the example described above, the server device 50 stores the schedule information, however, the electronic apparatus 10 may store the schedule information. When the instruction receiving apparatus 10 cannot acquire the schedule information in Step s81, the instruction receiving apparatus 10 may perform the transmission of the telephone communication to the target other side apparatus 10 in the manner similar to Steps s14 and s32.

Fifth Example

Described in the present example is a working example of assuming that there is a time difference between the location where the instruction receiving apparatus 10 is located and the location where the target other side apparatus 10 is located.

In the present example, in Step s4, the instruction receiving apparatus 10 performs processing based on a time in a location specified from the apparatus position information of the target other side apparatus 10. In other words, in Step s4, the instruction receiving apparatus 10 performs processing based on a time in a location where the target other side apparatus 10 is located.

Figure 20:
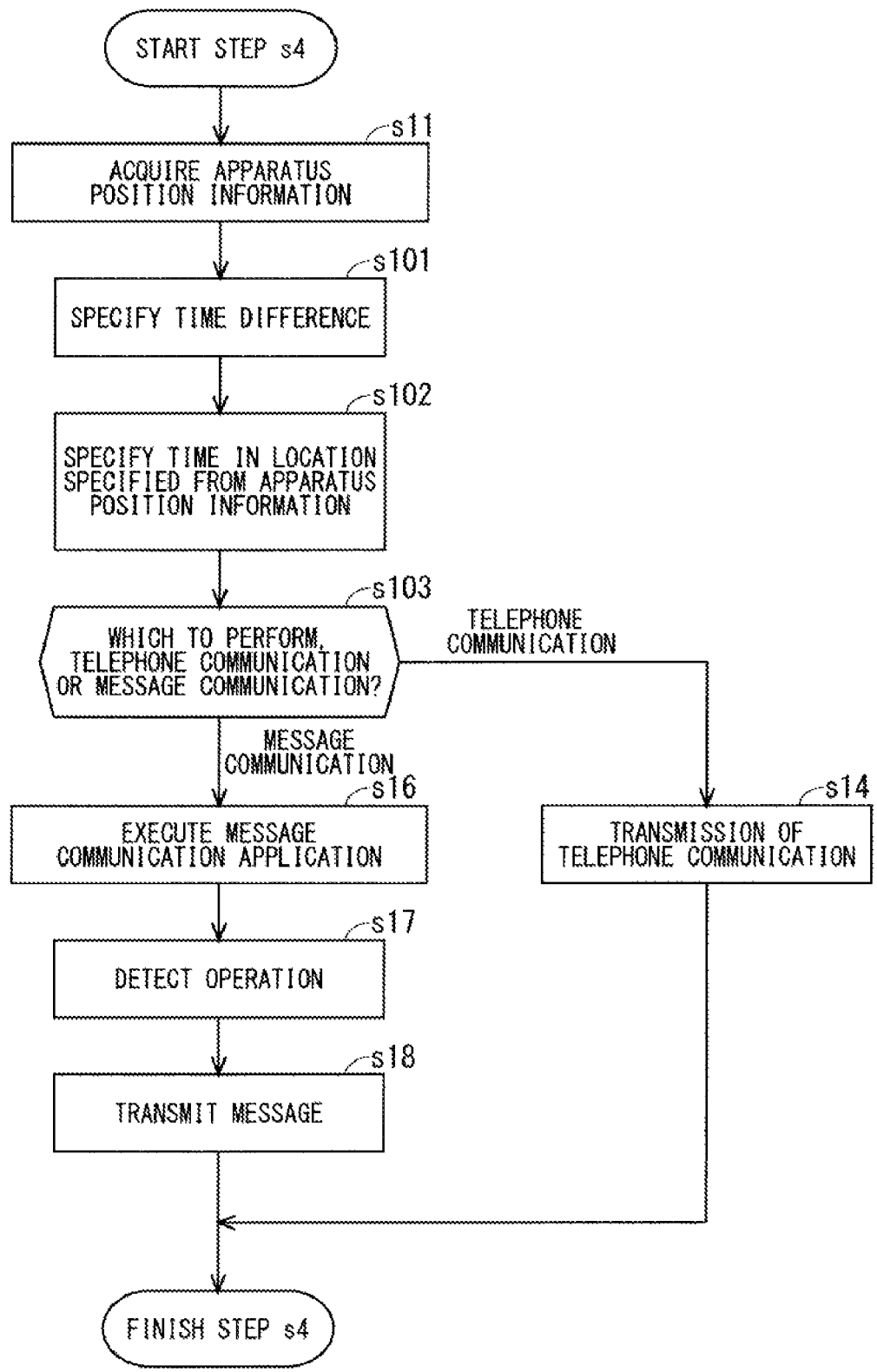
FIG. 20 illustrates a flow chart showing one example of an operation of the electronic apparatus.

FIG. 20 is a flow chart illustrating Step s4 according to the present example. As illustrated in FIG. 20, Step s101 is executed after Step s11 described above is executed. In Step s101, the controller 100 specifies a time difference between a location where the subject device is located and a location specified from the apparatus position information based on the position information of the subject device and the apparatus position information acquired in Step s11. For example, when the apparatus position information is the GPS position information, the controller 100 specifies a time difference between a location where the subject device is located and a location specified from the apparatus position information (in other words, a location where the target other side apparatus 10 is located) based on a latitude and a longitude indicated by the GPS position information of the subject device and a latitude and a longitude indicated by the apparatus position information.

After Step s101, in Step s102, the controller 100 specifies a current time in a location specified from the apparatus position information based on the time difference specified in Step s101 and the current time acquired in the real time clock 240 of the subject device. In other words, the controller 100 specifies the current time in the location where the target other side apparatus 10 is located based on the time difference specified in Step s101 and the current time in the location where the subject device is located.

After Step s102, in Step s103, the controller 100 determines which to perform, the telephone communication and the schedule communication, based on the time specified in Step s102. The controller 100 determines to execute the message communication when the time specified in Step s102 is included in a period of time during which the sound output of the electronic apparatus 10 is inappropriate (referred to as "the inappropriate period of time" in some cases hereinafter), for example. The period of time inappropriate for the sound output of the electronic apparatus 10 is set to a period of time after twelve midnight and before five in the morning, for example. In the meanwhile, the controller 100 determines to execute the telephone communication when the time specified in Step s102 is not included in the inappropriate period of time.

If the execution of the message communication is determined in Step s103, the instruction receiving apparatus 10 executes Steps s16 to s18 and transmits the message. In the meanwhile, if the execution of the telephone communication is determined in Step s103, the instruction receiving apparatus 10 executes Step s14 and performs the transmission of the telephone communication.

In this manner, in the example in FIG. 20, the controller 100 of the instruction receiving apparatus 10 determines which to perform, the telephone communication or the message communication, based on the time in the location specified from the apparatus position information of the target other side apparatus 10. Accordingly, the instruction receiving apparatus 10 can perform the communication in accordance with the time in the location where the target other side apparatus 10 is located. In other words, the instruction receiving apparatus 10 can perform the communication in accordance with the time in the location where the target other side user is located. Thus, the convenience of the electronic apparatus 10 is increased.

Figure 21:
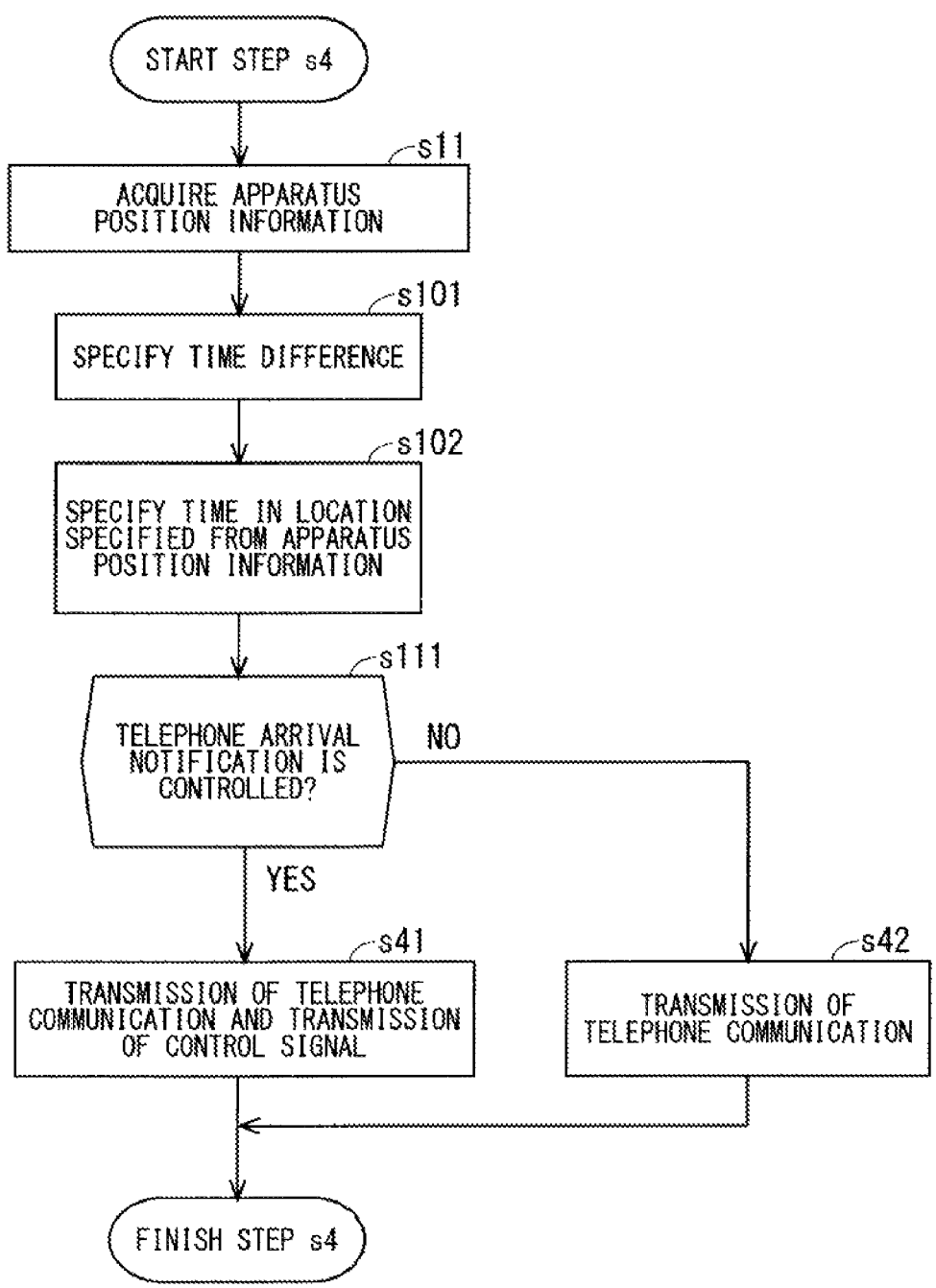
FIG. 21 illustrates a flow chart showing one example of an operation of the electronic apparatus.

FIG. 21 is a flow chart illustrating the other example of Step s4 in a case where the instruction receiving apparatus 10 performs processing based on the time in the location specified from the apparatus position information of the target other side apparatus 10. As illustrated in FIG. 21, when Step s11, Step s101, and Step s102 described above are executed, Step s111 is executed.

In Step s111, the controller 100 determines whether or not the telephone arrival notification in the target other side apparatus 10 is controlled based on the time specified in Step s102. The controller 100 determines to control the telephone arrival notification in the target other side apparatus 10 when the time specified in Step s102 is included in the inappropriate period of time, for example. In the meanwhile, the controller 100 determines not to control the telephone arrival notification in the target other side apparatus 10 when the time specified in Step s102 is not included in the inappropriate period of time.

If it is determined to control the telephone arrival notification of the target other side apparatus 10 in Step s111, the instruction receiving apparatus 10 executes Step s41 described above. In the meanwhile, if it is determined not to control the telephone arrival notification of the target other side apparatus 10 in Step s111, the instruction receiving apparatus 10 executes Step s42 described above and performs the transmission of the telephone communication.

In this manner, in the example in FIG. 21, the controller 100 of the instruction receiving apparatus 10 determines whether or not the telephone arrival notification is controlled in the target other side apparatus 10 based on the time in the location specified from the apparatus position information of the target other side apparatus 10. Accordingly, the instruction receiving apparatus 10 can control the telephone arrival notification transmitted to the target other side user in accordance with the time in the location where the target other side user is located. Thus, the convenience of the electronic apparatus 10 is increased.

Sixth Example

In the present example, in Step s4, the instruction receiving apparatus 10 performs processing based on a sound around the target other side apparatus 10 acquired by the target other side apparatus 10 located in a predetermined location. FIG. 22 is a flow chart illustrating Step s4 according to the present example.

As illustrated in FIG. 22, Step s121 is executed when Step s11 described above is executed. In Step s121, when the location specified from the apparatus position information of the target other side apparatus 10 is a specific type of location, the controller 100 generates a control signal of instructing the target other side apparatus 10 to notify the instruction receiving apparatus 10 of a sound around the target other side apparatus 10. Then, the controller 100 makes the wireless communication unit 110 transmit the generated control signal to the target other side apparatus 10. The inappropriate location described above, for example, is adopted as the specific type of location in Step s121. The controller 100 can specify that the location specified from the apparatus position information of the target other side apparatus 10 is the inappropriate location in the manner similar to Step s22 described above.

In the target other side apparatus 10 receiving the control signal transmitted in Step s121, the controller 100 makes the first microphone 210 operate for a certain period of time. Then, the controller 100 makes the wireless communication unit 110 transmit a sound signal being output from the first microphone 210 to the instruction receiving apparatus 10. The sound signal indicates the sound around the target other side apparatus 10. The simple term of "the ambient sound" means the sound around the target other side apparatus 10 hereinafter.

After Step s121, the instruction receiving apparatus 10 receives the sound signal from the target other side apparatus 10 in Step s122. Thus, the notification of the sound around the target other side apparatus 10 is transmitted from the target other side apparatus 10 to the instruction receiving apparatus 10.

Next, in Step s123, the controller 100 determines which to perform, the telephone communication or the message communication, based on the notification of the ambient sound transmitted from the target other side apparatus 10. The controller 100 determines to execute the message communication when determining that a sound volume of the ambient sound is large. In the meanwhile, the controller 100 determines to execute the telephone communication when determining that a sound volume of the ambient sound is not large. The controller 100 determines that the sound volume of the ambient sound is large when a signal level of the sound signal transmitted from the target other side apparatus 10 is equal to or larger than a threshold value. In the meanwhile, the controller 100 determines that the sound volume of the ambient sound is not large when a signal level of the sound signal transmitted from the target other side apparatus 10 is smaller than the threshold value.

If the execution of the message communication is determined in Step s123, the instruction receiving apparatus 10 executes Steps s16 to s18 and transmits the message. In the meanwhile, if the execution of the telephone communication is determined in Step s123, the instruction receiving apparatus 10 executes Step s14 and performs the transmission of the telephone communication.

As described above, in the example in FIG. 22, the controller 100 of the instruction receiving apparatus 10 controls the target other side apparatus 10 so that the target other side apparatus 10 notifies the instruction receiving apparatus 10 of the sound around the target other side apparatus 10 in accordance with the type of location specified from the apparatus position information of the target other side apparatus 10. In other words, the instruction receiving apparatus 10 controls the target other side apparatus 10 so that the target other side apparatus 10 notifies the instruction receiving apparatus 10 of the sound around the target other side apparatus 10 in accordance with the type of location where the target other side apparatus 10 is located. In the example described above, the instruction receiving apparatus 10 controls the target other side apparatus 10 so that the target other side apparatus 10 notifies the instruction receiving apparatus 10 of the sound around the target other side apparatus 10 when the location specified from the target other side apparatus 10 is the inappropriate location. The instruction receiving apparatus 10 determines which to perform, the telephone communication or the message communication, based on the notification of the ambient sound transmitted from the target other side apparatus 10. Accordingly, the instruction receiving apparatus 10 can perform the communication in accordance with the target other side user with the target other side apparatus 10.

Considered, for example, is a case where the location specified from the apparatus position information of the target other side apparatus 10 is a movie theater. In this case, when a sound volume of a sound around the target other side apparatus 10 is large, there is a high possibility that a movie is currently shown at a location where the target other side user is located. The instruction receiving apparatus 10 operates as described above, thereby being able to perform the message communication with the target other side apparatus 10 when the target other side user is located in the location where the movie is being shown. Thus, it is possible to reduce a possibility that the target other side apparatus 10 outputs the sound for a long time for the other side user located in the location where the movie is being shown.

Considered as the other example is a case where the location specified from the apparatus position information of the target other side apparatus 10 is a hospital. In this case, when a sound volume of a sound around the target other side apparatus 10 is large, there is a high possibility that a hospital where the target other side user is located is in operation. The instruction receiving apparatus 10 operates as described above, thereby being able to perform the message communication with the target other side apparatus 10 when the target other side user is located in the hospital being in operation. Thus, it is possible to reduce a possibility that the target other side apparatus 10 outputs the sound for a long time for the other side user located in the hospital being in operation.

Considered as the other example is a case where the location specified from the apparatus position information of the target other side apparatus 10 is a meeting room. In this case, when a sound volume of a sound around the target other side apparatus 10 is large, there is a high possibility that a meeting is currently conducted in a meeting room where the target other side user is located. The instruction receiving apparatus 10 operates as described above, thereby being able to perform the message communication with the target other side apparatus 10 when the target other side user is located in the meeting room where the meeting is being conducted. Thus, it is possible to reduce a possibility that the target other side apparatus 10 outputs the sound for a long time for the other side user located in the meeting room where the meeting is being conducted.

Figure 23:
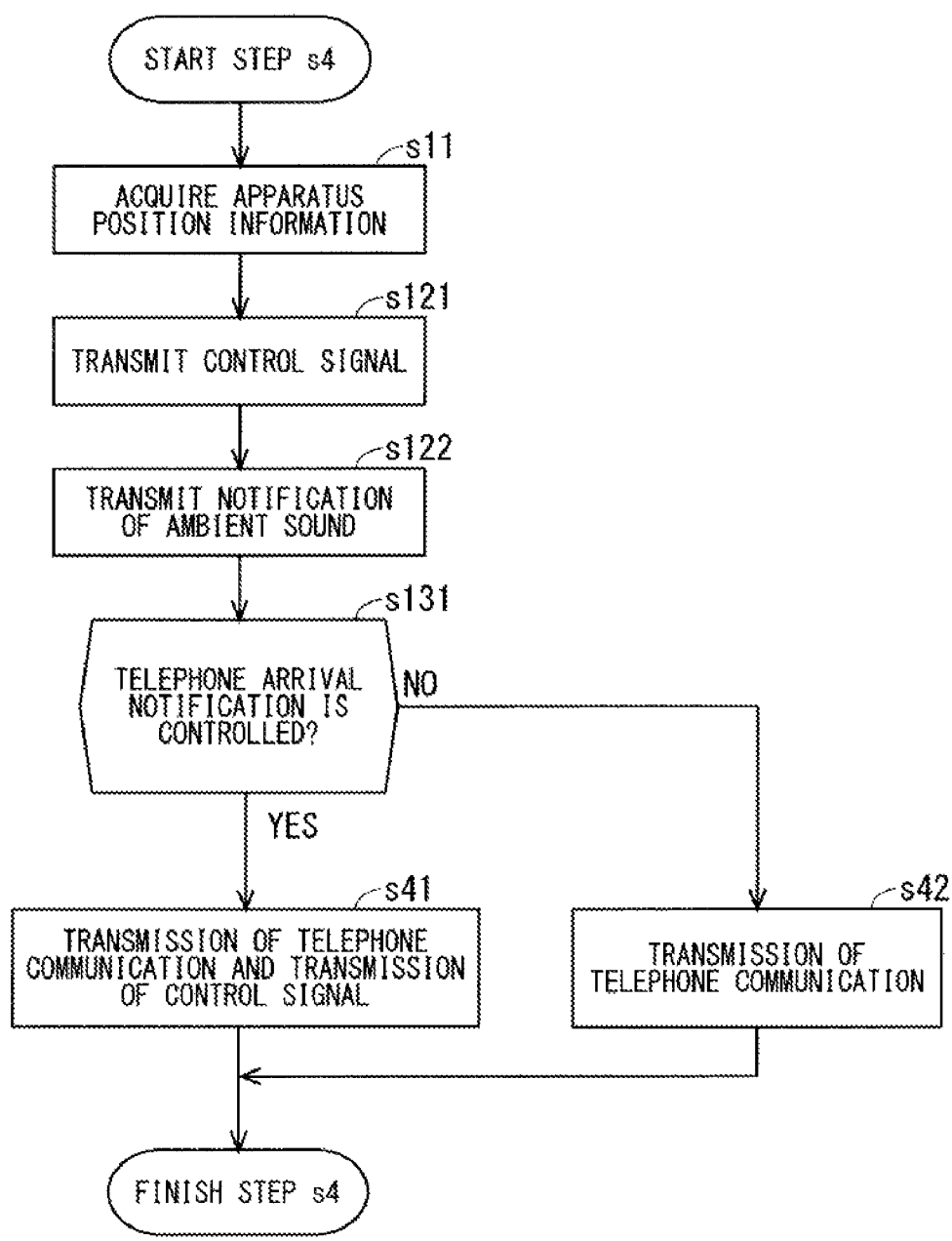
FIG. 23 illustrates a flow chart showing one example of an operation of the electronic apparatus.

FIG. 23 is a flow chart illustrating the other example of Step s4 in a case where the instruction receiving apparatus 10 performs processing based on the sound around the target other side apparatus 10 acquired by the target other side apparatus 10 located in a predetermined location. As illustrated in FIG. 23, when Step s11, Step s121, and Step s122 described above are executed, Step s131 is executed.

In Step s131, the controller 100 determines whether or not the telephone arrival notification in the target other side apparatus 10 is controlled based on the notification of the ambient sound transmitted in Step s122. The controller 100 determines to control the telephone arrival notification in the target other side apparatus 10 when determining that a sound volume of the ambient sound is large, for example. In the meanwhile, the controller 100 determines not to control the telephone arrival notification in the target other side apparatus 10 when determining that a sound volume of the ambient sound is not large. The method of determining whether or not the sound volume of the ambient sound is large is similar to that in Step s123 described above.

If it is determined to control the telephone arrival notification of the target other side apparatus 10 in Step s131, the instruction receiving apparatus 10 executes Step s41 described above. In the meanwhile, if it is determined not to control the telephone arrival notification of the target other side apparatus 10 in Step s131, the instruction receiving apparatus 10 executes Step s42 described above and performs the transmission of the telephone communication.

In this manner, in the example in FIG. 23, the controller 100 of the instruction receiving apparatus 10 determines whether or not to control the telephone arrival notification in the target other side apparatus 10 based on the notification of the ambient sound transmitted from the target other side apparatus 10. Accordingly, the instruction receiving apparatus 10 can appropriately control the telephone arrival notification in the target other side apparatus 10 in accordance with the target other side user. For example, it is possible to reduce a possibility that the notification of the telephone arrival sound is transmitted from the target other side apparatus 10 to the other side user located in the location where the movie is being shown. For example, it is possible to reduce a possibility that the notification of the telephone arrival sound is transmitted from the target other side apparatus 10 to the other side user located in the meeting room where the meeting is being conducted.

When the location specified from the apparatus position information of the target other side apparatus 10 is not the inappropriate location, the instruction receiving apparatus 10 may perform the transmission of the telephone communication on the target other side apparatus 10.

Seventh Example

In the present example, the apparatus information includes desired communication information 600. The desired communication information 600 is information indicating a communication desired by the electronic apparatus 10, that is the telephone communication or the message communication, for each location.

Figure 24:
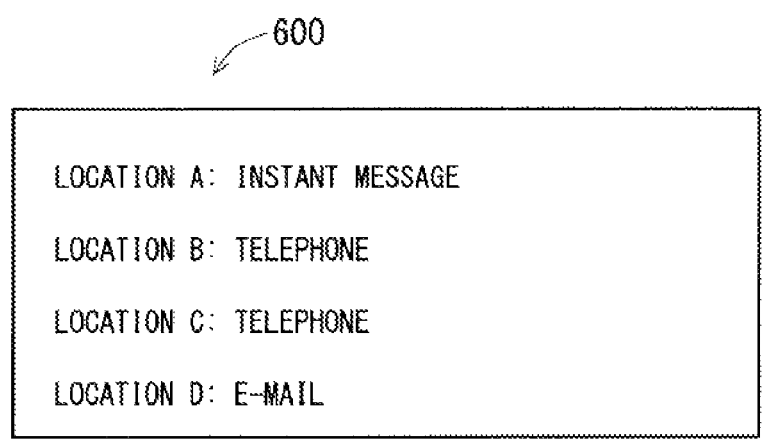
FIG. 24 illustrates a drawing showing one example of desired communication information.

FIG. 24 is a drawing showing one example of contents indicated by the desired communication information 600. In the example in FIG. 24, the desired communication information 600 indicates a communication desired by the electronic apparatus 10 in each of locations A to D. The electronic apparatus 10 desires an execution of an instant message communication in the location A, an execution of a telephone communication in the locations B and C, and an execution of an e-mail communication in the location D. The location A is a meeting room, for example. The location B and C are work-site different from each other, for example. The location D is a home of a user of the electronic apparatus 10, for example. In the desired communication information 600, position information of each location and communication type information indicating the communication which the electronic apparatus 10 desires to execute in that location are associated with each other. The user operates the display surface 12, for example, thereby being able to input, to the electronic apparatus 10, the position information of each location and the communication type information indicating the communication which the user desires to execute. The electronic apparatus 10 registers, in the desired communication information 600, the input communication type information as the communication type information indicating the communication desired by the subject device.

Figure 25:
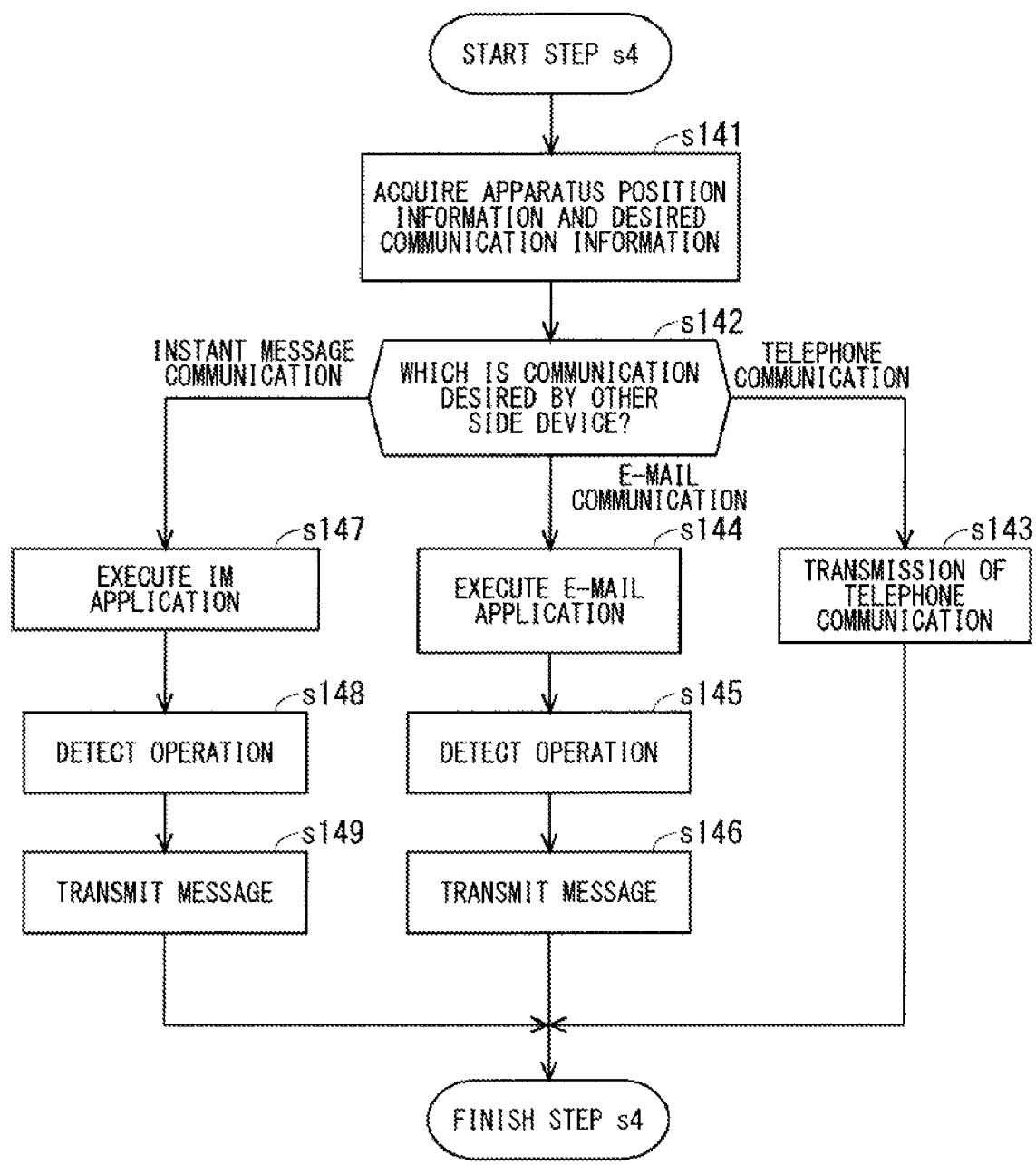
FIG. 25 illustrates a flow chart showing one example of an operation of the electronic apparatus.

FIG. 25 is a flow chart illustrating Step s4 according to the present example. As illustrated in FIG. 25, in Step s141, the controller 100 acquires the apparatus position information and desired communication information from the apparatus information of the target other side apparatus 10. Next, in Step s142, the controller 100 specifies the communication of which the target other side apparatus 10 desires the execution in the location specified from the apparatus position information based on the apparatus position information and the desired communication information. The controller 100 acquires the communication type information associated with the position information of the location including a location indicated by the apparatus position information. Then, the controller 100 sets the communication indicated by the acquired communication type information to the communication of which the target other side apparatus 10 desires the execution in the location specified from the apparatus position information. That is to say, the controller 100 sets the communication indicated by the acquired communication type information to the communication of which the target other side apparatus 10 desires the execution in the location where the target other side apparatus 10 is currently located.

If the telephone communication is specified in Step s142, the instruction receiving apparatus 10 performs the transmission of the telephone communication to the target other side apparatus 10 in Step s143.

When the e-mail communication is specified in Step s142, the controller 100 executes the e-mail application in the storage 103 in Step s144. Next, in Step s145, the touch panel 130 detects a transmission destination selection operation of selecting a transmission destination of the massage, an input operation of the message, and a transmission instruction operation of the message performed on the display surface 12. The user of the instruction receiving apparatus 10 selects the target other side apparatus 10 as a transmission destination of the message. After Step s145, in Step s146, the instruction receiving apparatus 10 transmits the message to the selected other side apparatus 10, that is to say, the target other side apparatus 10 using the e-mail communication. In the target other side apparatus 10 which has received the message from the instruction receiving apparatus 10, the e-mail application is activated, and the controller 100 makes the display 120 display the received message.

When the instant message communication is specified in Step s142, the controller 100 executes the IM application in the storage 103 in Step s147. Next, in Step s148, the touch panel 130 detects a transmission destination selection operation of selecting a transmission destination of the massage, an input operation of the message, and a transmission instruction operation of the message performed on the display surface 12. The user of the instruction receiving apparatus 10 selects the target other side apparatus 10 as a transmission destination of the message. After Step s148, in Step s149, the instruction receiving apparatus 10 transmits the message to the selected other side apparatus 10, that is to say, the target other side apparatus 10 using the instant message communication. In the target other side apparatus 10 which has received the message from the instruction receiving apparatus 10, the IM application is activated, and the controller 100 makes the display 120 display the received message.

When the controller 100 executes the message communication application in Steps s144 and s147, the controller 100 may automatically set the transmission destination of the message to the target other side apparatus 10. Accordingly, in Steps s145 and s148, the user needs not perform the transmission destination selection operation on the display surface 12.

In this manner, in the example in FIG. 25, the controller 100 determines to execute the communication, that is the telephone communication or the message communication, of which the target other side apparatus 10 desires the execution in the location specified from the apparatus position information of the target other side apparatus 10. In the example described above, the controller 100 determines to execute the communication, that is the telephone communication, the e-mail communication, or the instant message communication, of which the target other side apparatus 10 desires the execution in the location specified from the apparatus position information of the target other side apparatus 10. Accordingly, the target other side apparatus 10 can perform the communication desired by the subject device with the instruction receiving apparatus 10.

Figure 26:
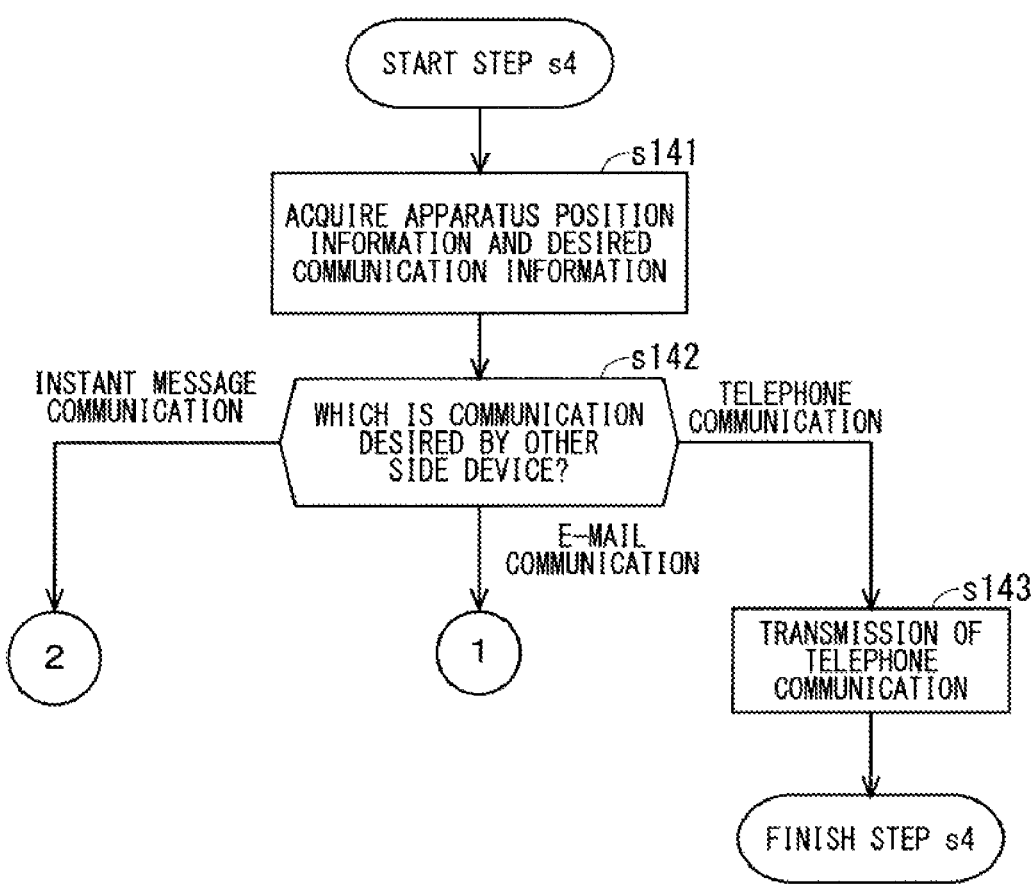
FIG. 26 illustrates a flow chart showing one example of an operation of the electronic apparatus.
Figure 27:
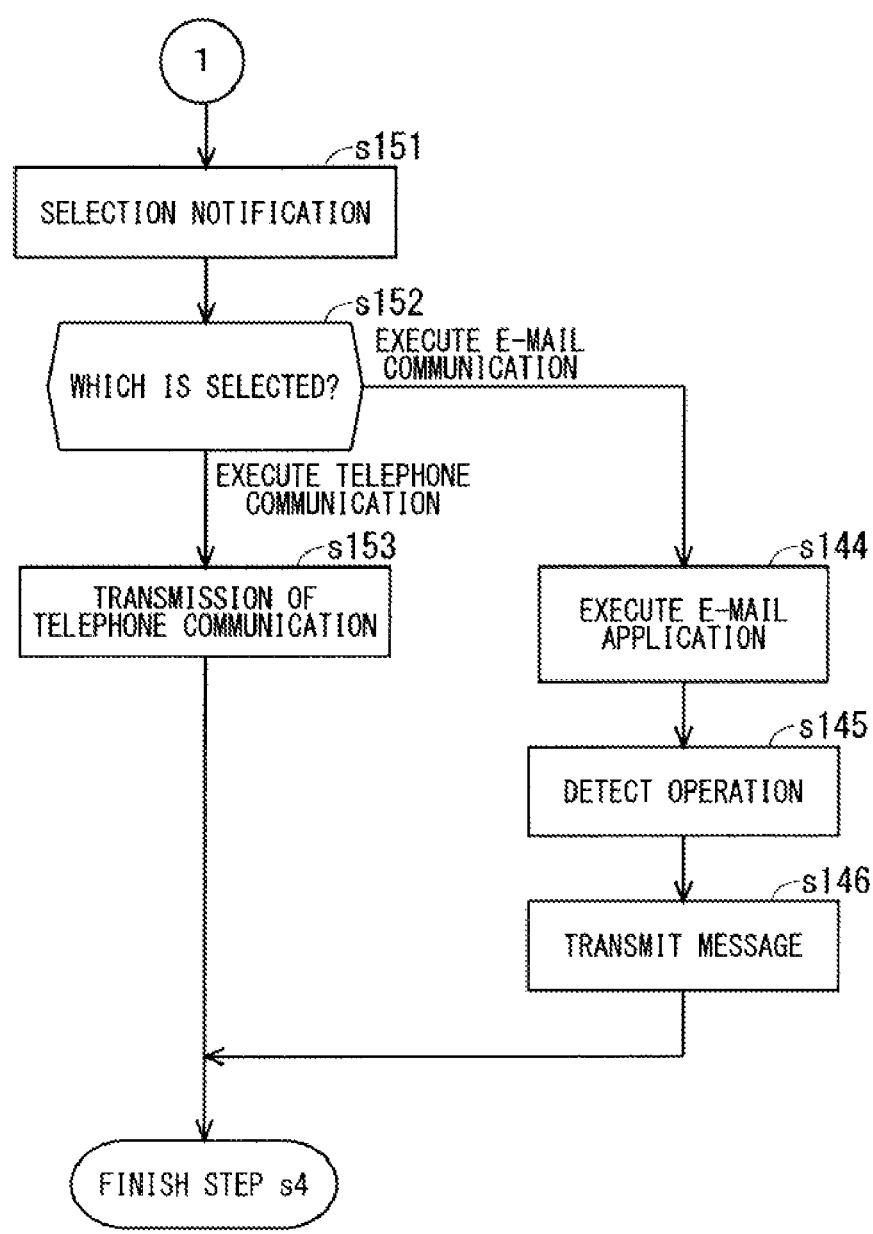
FIG. 27 illustrates a flow chart showing one example of an operation of the electronic apparatus.
Figure 28:
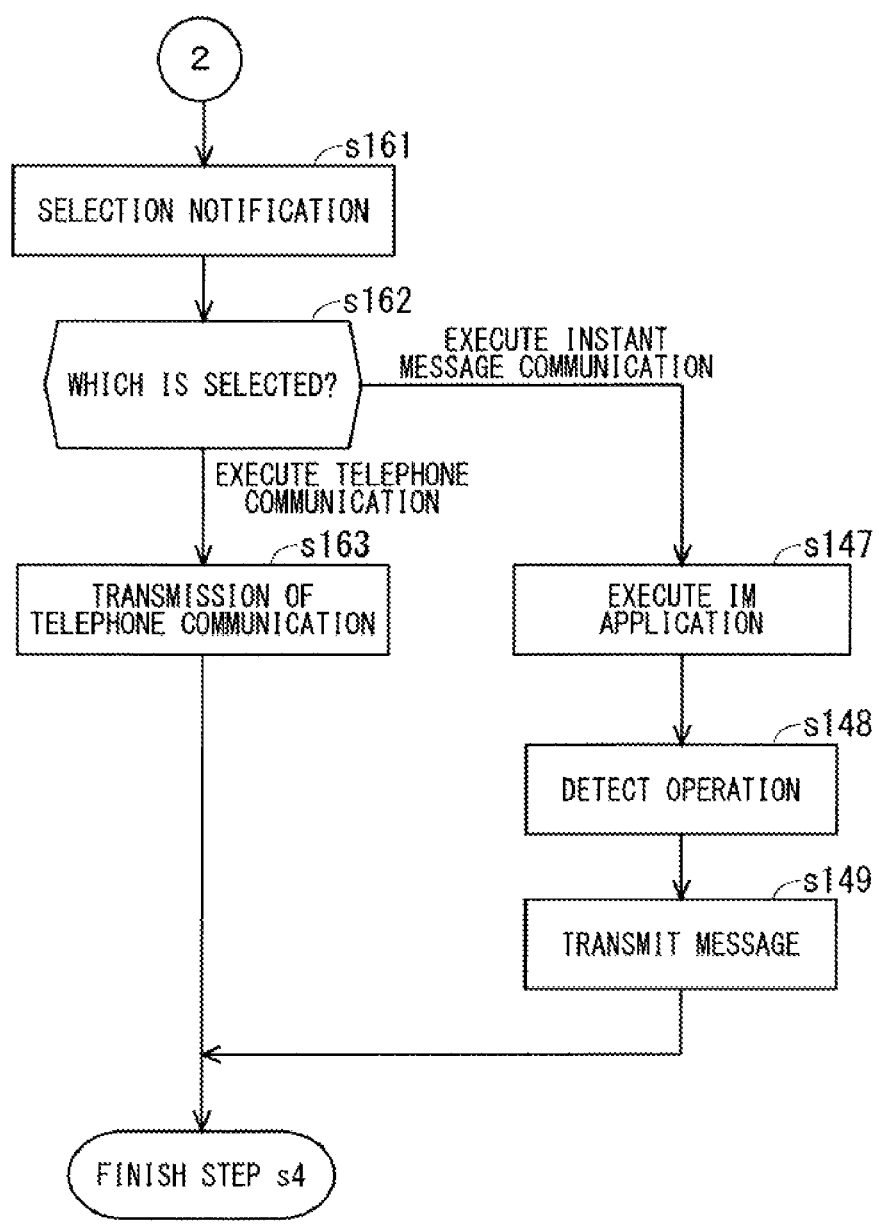
FIG. 28 illustrates a flow chart showing one example of an operation of the electronic apparatus.

When the message communication is specified in Step s142, the instruction receiving apparatus 10 may determine to execute the communication, that is the telephone communication or the message communication, selected by the user of the instruction receiving apparatus 10. FIGS. 26 to 28 are flow charts illustrating Step s4 in this case. As illustrated in FIG. 26, when the e-mail communication is specified in Step s142, as illustrated in FIG. 27, the instruction receiving apparatus 10 executes Step s151. In Step s151, the controller 100 makes the notification unit notify that the subject device user selects one of the execution of the telephone communication and the execution of the e-mail communication. The display 120, for example, can be used as the notification unit. In Step s151, the controller 100 makes the display 120 display a selection screen 700 for the subject device user to select one of the execution of the telephone communication and the execution of the e-mail communication, for example.

Figure 29:
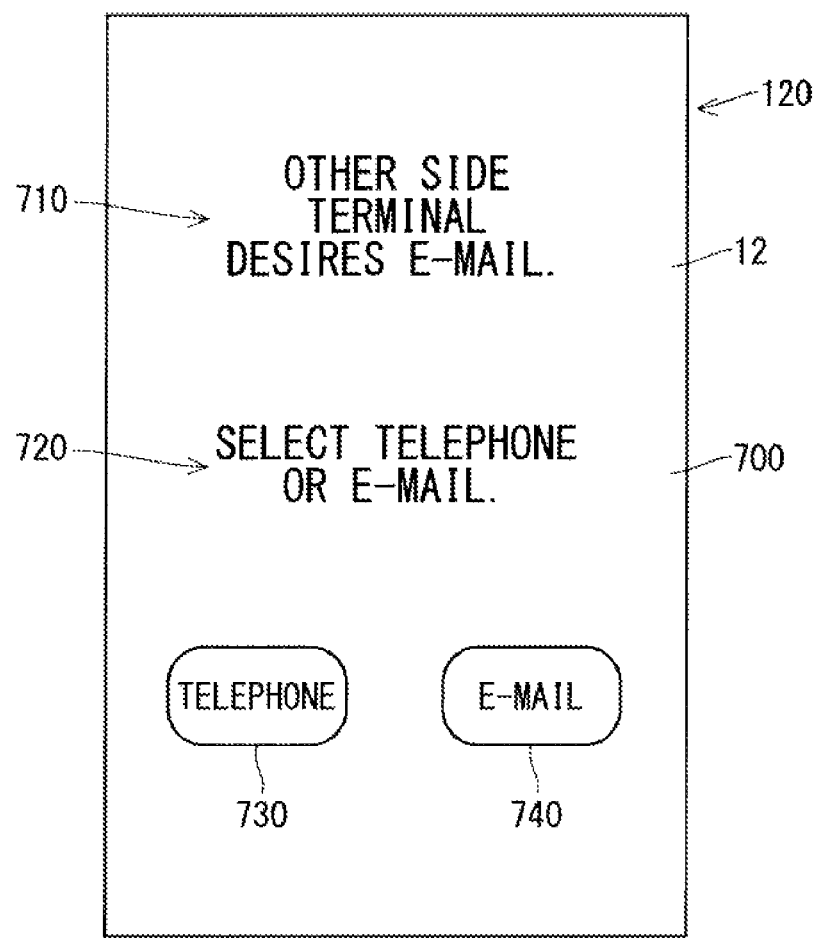
FIG. 29 illustrates a drawing showing one example of a display of the electronic apparatus.

FIG. 29 is a drawing showing one example of the selection screen 700. As illustrated in FIG. 29, the selection screen 700 includes, for example, notification information 710, instruction information 720, and selection buttons 730 and 740. The notification information 710 is information of notifying that the target other side apparatus 10 desires the e-mail communication. The instruction information 720 is information of instructing to select one of the execution of the telephone communication and the execution of the e-mail communication. The selection button 730 is a button operated by the user when the user selects the execution of the telephone communication. The selection button 740 is a button operated by the user when the user selects the execution of the e-mail communication. The user performs a tap operation, for example, on the selection button 730, thereby being able to transmit the notification of selecting the execution of the telephone communication to the electronic apparatus 10. The user performs a tap operation, for example, on the selection button 740, thereby being able to transmit the notification of selecting the execution of the e-mail communication to the electronic apparatus 10. The notification information 710 needs not be displayed on the selection screen 700.

After the selection screen 700 is displayed in Step s151, the controller 100 determines whether the subject device user selects the execution of the telephone communication or the execution of the e-mail communication based on the detection result in the touch panel 130 in Step s152. The controller 100 determines that the subject device user selects the execution of the telephone communication when the touch panel 130 detects the operation performed on the selection button 730. In the meanwhile, the controller 100 determines that the subject device user selects the execution of the e-mail communication when the touch panel 130 detects the operation performed on the selection button 740.

When it is determined that the execution of the telephone communication is selected in Step s152, the instruction receiving apparatus 10 performs the transmission of the telephone communication to the target other side apparatus 10 in Step s153. In the meanwhile, when it is determined that the execution of the e-mail communication is selected in Step s152, the instruction receiving apparatus 10 executes Steps s144 to s146 described above and transmits the message.

When the instant message communication is specified in Step s142, as illustrated in FIG. 28, the instruction receiving apparatus 10 executes Step s161. In Step s161, the controller 100 makes the notification unit notify that the subject device user selects one of the execution of the telephone communication and the execution of the instant message communication. The display 120, for example, can be used as the notification unit. In Step s161, the controller 100 makes the display 120 display a selection screen 800 for the subject device user to select one of the execution of the telephone communication and the execution of the instant message communication, for example.

Figure 30:
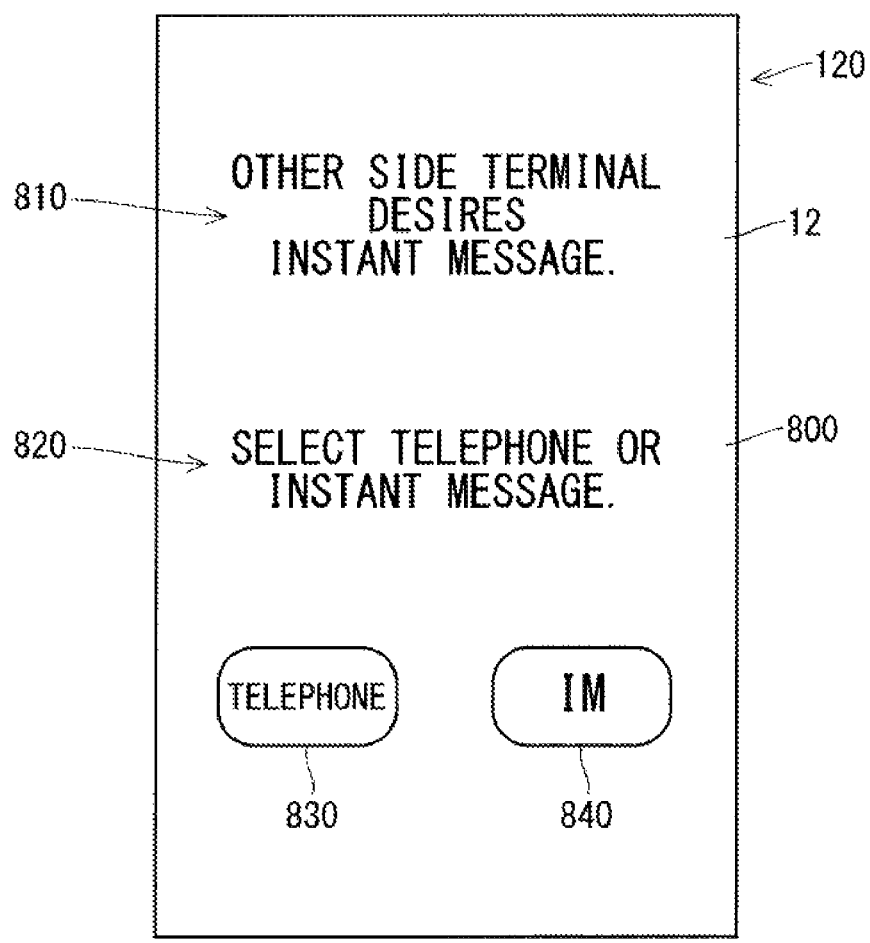
FIG. 30 illustrates a drawing showing one example of a display of the electronic apparatus.

FIG. 30 is a drawing illustrating one example of the selection screen 800. As illustrated in FIG. 30, the selection screen 800 includes, for example, notification information 810, instruction information 820, and selection buttons 830 and 840. The notification information 810 is information of notifying that the target other side apparatus 10 desires the instant message communication. The instruction information 820 is information of instructing to select one of the execution of the telephone communication and the execution of the instant message communication. The selection button 830 is a button operated by the user when the user selects the execution of the telephone communication. The selection button 840 is a button operated by the user when the user selects the execution of the instant message communication. The user performs a tap operation, for example, on the selection button 830, thereby being able to transmit the notification of selecting the execution of the telephone communication to the electronic apparatus 10. The user performs a tap operation, for example, on the selection button 840, thereby being able to transmit the notification of selecting the execution of the instant message communication to the electronic apparatus 10. The notification information 810 needs not be displayed on the selection screen 800.

After the selection screen 800 is displayed in Step s161, the controller 100 determines whether the subject device user selects the execution of the telephone communication or the execution of the instant message communication based on the detection result in the touch panel 130 in Step s162. The controller 100 determines that the subject device user selects the execution of the telephone communication when the touch panel 130 detects the operation performed on the selection button 830. In the meanwhile, the controller 100 determines that the subject device user selects the execution of the instant message communication when the touch panel 130 detects the operation performed on the selection button 840.

When it is determined that the execution of the telephone communication is selected in Step s162, the instruction receiving apparatus 10 performs the transmission of the telephone communication to the target other side apparatus 10 in Step s163. In the meanwhile, when it is determined that the execution of the instant message communication is selected in Step s162, the instruction receiving apparatus 10 executes Steps s147 to s149 described above and transmits the message.

As described above, in the example in FIGS. 26 to 28, when the target other side apparatus 10 desires the message communication, the user of the instruction receiving apparatus 10 can select whether to make the instruction receiving apparatus 10 execute the telephone communication or execute the message communication, thus the convenience of the electronic apparatus 10 is increased.

In Steps s151 and s161, the notification unit transmitting the notification to the user of the instruction receiving apparatus 10 may be a unit other than the display 120. For example, the receiver 150, the speaker 160, the vibrator 230, or the light-emitting unit 250 may transmit the notification to the user. At least two of the display 120, the receiver 150, the speaker 160, the vibrator 230, and the light-emitting unit 250 may transmit the notification to the user.

In Step s141, when the instruction receiving apparatus 10 cannot specify the communication of which the target other side apparatus 10 desires the execution in the location specified from the apparatus position information of the target other side apparatus 10, the instruction receiving apparatus 10 may performs the transmission of the telephone communication to the target other side apparatus 10 in the manner similar to Step s143.

Eighth Example

When the electronic apparatus 10 intends to execute the telephone communication with the other side apparatus 10 whose apparatus position information has been acquired previously, the electronic apparatus 10 cannot newly acquire the apparatus position information of the other side apparatus 10 in some cases.

Considered is a case where the electronic apparatus 10 receives the apparatus information of the other side apparatus 10 from the server device 50, for example. In this case, if a failure occurs in the network 2, the electronic apparatus 10 cannot newly acquire the apparatus information of the other side apparatus 10 from the server device 50 in some cases. As a result, the electronic apparatus 10 cannot newly acquire the apparatus position information of the other side apparatus 10 in some cases.

Considered is a case where the electronic apparatus 10 receives the apparatus information of the other side apparatus 10 from the other side apparatus 10 via the network 2 without the server device 50. Even in this case, if a failure occurs in the network 2, the electronic apparatus 10 cannot newly acquire the apparatus position information of the other side apparatus 10 in some cases.

Considered is a case where the other side apparatus 10 with which the electronic apparatus 10 intends to execute the telephone communication transmits the GPS position information as the apparatus position information of the other side apparatus 10. In this case, the electronic apparatus 10 cannot newly acquire the apparatus position information of the other side apparatus 10 when the other side apparatus 10 cannot acquire the GPS position information. The other side apparatus 10 cannot acquire the GPS position information in some cases when the other side apparatus 10 moves underground or in a building, for example. The other side apparatus 10 cannot acquire the GPS position information when the other side apparatus 10 suspends the operation of the position acquisition unit 140 in accordance with the instruction of the user, for example.

In this manner, when the electronic apparatus 10 cannot newly acquire the apparatus position information of the other side apparatus 10 with which the electronic apparatus 10 intends to execute the telephone communication, the electronic apparatus 10 may execute processing, in Step s4, based on the apparatus position information of the other side apparatus 10 which has been acquired most recently. In other words, the electronic apparatus 10 may execute Step s4 using the apparatus position information which has been acquired most newly in the apparatus position information of the other side apparatus 10 which has been acquired previously.

Considered is a case where the instruction receiving apparatus 10 acquires the apparatus information from the server device 50, for example. In this case, in Step s2 described above, when the instruction receiving apparatus 10 cannot receive the apparatus information of the target other side apparatus 10 from the server device 50 after transmitting the first request signal described above to the server device 50, the instruction receiving apparatus 10 may execute Step s4 using the position information of the target other side apparatus 10 which has been acquired most recently. When the apparatus information of the target other side apparatus 10 received from the server device 50 does not include the apparatus position information after the instruction receiving apparatus 10 transmits the first request signal to the server device 50, the instruction receiving apparatus 10 may execute Step s4 using the position information of the target other side apparatus 10 which has been acquired most recently.

Considered as the other example is a case where the instruction receiving apparatus 10 acquires the apparatus information from the target other side apparatus 10 without the server device 50. In this case, in Step s2, when the instruction receiving apparatus 10 cannot receive the apparatus information from the target other side apparatus 10 after transmitting the second request signal described above to the target other side apparatus 10, the instruction receiving apparatus 10 may execute Step s4 using the position information of the target other side apparatus 10 which has been acquired most recently. When the apparatus information received from the target other side apparatus 10 does not include the apparatus position information after the instruction receiving apparatus 10 transmits the second request signal to the target other side apparatus 10, the instruction receiving apparatus 10 may execute Step s4 using the position information of the target other side apparatus 10 which has been acquired most recently.

In this manner, when the instruction receiving apparatus 10 cannot newly acquire the apparatus position information of the target other side apparatus 10, in Step s4, the instruction receiving apparatus 10 executes the processing based on the apparatus position information of the target other side apparatus 10 which has been acquired most recently, thereby being able to appropriately execute Step s4 even if the instruction receiving apparatus 10 cannot newly acquire the apparatus position information of the target other side apparatus 10.

Ninth Example

When the instruction receiving apparatus 10 cannot newly acquire the apparatus position information of the target other side apparatus 10, the instruction receiving apparatus 10 may generate the position information indicating a predicted location of the target other side apparatus 10 and perform the processing based on the generated position information in Step s4. The instruction receiving apparatus 10 can generate the position information indicating the predicted location of the target other side apparatus 10 based on the apparatus position information of the target other side apparatus 10 which has been acquired most recently and the information regarding the movement of the target other side apparatus 10. The information regarding the movement of the electronic apparatus 10 is referred to as "movement information" in some cases hereinafter. The position information indicating the predicted location of the electronic apparatus 10 is referred to as "predicted position information" in some cases.

The movement information includes a movement direction and movement distance of the electronic apparatus 10 in the present example. In the present example, the electronic apparatus 10 transmits the apparatus information including sensor information indicating the detection result of the sensor device 200. The sensor information includes a detection result of an accelerometer and gyro sensor included in the sensor device 200.

Considered is a case where the instruction receiving apparatus 10 acquires the apparatus information from the server device 50, for example. In this case, in Step s2 described above, when the instruction receiving apparatus 10 cannot receive the apparatus information of the target other side apparatus 10 from the server device 50 after transmitting the first request signal described above to the server device 50, the instruction receiving apparatus 10 generates the predicted position information of the target other side apparatus 10 based on the position information of the target other side apparatus 10 which has been acquired most recently and the sensor information which has been acquired previously. When the apparatus information of the target other side apparatus 10 received from the server device 50 does not include the apparatus position information after the instruction receiving apparatus 10 transmits the first request signal to the server device 50, the instruction receiving apparatus 10 generates the predicted position information of the target other side apparatus 10 based on the position information of the target other side apparatus 10 which has been acquired most recently and the sensor information which has been acquired previously. The controller 100 of the instruction receiving apparatus 10 specifies the movement direction and movement distance in which the subject device has moved from a location indicated by the apparatus position information which has been acquired by the subject device most recently based on the sensor information which has been acquired by the subject device previously. Then, the controller 100 generates the predicted position information of the subject device, that is to say, the position information indicating the current predicted location of the subject device based on the location indicated by the apparatus position information which has been acquired by the subject device most recently and the specified movement direction and movement distance. The instruction receiving apparatus 10 executes Step s4 using the generated predicted position information.

Considered as the other example is a case where the instruction receiving apparatus 10 acquires the apparatus information from the target other side apparatus 10 without the server device 50. In this case, in Step s2, when the instruction receiving apparatus 10 cannot receive the apparatus information from the target other side apparatus 10 after transmitting the second request signal described above to the target other side apparatus 10, the instruction receiving apparatus 10 generates the predicted position information of the target other side apparatus 10 based on the position information of the target other side apparatus 10 which has been acquired most recently and the sensor information which has been acquired previously in the manner similar to the above processing. Also when the apparatus information received from the target other side apparatus 10 does not include the apparatus position information after the instruction receiving apparatus 10 transmits the second request signal to the target other side apparatus 10, the instruction receiving apparatus 10 generates the predicted position information of the target other side apparatus 10 based on the position information of the target other side apparatus 10 which has been acquired most recently and the sensor information which has been acquired previously. Then, the instruction receiving apparatus 10 executes Step s4 using the generated predicted position information.

In this manner, when the instruction receiving apparatus 10 cannot newly acquire the apparatus position information of the target other side apparatus 10, the instruction receiving apparatus 10 generates the predicted position information of the target other side apparatus 10 based on the apparatus position information of the target other side apparatus 10 which has been acquired most recently and the movement information of the target other side apparatus 10, thereby being able to appropriately execute Step s4 even if the instruction receiving apparatus 10 cannot newly acquire the apparatus position information of the target other side apparatus 10.

Tenth Example

When the instruction receiving apparatus 10 cannot acquire the apparatus position information of the target other side apparatus 10, the instruction receiving apparatus 10 may generate the predicted position information of the target other side apparatus 10 based on schedule information of the user of the target other side apparatus 10 and execute processing based on the generated predicted position information in Step s4. In this case, the electronic apparatus 10 transmits the apparatus information including the schedule information of the user registered by the user. The user operates the display surface 12, for example, thereby being able to register the schedule information in the electronic apparatus 10.

FIG. 31 is a drawing illustrating one example of schedule information 850 at a certain date. As illustrated in FIG. 31, the schedule information 850 includes a date 851 and plan information 852 indicating each plan at the date 851. There is the plan information 852 for each plan. The plan information 852 includes a period 853 and a plan content 854 for a plan thereof. In the example in FIG. 31, the schedule information 850 includes three pieces of plan information 852a to 852c indicating three plans of the user, respectively. The schedule information 850 is not limited to the example in FIG. 31.

Considered is a case where the instruction receiving apparatus 10 acquires the apparatus information from the server device 50, for example. In this case, in Step s2 described above, when the instruction receiving apparatus 10 cannot receive the apparatus information of the target other side apparatus 10 from the server device 50 after transmitting the first request signal described above to the server device 50, the instruction receiving apparatus 10 generates the predicted position information of the target other side apparatus 10 based on today's schedule information 850 which has been acquired most recently. When the apparatus information of the target other side apparatus 10 received from the server device 50 does not include the apparatus position information after the instruction receiving apparatus 10 transmits the first request signal to the server device 50, the instruction receiving apparatus 10 generates the predicted position information of the target other side apparatus 10 based on the today's schedule information 850 included in the apparatus information or the today's schedule information 850 which has been acquired most recently. Then, the instruction receiving apparatus 10 executes Step s4 using the generated predicted position information.

Considered as the other example is a case where the instruction receiving apparatus 10 acquires the apparatus information from the target other side apparatus 10 without the server device 50. In this case, in Step s2, when the instruction receiving apparatus 10 cannot receive the apparatus information from the target other side apparatus 10 after transmitting the second request signal described above to the target other side apparatus 10, the instruction receiving apparatus 10 generates the predicted position information of the target other side apparatus 10 based on the today's schedule information 850 which has been acquired most recently. When the apparatus information received from the target other side apparatus 10 does not include the apparatus position information after the instruction receiving apparatus 10 transmits the second request signal to the target other side apparatus 10, the instruction receiving apparatus 10 generates the predicted position information of the target other side apparatus 10 based on the today's schedule information 850 included in the apparatus information or the today's schedule information 850 which has been acquired most recently. Then, the instruction receiving apparatus 10 executes Step s4 using the generated predicted position information.

In the instruction receiving apparatus 10, the controller 100 acquires the plan information 852 which includes the period 853 including a current time from the today's schedule information 850. That is to say, the controller 100 acquires the plan information 852 indicating a current plan of the target other side user from the schedule information 850. Then, the controller 100 generates the predicted position information based on the plan content 854 included in the acquired plan information 852.

Considered, for example, is a case where the plan information 852 which includes the period 853 including the current time is the plan information 852a illustrated in FIG. 31. In this case, the controller 100 generates the predicted position information indicating that the target other side apparatus 10 is located in a meeting room based on the plan content 854 of the plan information 852a.

Considered as the other example is a case where the plan information 852 which includes the period 853 including the current time is the plan information 852 illustrated in FIG. 31. In this case, the controller 100 generates the predicted position information indicating that the target other side apparatus 10 is located in a factory based on the plan content 854 of the plan information 852b.

Considered as the other example is a case where the plan information 852 which includes the period 853 including the current time is the plan information 852c illustrated in FIG. 31. In this case, the controller 100 generates the predicted position information indicating that the target other side apparatus 10 is located in a movie theater based on the plan content 854 of the plan information 852c.

In this manner, when the instruction receiving apparatus 10 cannot acquire the apparatus position information of the target other side apparatus 10, the instruction receiving apparatus 10 generates the predicted position information of the target other side apparatus 10 based on the schedule information of the user of the target other side apparatus 10, thereby being able to appropriately execute Step s4 even if the instruction receiving apparatus 10 cannot acquire the apparatus position information of the target other side apparatus 10.

Eleventh Example

The electronic apparatus 10 may transmit the apparatus information including a plural types of apparatus position information. For example, the electronic apparatus 10 may transmit the apparatus information including the GPS position information and at least one type of apparatus position information of the apparatus position information based on the communication base station described above, the apparatus position information based on the beacon information, and the apparatus position information based on the AR tag. In such a case, when the instruction receiving apparatus 10 cannot acquire the GPS position information of the target other side apparatus 10, the instruction receiving apparatus 10 may execute processing based on the other type of apparatus position information of the target other side apparatus 10 in Step s4.

Considered is a case where the instruction receiving apparatus 10 acquires the apparatus information from the server device 50, for example. In this case, in Step s2 described above, when the apparatus information of the target other side apparatus 10 received from the server device 50 includes the GPS position information after the instruction receiving apparatus 10 transmits the first request signal described above to the server device 50, the instruction receiving apparatus 10 executes Step s4 using the GPS apparatus position information. In the meanwhile, when the apparatus information of the target other side apparatus 10 received from the server device 50 does not include the GPS position information, the instruction receiving apparatus 10 executes Step s4 using the other type of apparatus position information included in the apparatus information (for example, the apparatus position information based on the communication base station).

Considered as the other example is a case where the instruction receiving apparatus 10 acquires the apparatus information from the target other side apparatus 10 without the server device 50. In this case, in Step s2, when the apparatus information of the target other side apparatus 10 received from the server device 50 includes the GPS position information after the instruction receiving apparatus 10 transmits the second request signal described above to the target other side apparatus 10, the instruction receiving apparatus 10 executes Step s4 using the GPS apparatus position information. In the meanwhile, when the apparatus information, which is received from the target other side apparatus 10, received from the server device 50 does not include the GPS position information, the instruction receiving apparatus 10 executes Step s4 using the other type of apparatus position information included in the apparatus information.

In this manner, when the instruction receiving apparatus 10 cannot acquire the apparatus position information of the target other side apparatus 10 using in Step s4, the instruction receiving apparatus 10 performs the processing based on the other type of apparatus position information in Step s4, thereby being able to appropriately execute Step s4 even if the instruction receiving apparatus 10 cannot acquire the apparatus position information of the target other side apparatus 10 using in Step s4.

Twelfth Example

In the present example, the controller 100 of the instruction receiving apparatus 10 performs processing different from Step s4 described above in response to the transmission instruction in Step s1 if the controller 100 cannot acquire the apparatus position information of the target other side apparatus 10.

For example, in the case where the instruction receiving apparatus 10 acquires the apparatus information from the server device 50, in Step s2, when the instruction receiving apparatus 10 cannot receive the apparatus information of the target other side apparatus 10 from the server device 50 after transmitting the first request signal described above to the server device 50, the instruction receiving apparatus 10 executes processing different from Step s4. When the apparatus information received from the server device 50 does not include the apparatus position information after the instruction receiving apparatus 10 transmits the first request signal to the server device 50, the instruction receiving apparatus 10 executes processing different from Step s4. In the case where the instruction receiving apparatus 10 acquires the apparatus information from the target other side apparatus 10 without the server device 50, in Step s2, when the instruction receiving apparatus 10 cannot receive the apparatus information from the target other side apparatus 10 after transmitting the second request signal described above to the target other side apparatus 10, the instruction receiving apparatus 10 executes processing different from Step s4. When the apparatus information received from the target other side apparatus 10 does not include the apparatus position information after the instruction receiving apparatus 10 transmits the second request signal to the target other side apparatus 10, the instruction receiving apparatus 10 executes processing different from Step s4. The processing different from Step s4 executed by the instruction receiving apparatus 10 when the instruction receiving apparatus 10 cannot acquire the apparatus position information of the target other side apparatus 10 is simply referred to as "the different processing" hereinafter. Various examples of the different processing are described hereinafter.

<First Example of Different Processing>

In the different processing according to the present example, the controller 100 of the instruction receiving apparatus 10 determines to perform the telephone communication corresponding to the transmission instruction in Step s1. Then, the instruction receiving apparatus 10 performs the transmission of the telephone communication to the target other side apparatus 10 in the manner similar to Steps s14 and s34 described above. The target other side apparatus 10 at which the transmission of the telephone communication of the instruction receiving apparatus 10 has arrived performs processing corresponding to the setting of the subject device. For example, the target other side apparatus 10 performs the telephone arrival notification in accordance with the setting regarding the telephone arrival notification in the subject device.

<Second Example of Different Processing>

FIG. 32 is a flow chart illustrating the different processing according to the present example. As illustrated in FIG. 32, in the different processing according to the present example, in Step s171, the controller 100 of the instruction receiving apparatus 10 determines to execute the message communication in place of executing the telephone communication. Then, the instruction receiving apparatus 10 executes Steps s16 to s18 described above and transmits the message. Accordingly, the instruction receiving apparatus 10 can transmit the message instead of executing the telephone communication when the location of the target other side apparatus 10 is not recognized.

Figure 33:
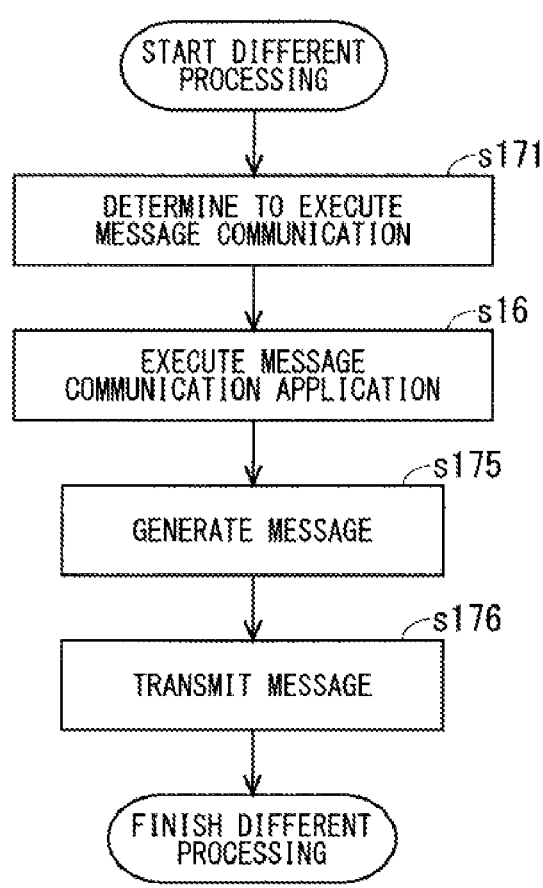
FIG. 33 illustrates a flow chart showing one example of an operation of the electronic apparatus.

The instruction receiving apparatus 10 may automatically generate the message without the instruction from the user and transmit the message to the target other side apparatus 10. FIG. 33 is a flow chart illustrating the different processing in this case. As illustrated in FIG. 33, after Step s16, the controller 100 generates the message for the target other side apparatus 10 in Step s175. Then, the controller 100 makes the wireless communication unit 110 transmit the generated message to the target other side apparatus 10 in Step s176. The target other side apparatus 10 which has received the message activates the message communication application, and displays the received message on the display 120.

Figure 34:
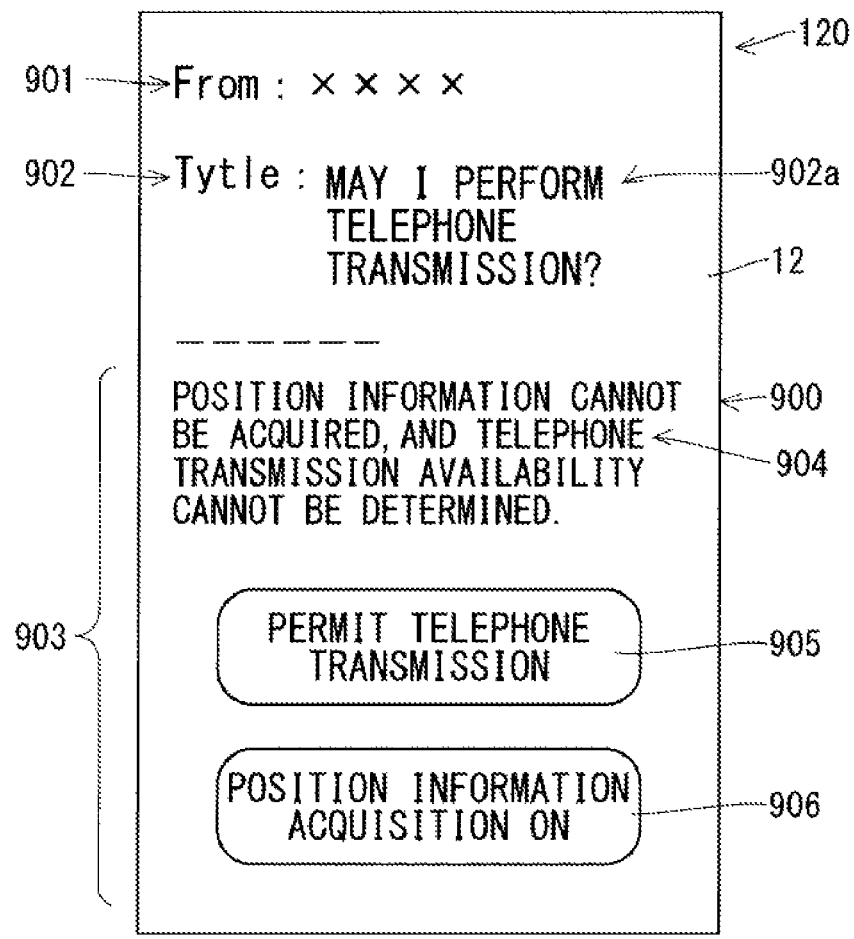
FIG. 34 illustrates a drawing showing one example of a display of the electronic apparatus.

FIG. 34 is a drawing illustrating one example that the target other side apparatus 10 displays a message 900 transmitted in Step s176. As illustrated in FIG. 34, the message 900 includes transmission source information 901 indicating a transmission source of the message 900, a subject 902, and a text 903.

In the example in FIG. 34, the subject 902 indicates notification information 902a transmitting a notification of inquiry whether the instruction receiving apparatus 10 can perform the telephone transmission to the target other side apparatus 10.

In the example in FIG. 34, the text 903 includes information 904 indicating that the instruction receiving apparatus 10 cannot acquire the apparatus position information of the target other side apparatus 10. The text 903 further includes operation buttons 905 and 906.

The operation button 905 is an operation button for the target other side apparatus 10 to transmit permission notification information of permitting the execution of the telephone transmission to the instruction receiving apparatus 10. When a tap operation, for example, is performed on the operation button 905, the controller 100 of the target other side apparatus 10 makes the wireless communication unit 110 transmit the permission notification information to the instruction receiving apparatus 10. The instruction receiving apparatus 10 automatically performs the transmission of the telephone communication on the target other side apparatus 10 in accordance with the receipt of the permission notification information from the target other side apparatus 10. That is to say, the instruction receiving apparatus 10 performs the transmission of the telephone communication on the target other side apparatus 10 in accordance with the receipt of the permission notification information from the target other side apparatus 10 without the instruction from the user.

The operation button 906 is an operation button for the target other side apparatus 10 to execute a position acquisition function of the subject device. When a tap operation, for example, is performed on the operation button 906, for example, the controller 100 of the target other side apparatus 10 operates the position acquisition unit 140 to execute the position acquisition function of the subject device.

The instruction receiving apparatus 10 may not automatically perform the transmission of the telephone communication in accordance with the receipt of the permission notification information from the target other side apparatus 10. In this case, in the instruction receiving apparatus 10 receiving the permission notification information, the notification unit may notify that the target other side apparatus 10 permits the execution of the telephone transmission to the subject device user. Upon receiving this notification, the user operates the instruction receiving apparatus 10, thereby making the instruction receiving apparatus 10 execute the telephone transmission to the target other side apparatus 10. The message 900 may not show the operation buttons 905 and 906.

In this manner, in the example in FIG. 33, the controller 100 of the instruction receiving apparatus 10 generates the message 900 for the target other side apparatus 10 without the instruction from the user, and makes the wireless communication unit 110 transmit the generated message 900, thus the convenience of the electronic apparatus 10 is increased.

In the example in FIG. 34, the message 900 transmitted from the instruction receiving apparatus 10 includes information 904 indicating that the instruction receiving apparatus 10 cannot acquire the apparatus position information of the target other side apparatus 10. Accordingly, the target other side apparatus 10 displays the received message 900, thus the target other side user can recognize that the instruction receiving apparatus 10 cannot acquire the apparatus position information of the target other side apparatus 10. In the case where the target other side apparatus 10 transmits the GPS position information as the apparatus position information of the subject device, when the operation of the position acquisition unit 140 of the target other side apparatus 10 is suspended, the instruction receiving apparatus 10 cannot acquire the apparatus position information of the target other side apparatus 10. The target other side user who recognizes that the instruction receiving apparatus 10 cannot acquire the apparatus position information of the target other side apparatus 10 operates the target other side apparatus 10, thereby being able to make the target other side apparatus 10 operate the position acquisition unit 140 when the operation of the position acquisition unit 140 is suspended. In other words, the target other side user operates the target other side apparatus 10, thereby being able to make the target other side apparatus 10 execute the position acquisition function.

In the example in FIG. 34, the controller 100 of the instruction receiving apparatus 10 generates the message 900 so that the function of acquiring the GPS position information included in the target other side apparatus 10 is executed when a predetermined part of the message 900 displayed in the target other side apparatus 10 is operated. That is to say, the controller 100 generates the message 900 so that the position acquisition unit 140 of the target other side apparatus 10 operates when the operation button 906 of the message 900 displayed in the target other side apparatus 10 is operated. Accordingly, the target other side user can make the target other side apparatus 10 operate the position acquisition unit 140 with a simple operation.

In the example in FIG. 34, the controller 100 of the instruction receiving apparatus 10 generates the message 900 so that the target other side apparatus 10 transmits the permission notification information of permitting the execution of the telephone transmission to the instruction receiving apparatus 10 when a predetermined part of the message 900 displayed in the target other side apparatus 10 is operated. That is to say, the controller 100 generates the message 900 so that the target other side apparatus 10 transmits the permission notification information to the instruction receiving apparatus 10 when the operation button 905 in the message 900 displayed in the target other side apparatus 10 is operated. Accordingly, the target other side user can make the target other side apparatus 10 transmit the permission notification information with a simple operation.

When the instruction receiving apparatus 10 performs the telephone transmission on the target other side apparatus 10 in accordance with the receipt of the permission notification information in the wireless communication unit 110, the user needs not perform the operation of telephone transmission to the instruction receiving apparatus 10, thus the convenience of the electronic apparatus 10 is further increased.

<Third Example of Different Processing>

In the different processing according to the present example, the controller 100 of the instruction receiving apparatus 10 determines not to execute the telephone transmission. Then, the controller 100 makes the wireless communication unit 110 transmit the notification information of notifying that the subject device cannot acquire the apparatus position information to the target other side apparatus 10. In the target other side apparatus 10 which has received the notification information, the controller 100 makes the notification unit notify that the instruction receiving apparatus 10 cannot acquire the apparatus position information of the subject device. For example, the controller 100 makes the display 120 display the notification information 910 of notifying that the instruction receiving apparatus 10 cannot acquire the apparatus position information.

Figure 35:
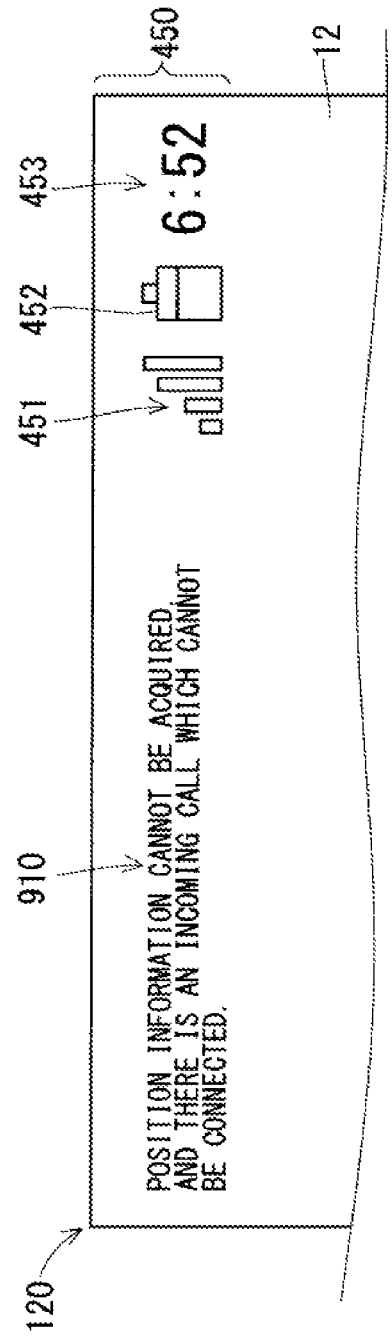
FIG. 35 illustrates a drawing showing one example of a display of the electronic apparatus.

When the display 120 of the target other side apparatus 10 displays the notification information 910, as illustrated in FIG. 35, the display 120 may indicate the notification information 910 in the notification region 450 displayed on the display surface 12.

Figure 36:
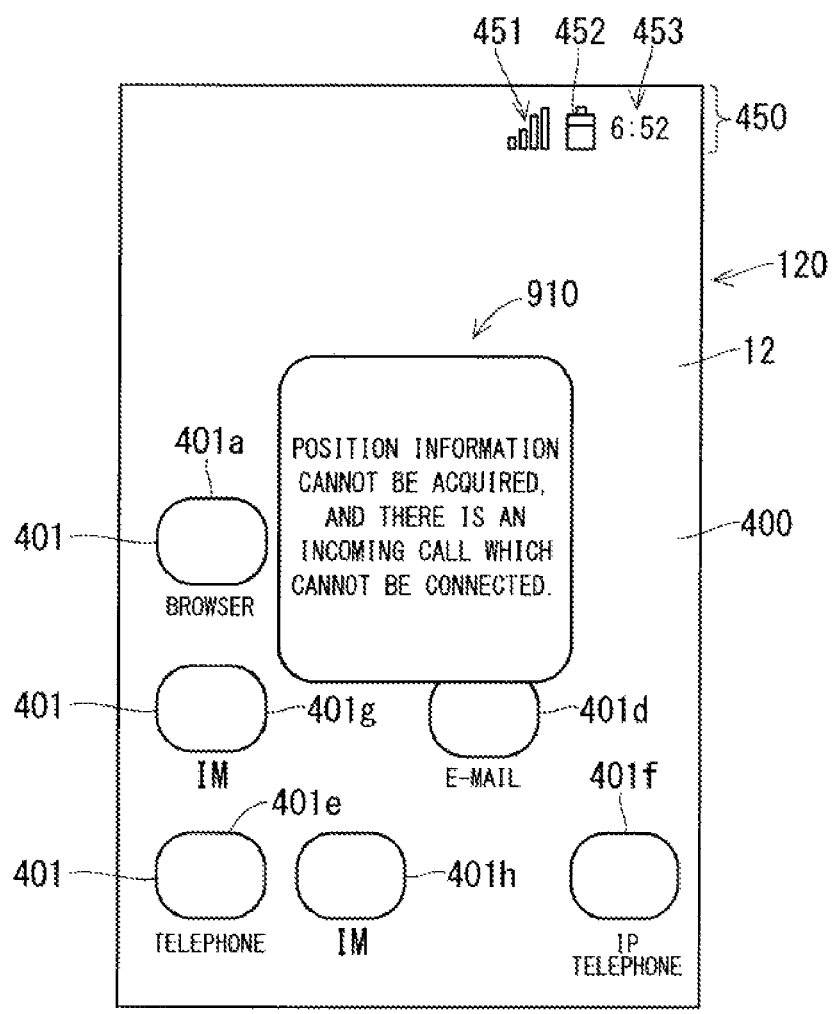
FIG. 36 illustrates a drawing showing one example of a display of the electronic apparatus.

As illustrated in FIG. 36, the display 120 may display the notification information 910 to overlap with a screen currently displayed on the display surface 12. In the example in FIG. 36, the notification information 910 is displayed to overlap with the home screen 400. The display of the notification information 910 illustrated in FIG. 36 is referred to as a pop-up display in some cases.

Figure 37:
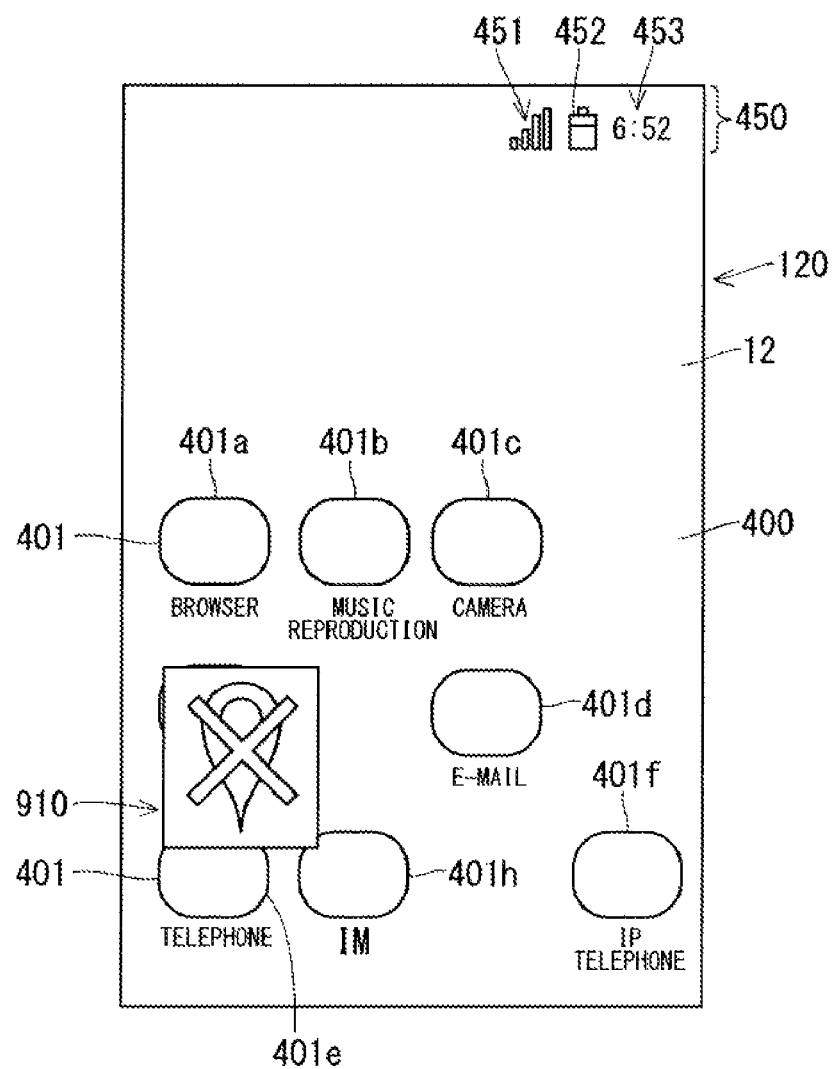
FIG. 37 illustrates a drawing showing one example of a display of the electronic apparatus.

In FIGS. 35 and 36, the display 120 displays the notification information 910 by a character string, however, as illustrated in FIG. 37, the display 120 may display the notification information 910 by an icon (in other words, a graphic) In the example in FIG. 37, the notification information 910 is displayed to overlap with the home screen 400 in the manner similar to FIG. 36.

A unit other than the display 120 may be adopted as the notification unit notifying that the instruction receiving apparatus 10 cannot acquire the apparatus position information of the target other side apparatus 10. At least two of the display 120, the speaker 160, the vibrator 230, and the light-emitting unit 250 may transmit the notification to the user.

In this manner, the instruction receiving apparatus 10 transmits the notification information of notifying that the subject device cannot acquire the apparatus position information, thus the target other side apparatus 10 can recognize that the instruction receiving apparatus 10 cannot acquire the apparatus position information of the subject device. As a result, as described above, the target other side apparatus 10 can notify that the instruction receiving apparatus 10 cannot acquire the apparatus position information of the subject device to the target other side user. The target other side user who has received the notification operates the target other side apparatus 10, for example, thereby making the target other side apparatus 10 operate the position acquisition unit 140.

<Fourth Example of Different Processing>

In the different processing according to the present example, the controller 100 of the instruction receiving apparatus 10 controls the telephone arrival notification in the target other side apparatus 10. When the subject device cannot acquire the apparatus position information of the target other side apparatus 10, the controller 100 determines that the location where the target other side apparatus 10 is located is not recognized. Then, the controller 100 controls the telephone arrival notification in the target other side apparatus 10 so that an influence of the telephone arrival notification performed by the target other side apparatus 10 on a surrounding area of the target other side apparatus 10 is reduced. For example, the controller 100 generates the control signal of instructing not to execute the telephone arrival notification by sound. Then, the instruction receiving apparatus 10 performs the telephone transmission on the target other side apparatus 10 and transmits the generated control signal to the target other side apparatus 10.

In the target other side apparatus 10 at which the telephone transmission has arrived from the instruction receiving apparatus 10, the controller 100 controls the target other side apparatus 10 so that the target other side apparatus 10 does not perform the telephone arrival notification by sound in accordance with the received control signal regardless of contents of the setting regarding the telephone arrival notification in the subject device.

The control signal which the controller 100 transmits to the target other side apparatus 10 is not limited to the example described above. For example, the controller 100 may transmit the control signal of instructing not to execute the telephone arrival notification by sound and instructing to set the magnitude of the telephone arrival vibration to a minimum value (not zero). The controller 100 may transmit the control signal of instructing not to execute the telephone arrival notification by vibration. The controller 100 may transmit the control signal of instructing not to execute the telephone arrival notification by sound and instructing to set the luminance of the telephone arrival vibration to a minimum value (not zero). The controller 100 may transmit the control signal of instructing not to execute the telephone arrival notification by sound and the telephone arrival notification by light emission. The controller 100 may transmit the control signal of instructing not to execute the telephone arrival notification by sound and instructing to set the magnitude of the telephone arrival vibration and the luminance of the telephone arrival light emission to a minimum value. The controller 100 may transmit the control signal of instructing not to execute the telephone arrival notification by sound, the telephone arrival notification by vibration, and the telephone arrival notification by light emission.

The target other side apparatus 10 which has received the control signal from the instruction receiving apparatus 10 and at which the telephone transmission from the instruction receiving apparatus 10 has arrived may include, in an arrival history, an un-acquisition information 950 indicating that the instruction receiving apparatus 10 could not acquire the apparatus position information of the target other side apparatus 10.

Figure 38:
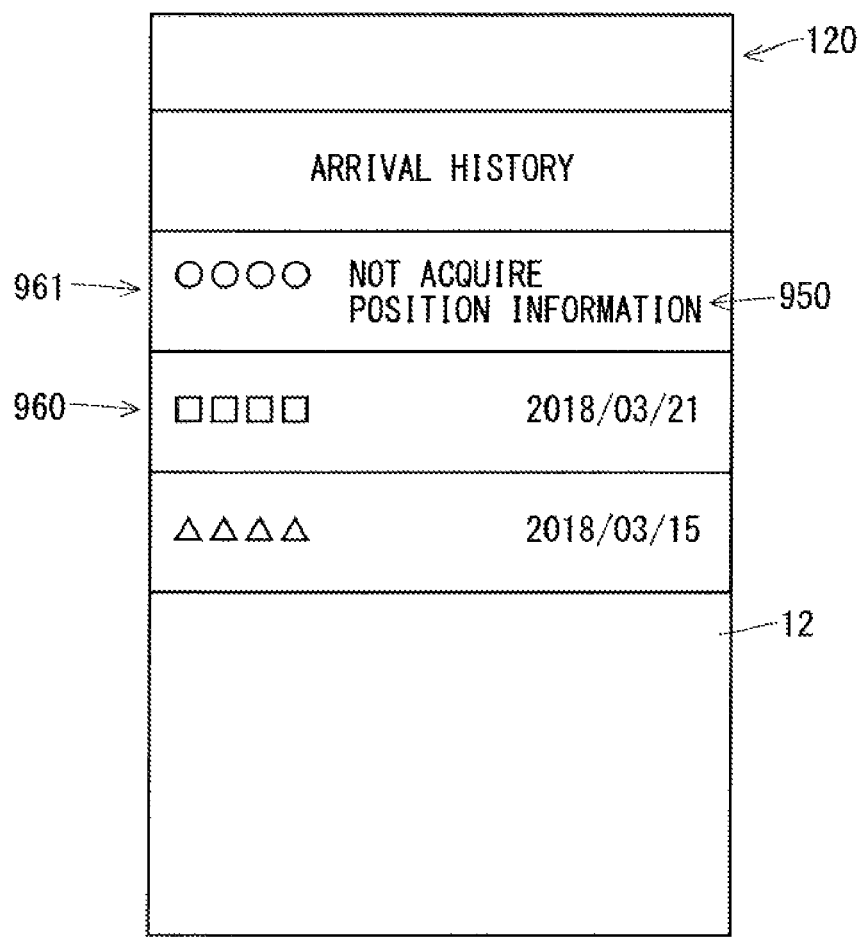
FIG. 38 illustrates a drawing showing one example of a display of the electronic apparatus.

FIG. 38 is a drawing illustrating a display example of an arrival history 960 including the un-acquisition information 950. As illustrated in FIG. 38, arrival information 961 which is included in the arrival history 960 indicated by the target other side apparatus 10 to indicate the arrival of the instruction receiving apparatus 10 includes the un-acquisition information 950. Accordingly, the target other side user can recognize that the instruction receiving apparatus 10 could not acquire the apparatus position information of the target other side apparatus 10. The target other side user who recognizes that the instruction receiving apparatus 10 could not acquire the apparatus position information of the target other side apparatus 10 operates the target other side apparatus 10, for example, thereby making the target other side apparatus 10 operate the position acquisition unit 140.

In this manner, in the present example, when the subject device cannot acquire the apparatus position information of the target other side apparatus 10, the instruction receiving apparatus 10 controls the telephone arrival notification in the target other side apparatus 10, thus the convenience of the electronic apparatus 10 is increased.

The arrival history in the target other side apparatus 10 includes the un-acquisition information 950, thus the convenience of the electronic apparatus 10 is further increased.

While the processing system 1 has been described above in detail, the above description is in all aspects illustrative and not restrictive. The various modifications described above are applicable in combination as long as they are not mutually inconsistent. It is understood that numerous modifications which have not been exemplified can be devised without departing from the scope of the present disclosure.

The invention claimed is:
1. An electronic apparatus, comprising:
 a communication unit configured to be able to communicate with another side device; and
 at least one processor configured to, in response to a transmission instruction from a user regarding a telephone communication with the another side device and based on position information of the another side device, control an operation regarding the telephone communication of the another side device so that the another side device executes a noise cancellation func- tion, while the telephone communication is performed, in accordance with a type of location specified from the position information.

2. The electronic apparatus according to claim 1, wherein the at least one processor further controls an operation of the electronic apparatus in first processing based on the position information.

3. The electronic apparatus according to claim 2, wherein the at least one processor determines which to perform, the telephone communication or a message communication, in the first processing.

4. The electronic apparatus according to claim 3, wherein the at least one processor determines which to perform, the telephone communication or the message communication, based on the type of the location specified from the position information.

5. The electronic apparatus according to claim 3, wherein the at least one processor determines which to perform, the telephone communication or the message communication, based on schedule information of the location specified from the position information in the first processing.

6. The electronic apparatus according to claim 3, wherein the at least one processor determines which to perform, the telephone communication or the message communication, based on a time of the location specified from the position information.

7. The electronic apparatus according to claim 3, wherein the at least one processor comprises in the first processing:
controlling the another side device so that the another side device notifies the electronic apparatus of a sound around the another side device in accordance with the type of the location specified from the position information; and
determining which to perform, the telephone communication or the message communication, based on the sound notified by the another side device.

8. The electronic apparatus according to claim 3, wherein the at least one processor determines to execute a communication, that is the telephone communication or the message communication, of which the another side device desires an execution in the location specified from the position information.

9. The electronic apparatus according to claim 3, wherein the at least one processor comprises in the first processing:
determining to execute the telephone communication, selected from the telephone communication and the message communication, when the another side device desires an execution of the telephone communication in the location specified from the position information; and
determining to execute a communication, that is the telephone communication or the message communication, selected by a user of the electronic apparatus when the another side device desires an execution of the message communication, selected from the telephone communication and the message communication, in the location specified from the position information.

10. The electronic apparatus according to claim 1, wherein the at least one processor controls an arrival notification of the telephone communication in the another side device.

11. The electronic apparatus according to claim 10, wherein the another side device can perform the arrival notification using sound output, and the at least one processor controls the sound output.

12. The electronic apparatus according to claim 10, wherein the another side device can perform the arrival notification using vibration, and the at least one processor controls the vibration.

13. The electronic apparatus according to claim 10, wherein the another side device can perform the arrival notification using light emission, and the at least one processor controls the light emission.

14. The electronic apparatus according to claim 10, wherein the at least one processor controls an arrival notification in the another side device based on the type of the location specified from the position information.

15. The electronic apparatus according to claim 10, wherein the at least one processor controls the arrival notification in the another side device based on schedule information in the location specified from the position information.

16. The electronic apparatus according to claim 10, wherein the at least one processor controls the arrival notification in the another side device based on a time in the location specified from the position information.

17. The electronic apparatus according to claim 10, wherein the at least one processor comprises:
controlling the another side device so that the another side device notifies the electronic apparatus of a sound around the another side device in accordance with the type of the location specified from the position information; and
controlling the arrival notification in the another side device based on the sound transmitted from the another side device.

* * * * *